United States Patent
Su et al.

(10) Patent No.: US 10,540,788 B2
(45) Date of Patent: Jan. 21, 2020

(54) RADIAL GRADIENT MODULE

(71) Applicant: KYOCERA Document Solutions Inc., Osaka (JP)

(72) Inventors: Dongpei Su, El Segundo, CA (US); Christa Neil, El Segundo, CA (US); Yuzuru Naganuma, Torrance, CA (US); Kendrick Wong, Torrance, CA (US); Donald Han, New York, NY (US); Kenneth A. Schmidt, El Segundo, CA (US)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 35 days.

(21) Appl. No.: 16/000,864

(22) Filed: Jun. 5, 2018

(65) Prior Publication Data
US 2019/0371013 A1  Dec. 5, 2019

(51) Int. Cl.
G06T 11/00 (2006.01)
G06T 11/40 (2006.01)
G06T 15/04 (2011.01)
G06T 15/00 (2011.01)

(52) U.S. Cl.
CPC ............ *G06T 11/001* (2013.01); *G06T 11/40* (2013.01)

(58) Field of Classification Search
CPC combination set(s) only.
See application file for complete search history.

(56) References Cited

U.S. PATENT DOCUMENTS

| | | | |
|---|---|---|---|
| 6,313,840 B1 * | 11/2001 | Bilodeau ............. | G06T 15/04 345/423 |
| 7,336,820 B2 | 2/2008 | Ji | |
| 8,643,663 B2 | 2/2014 | Zillman et al. | |
| 2004/0194020 A1 * | 9/2004 | Beda ............... | G06T 11/20 715/211 |
| 2006/0244748 A1 * | 11/2006 | Long ............... | G06T 11/40 345/422 |

(Continued)

OTHER PUBLICATIONS

Adobe Systems Incorporated, PDF Reference, 6th Edition, Adobe Portable Document Format, Version 1.7, Nov. 2006, Chapter 4.6.3, pp. 302-331, with additional title pages and color plates (54 pages total).

(Continued)

*Primary Examiner* — Wesner Sajous
(74) *Attorney, Agent, or Firm* — McDonnell Boehnen Hulbert & Berghoff LLP

(57) ABSTRACT

Methods and apparatus for radial gradient rendering are provided. A graphics computing device can include a radial gradient module (RGM), which can include circuitry for radial gradient rendering. The RGM can receive one or more parameters associated with rendering at least a portion of an image utilizing radial gradient rendering. The RGM can map one or more input coordinates of the image to one or more source domain coordinates. The RGM can determine a t-value for the source domain coordinates, the t-value specifying an ellipse in the source domain whose edge includes the source domain coordinates. The RGM can determine a color value for the input coordinates based on the specified ellipse. The RGM can generate an output that is based on the color value.

20 Claims, 21 Drawing Sheets

(56) References Cited

U.S. PATENT DOCUMENTS

2009/0195549 A1* 8/2009 Park ........................ G09G 5/026
345/589
2011/0050696 A1* 3/2011 Zillman .................. G06T 11/40
345/426

OTHER PUBLICATIONS

Hankey, "Gradients Made Easy", Dec. 26, 2013, website article downloaded Jun. 12, 2017 from www.codeproject.com/Articles/20018/Gradients-made-easy (13 pages).
Microsoft, IXpsOMRadialGradientBrush interface, website article downloaded Jul. 12, 2017 from msdn.microsoftcom/en-us/library/windows/desktop/dd372743(v=vs.85).aspx (3 pages).
D. Su et al., "Radial Gradient Module", U.S. Appl. No. 16/000,852, filed Jun. 5, 2018.

* cited by examiner

RADIAL GRADIENT MODULE

BACKGROUND

Printing devices have increased in number and geographic footprint throughout the world and have become increasingly connected to networks. These networks can include a print server. Typically, when one or more documents and/or other print data are scheduled to be printed, the print data is either directly sent to one printing device, or sent to a print server.

The networks can include many printing devices. Some or all of the printing devices can have different features, functions, and capabilities. For example, some printing devices print in color, while others do not. As another example, some printing devices are equipped with duplexing hardware that allows printing on both sides of a sheet of paper, while other printing devices can only print on one side of a sheet of paper.

Printing devices can use various types of colorant to print on paper or other media. These types of colorant can include toner, inks, and dyes. These colorants can be of various colors; e.g., black, cyan, magenta, yellow. Typically, colorant for a printing device can be replaced or refilled. For example, toner of one or more colors can be replaced in many modern laser printers.

SUMMARY

In a first aspect, a graphics computing device is provided. The graphics computing device includes a radial gradient module, which includes circuitry for radial gradient rendering by at least: receiving one or more parameters associated with rendering at least a portion of an image utilizing radial gradient rendering; mapping one or more input coordinates of the image to one or more source domain coordinates; determining a t-value for the source domain coordinates, the t-value specifying an ellipse in the source domain whose edge includes the source domain coordinates; determining a color value for the input coordinates based on the specified ellipse; and generating an output that is based on the color value.

In a second aspect, a method is provided. A radial gradient module of a graphics computing device receives one or more parameters associated with rendering at least a portion of an image utilizing radial gradient rendering. The radial gradient module maps one or more input coordinates of the image to one or more source domain coordinates. The radial gradient module determines a t-value for the source domain coordinates, the t-value specifying an ellipse in the source domain whose edge includes the source domain coordinates. The radial gradient module determines a color value for the input coordinates based on the specified ellipse. An output of the graphics computing device is generated; the output based on the color value.

In a third aspect, an article of manufacture is provided. The article of manufacture includes a non-transitory data storage storing at least computer-readable instructions. The computer-readable instructions, when executed by one or more processors of a graphics computing device, cause the graphics computing device to perform tasks. The tasks include: receiving one or more parameters associated with rendering at least a portion of an image utilizing radial gradient rendering; mapping one or more input coordinates of the image to one or more source domain coordinates; determining a t-value for the source domain coordinates, the t-value specifying an ellipse in the source domain whose edge includes the source domain coordinates; determining a color value for the input coordinates based on the specified ellipse; and generating an output that is based on the color value.

In a fourth aspect, a graphics computing device is provided. The graphics computing device includes a radial gradient module, which includes circuitry for radial gradient rendering of at least a portion of an image by at least: determining a first grid of pixels of the at least the portion of the image; determining a coarse grid of pixels based on the first grid of pixels, the coarse grid of pixels including a plurality of coarse pixels; determining one or more t-values for the first grid of pixels, the one or more t-values associated with radial gradient rendering; determining whether an edge formed by an ellipse associated with at least one of the one or more t-values for the first grid of pixels has intersected the coarse grid of pixels; after determining that the edge formed by the ellipse has intersected the coarse grid of pixels, determining a fine grid of pixels based on the coarse grid of pixels and the edge formed by the ellipse, the fine grid of pixels including a plurality of fine pixels, determining a color value for each coarse pixel of the coarse grid of pixels and a color value for each fine pixel of the fine grid of pixels, the color values based on the one or more t-values for the first grid of pixels; and generating an output based on the color values of both the coarse grid of pixels and the fine grid of pixels.

In a fifth aspect, a method is provided. A radial gradient module of a graphics computing device determines a first grid of pixels of at least a portion of an image. The radial gradient module determines a coarse grid of pixels based on the first grid of pixels, where the coarse grid of pixels includes a plurality of coarse pixels. The radial gradient module determines one or more t-values of the first grid of pixels, where the one or more t-values are associated with radial gradient rendering. The radial gradient module determines whether an edge formed by an ellipse associated with at least one t-value of the one or more t-values of the first grid of pixels has intersected the coarse grid of pixels. After determining that the edge formed by the ellipse has intersected the coarse grid of pixels, the radial gradient module determines a fine grid of pixels based on the coarse grid of pixels and the edge formed by the ellipse, the fine grid of pixels including a plurality of fine pixels. The radial gradient module determines a color value for each coarse pixel of the coarse grid of pixels based on the one or more t-values and a color value for each fine pixel of the fine grid of pixels, where the color values are based on the one or more t-values for the first grid of pixels. The radial gradient module generates an output based on the color values of both the coarse grid of pixels and the fine grid of pixels.

In sixth aspect, an article of manufacture is provided. The article of manufacture includes a non-transitory data storage storing at least computer-readable instructions. The computer-readable instructions, when executed by one or more processors of a graphics computing device, cause the graphics computing device to perform tasks. The tasks include: determining a first grid of pixels of at least a portion of an image for radial gradient rendering; determining a coarse grid of pixels based on the first grid of pixels, the coarse grid of pixels including a plurality of coarse pixels; determining one or more t-values for the first grid of pixels, the one or more t-values associated with radial gradient rendering; determining whether an edge formed by an ellipse associated with at least one of the one or more t-values for the first grid of pixels has intersected the coarse grid of pixels; after determining that the edge formed by the ellipse has intersected the coarse grid of pixels, determining a fine grid of pixels based on the coarse grid of pixels and the edge formed by the ellipse, the fine grid of pixels including a plurality of fine pixels, determining a color value for each coarse pixel of the coarse grid of pixels and a color value for each fine pixel of the fine grid of pixels, the color values based on the one or more t-values for the first grid of pixels; and generating an output based on the color values of both the coarse grid of pixels and the fine grid of pixels.

Other aspects, embodiments, and implementations will become apparent to those of ordinary skill in the art by reading the following detailed description, with reference where appropriate to the accompanying drawings.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Figure 12:
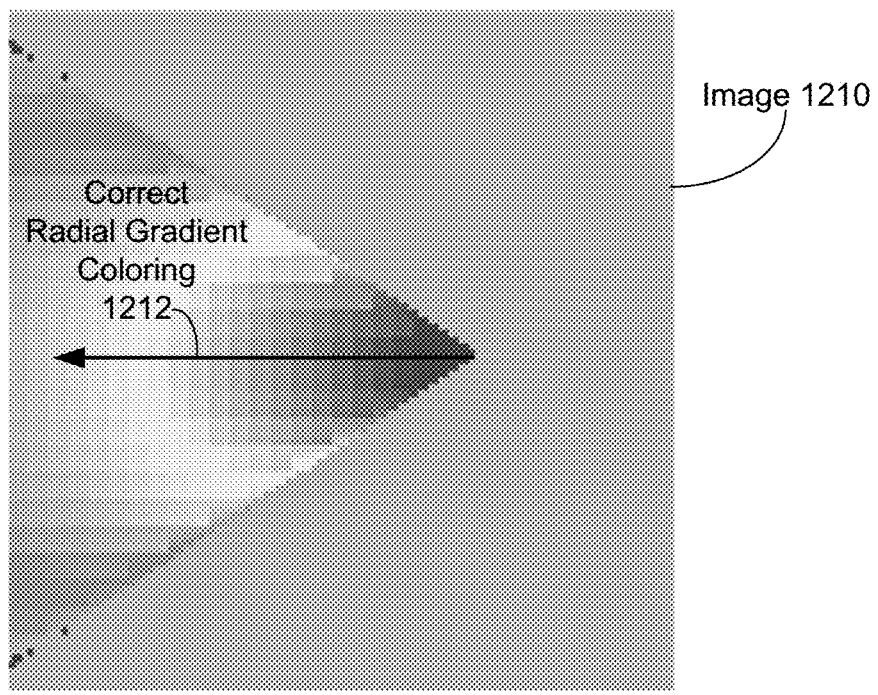
FIG. 12 shows two images generated utilizing radial gradient techniques, each image associated with one of the two real roots of FIG. 11, according to an example embodiment.
Figure 12:
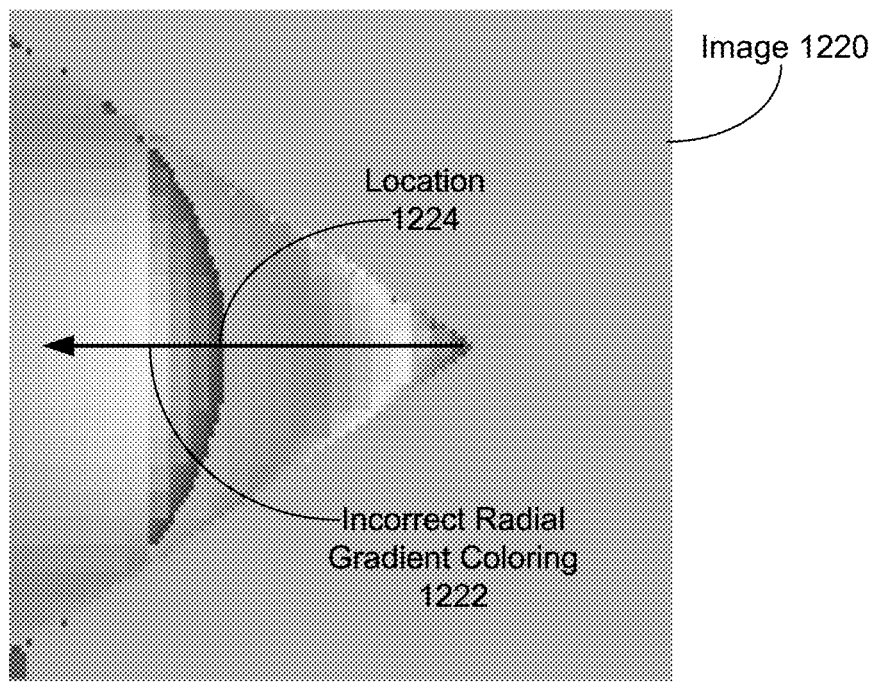
Figure 15:
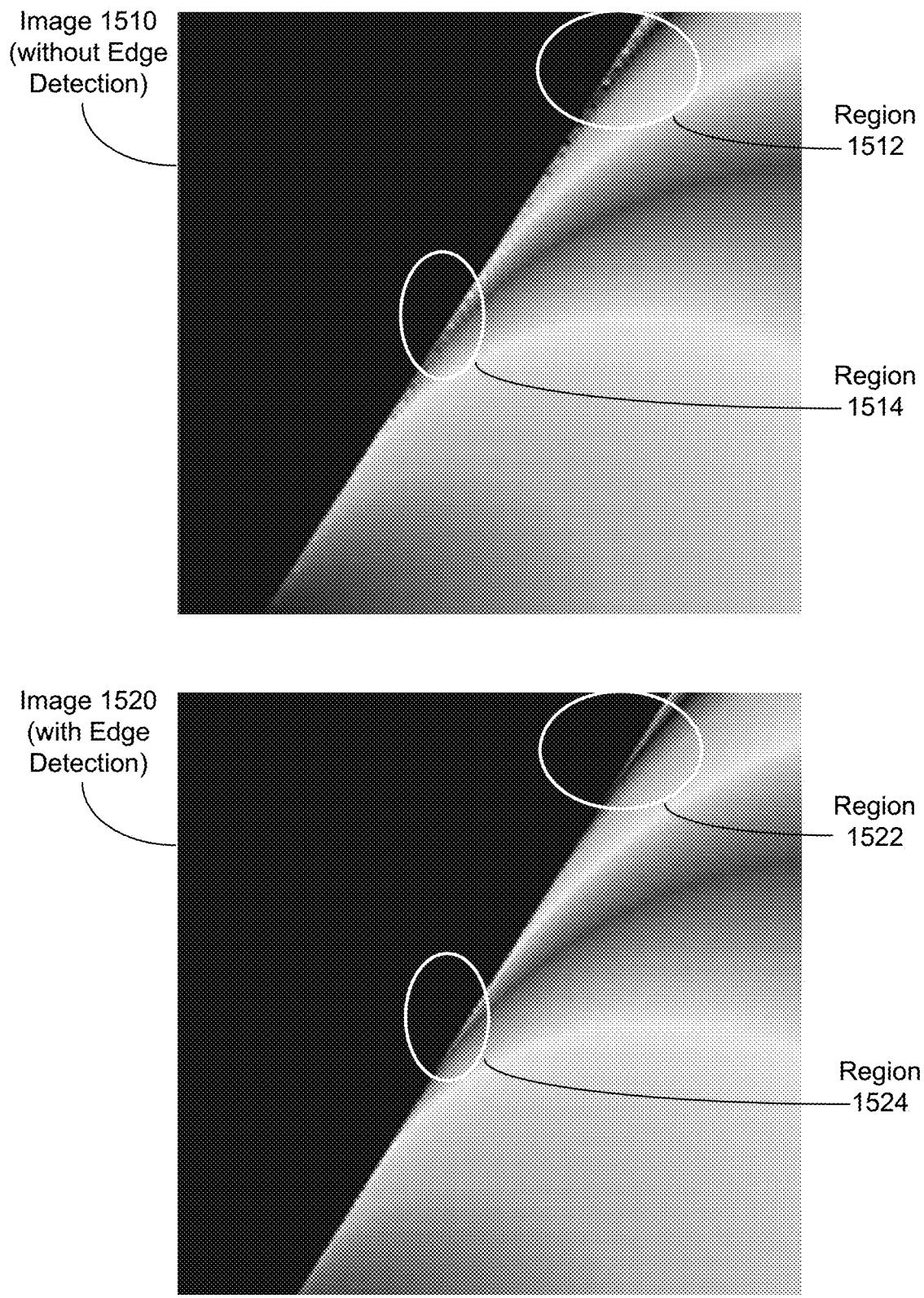
FIG. 15 shows two images generated utilizing radial gradient techniques, one image generated without edge detection, and one image generated with edge detection, according to an example embodiment.

Example apparatus and methods are described herein related to using radial gradient rendering techniques, particularly as applied to printing devices. A radial gradient represents a progressive transition between two or more colors, expressed as a color gradient between gradient stop points that radiates from a gradient origin (the center and/or starting point of the gradient) outward to a final shape; e.g., a circle or ellipse. This color gradient can be termed as the radial gradient. The radial gradient can be used to determine colors of pixels of an image, where the image can be rendered, saved, printed, communicated, displayed, and/or otherwise provided as an output of these radial gradient techniques. Example images created using radial gradient techniques are shown in FIGS. 12 and 15. Many other images using radial gradient techniques are possible as well.

More specifically, a radial gradient can be formed from the gradient origin toward the final shape, which can be defined based on a center point or ending point, X radius, and Y radius. The ending point of the radial gradient can lie on the circumference of the final shape. Gradient stops between the origin and the end point can form color rings of the radial gradient. In some cases, each gradient stop can be expressed using an offset value that ranges from 0.0, representing the gradient origin, and 1.0, representing the end point. In other cases, the offset value can range from an initial value $t_0$ representing the gradient origin to a final value $t_1$ representing the end point.

For example, to render a pixel P or other graphical element; e.g., a voxel, of an image I in a destination domain, where pixel's P location in the destination domain is expressed using destination coordinates $(X'_T, Y'_T)$ that can be mapped to source coordinates $(X_t, Y_t)$ of a source domain. The source domain can include the circle(s), ellipse(s), and radial gradient(s) for radial gradient rendering. In particular, the source coordinates $(X_t, Y_t)$ can have a corresponding t-value, $0 \leq t \leq 1$ indicating a position along the radial gradient. Then, the t-value can be mapped to a color C used to specify the color of pixel P of image I. This per-pixel rendering process can be repeated for some or all pixels in image I to provide radial gradient shading for image I.

Radial gradient rendering can be performed using graphics engine circuitry and/or using corresponding graphics engine software. The graphics engine circuitry (or graphics engine software) can include a radial gradient module for the radial gradient rendering. In hardware implementations, the graphics engine circuitry with the radial gradient module can offload the computationally intensive task of radial gradient rendering from other processors, such as a CPU of a computing and/or printing device. The graphics engine circuitry can be directed by graphics orders, or commands, to generate the imagery. Example graphics orders can include, but are not limited to commands for: enabling and disabling radial gradient processing, selecting a radial gradient algorithm to use for radial gradient processing, setting, initializing, reading, writing, updating, calculating, and/or recalculating some or all of the mathematical, color, and/or other numerical values used in radial gradient processing, and specifying radial gradient processing options.

Radial gradient rendering can be performed using one or more radial gradient transfers. A radial gradient transfer can be a smooth gradient of color with no sharp transitions except at special boundary conditions such as a circle boundary or a cone boundary. As radial gradient transfers are smooth, a radial gradient can be processed at a lower, or coarse, resolution for most transfers and only switch to a higher, or fine, resolution processing near boundaries. As such, the radial gradient module has two modes of grid resolution: coarse grid resolution (utilized by default in some examples) and fine grid resolution. In some examples, coarse grid resolution calculates t-values only for 4 corner pixels out of a 4×4 cell or block of pixels and corresponding t-values, while fine grid resolution calculates t-values on all 16 pixels out of a 4×4 cell or block of pixels.

The radial gradient module can combine several algorithms and modes for radial gradient rendering. For example, the radial gradient module can provide a cascaded implementation of algorithms, in hardware, to accomplish radial gradient quadratic equation root calculations. These quadratic equation root calculations can combine algorithms, such as (1) the Newton-Raphson technique for finding roots of equations, (2) performing division using an iterative division, such as a division-by-convergence algorithm, and (3) one-dimensional (1D) and/or two-dimensional (2D) extrapolation, to provide an efficient implementation of the quadratic root calculation using minimal clock cycles and hardware. These three algorithms can respectively efficiently calculate the roots of the quadratic equation, simplify the division required during root finding, and estimate the initial value for each iteration of root finding via extrapolation. The cascaded use of these three algorithms can result in efficient and fast radial gradient rendering, particularly when the radial gradient module is implemented in hardware.

Radial gradient rendering can utilize multiple different mathematical definitions, and therefore multiple different algorithms. At least two of these algorithms are implemented by the radial gradient module. One of these algorithms, termed herein as Algorithm A, is a single-ellipse radial gradient algorithm that utilizes an elliptical definition of a source domain, while another of these algorithms, termed herein as Algorithm B, is a dual-circle radial gradient algorithm that utilizes a dual circle definition of a source domain for radial gradient rendering. In some examples, the radial gradient module implements both Algorithms A and B in one module and can switch between the two based on the processing and the execution of one or more graphics orders or commands that selects which of these mathematical definition, and therefore which algorithm, is to be used for radial gradient rendering. The graphics order(s)/command(s) can include parameters to control execution of similar but different calculations for the quadratic equation root calculation in each of Algorithms A and B (and any other algorithms supported by the radial gradient module). Switching between radial gradient rendering algorithms upon command increases both the flexibility of the radial gradient module as well as enabling the radial gradient module to provide a variety of rendering outputs.

More particularly, for each destination pixel DP in image I, the radial gradient module can determine a radial gradient t-value corresponding to a ring or ellipse in a source domain that the destination pixel falls on, and then set a color of destination pixel DP that corresponds to the t-value. An example technique for determining a correct radial-gradient-rendering color for each destination pixel DP in image I, can use the following steps:

1. Reverse map coordinates $(X'_T, Y'_T)$ of destination pixel DP to a coordinate $(x_t, y_t)$ in the source domain, where the source domain includes the rings/ellipses for radial gradient rendering.
2. Calculate parameters of a quadratic equation that expresses the t-value in terms of the coordinate $(x_t, y_t)$, a gradient origin $(X_o, Y_o)$, a center point $(X_c, Y_c)$, and one or more radii of a ring/ellipse that goes through coordinate $(x_t, y_t)$.
3. Solve the quadratic equation mentioned in step (2) above to determine the t-value, thereby identifying which the ring/ellipse that goes through coordinate $(x_t, y_t)$. In some embodiments, the radial gradient module can solve the quadratic equation using the Newton-Raphson technique for finding roots of equations and/or iterative division.
4. Use the t-value to look up a color C for the destination pixel DP. For example, the radial gradient module can use a color blend or table of colors indexed by the t-value to determine color C. Once color C has been determined, set a color of destination pixel DP to color C.

Due to the nature of radial gradient rendering, the values of adjacent pixels are very close to one another. As such, iteration-based approximation methods to solve the above-mentioned quadratic equations can be efficient, such as the above-mentioned Newton-Raphson technique. The Newton-Raphson technique based on the idea of using the tangent line of a function to converge to the root. When the Newton-Raphson technique is used to find roots of quadratic equations, the Newton-Raphson technique is simple and can quickly converge to find a root.

By use of the herein-described techniques, visual artifacts can be reduced or even eliminated during radial gradient rendering. Further, especially when implemented in hardware, the herein-described radial gradient module can provide fast radial gradient rendering. Additionally, a hardware radial gradient module can offload radial gradient rendering from a general processor (e.g., a CPU core), and thereby increase throughput of the general processor and of the resulting system.

Radial Gradient Rendering Algorithms, Hardware, and Software

Figure 1:
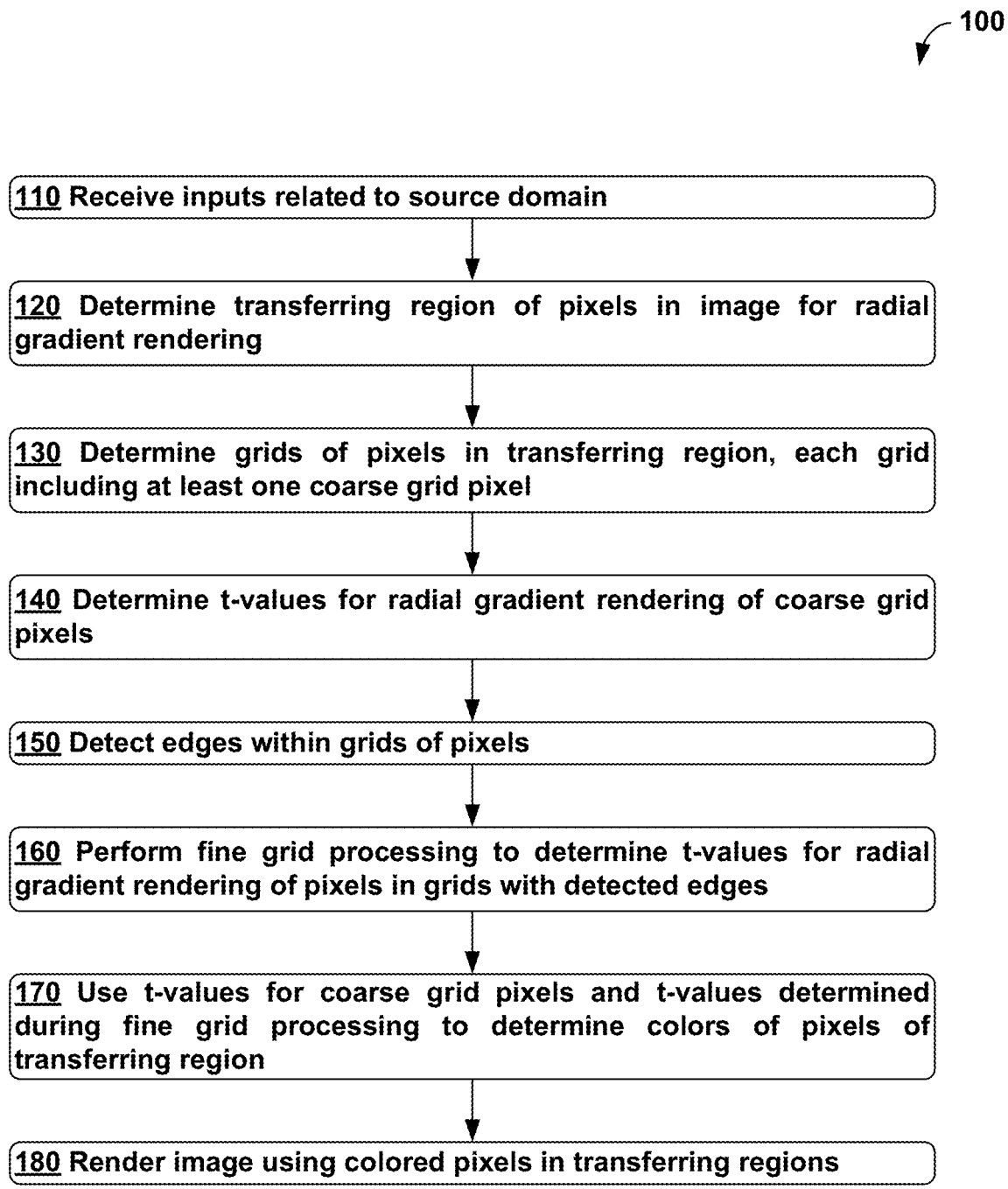
FIG. 1 is a flowchart of a method for radial gradient rendering, according to an example embodiment.

FIG. 1 is a flowchart of method 100 for radial gradient rendering, according to an example embodiment. The radial gradient rendering can be performed for a "transferring region" that includes a block of one or more pixels of an image. Method 100 can be carried out by a radial gradient module implemented in hardware as part of graphics engine circuitry and/or in software as part of graphics engine software. For example, method 100 can be carried out by graphics computing device 400 including graphics engine software 412 and/or graphics engine circuitry 420 that in turn can include radial gradient module 500, discussed herein at least in the context of FIGS. 4 and 5.

Method 100 can begin at block 110, where the radial gradient module can receive inputs related to a source domain. The source domain can include one or more circles, ellipses, lines, line segments, color values, and coordinates used to determine colors of pixels in a destination domain that differs from the source domain. The values can be associated with a color blend, or range of colors that are related to a parameter, such as a t-value. That is, given a specific parameter value, the color blend can determine a color associated with the specific parameter value.

The inputs can also include information about and/or to select a specific algorithm for radial gradient rendering to be carried out using method 100; e.g., a radial gradient algorithm selection parameter for selecting a radial gradient rendering algorithm, such as the herein-described Algorithm A or the herein-described Algorithm B. One specific radial gradient rendering algorithm, Algorithm A, uses radial gradients to define a color blend that starts at the gradient origin for shading images and ends at an outer ellipse or circle. Another specific radial gradient rendering algorithm, Algorithm B, uses radial gradients to define a color blend that uses a radial gradient to define a color blend that starts at a constant-colored starting circle and ends at an ending circle. Algorithms A and B can differ based on mathematical models and related parameters for determining t-values and corresponding colors. Either one of Algorithm A or Algorithm B can be selected for use by the radial gradient algorithm selection parameter. Method 100 can then involve use of the selected algorithm (e.g., either of Algorithms A and B) to render at least a portion of an image using radial gradient rendering and to generate an output based on the rendered at least the portion of the image. Selecting either Algorithm A or Algorithm B implies selection of a number of equations used by the algorithm; e.g., Algorithm A utilizes Equations (1)-(11) to determine t-values as discussed below, and Algorithm B utilizes Equations (12)-(23) to determine t-values as discussed below. Thus, in examples where the radial gradient algorithm selection parameter is used to select between at least Algorithm A and Algorithm B, equations used for determining t-values during execution of method 100 can be selected based on the radial gradient algorithm selection parameter.

At block 120, the radial gradient module can determine a transferring region of an image having a grid of IX×IY pixels. The transferring region can include one or more pixels of the image that are to be colored using radial gradient rendering. In some examples, the transferring region can be a rectangular region of TX×TY pixels, where 0<TX≤IX, and 0<TY≤IY.

At block 130, the radial gradient module can determine one or more grids of pixels within the transferring region. Each grid of pixels can be a square or rectangular portion of the transferring region. For example, each grid can be a Gx×Gy grid of pixels, where 0<Gx<TX and 0<Gy<TY grid of pixels. In a more specific example, Gx=Gy=4 so that the transferring region can be divided into 4×4 grids of pixels.

Figure 6:
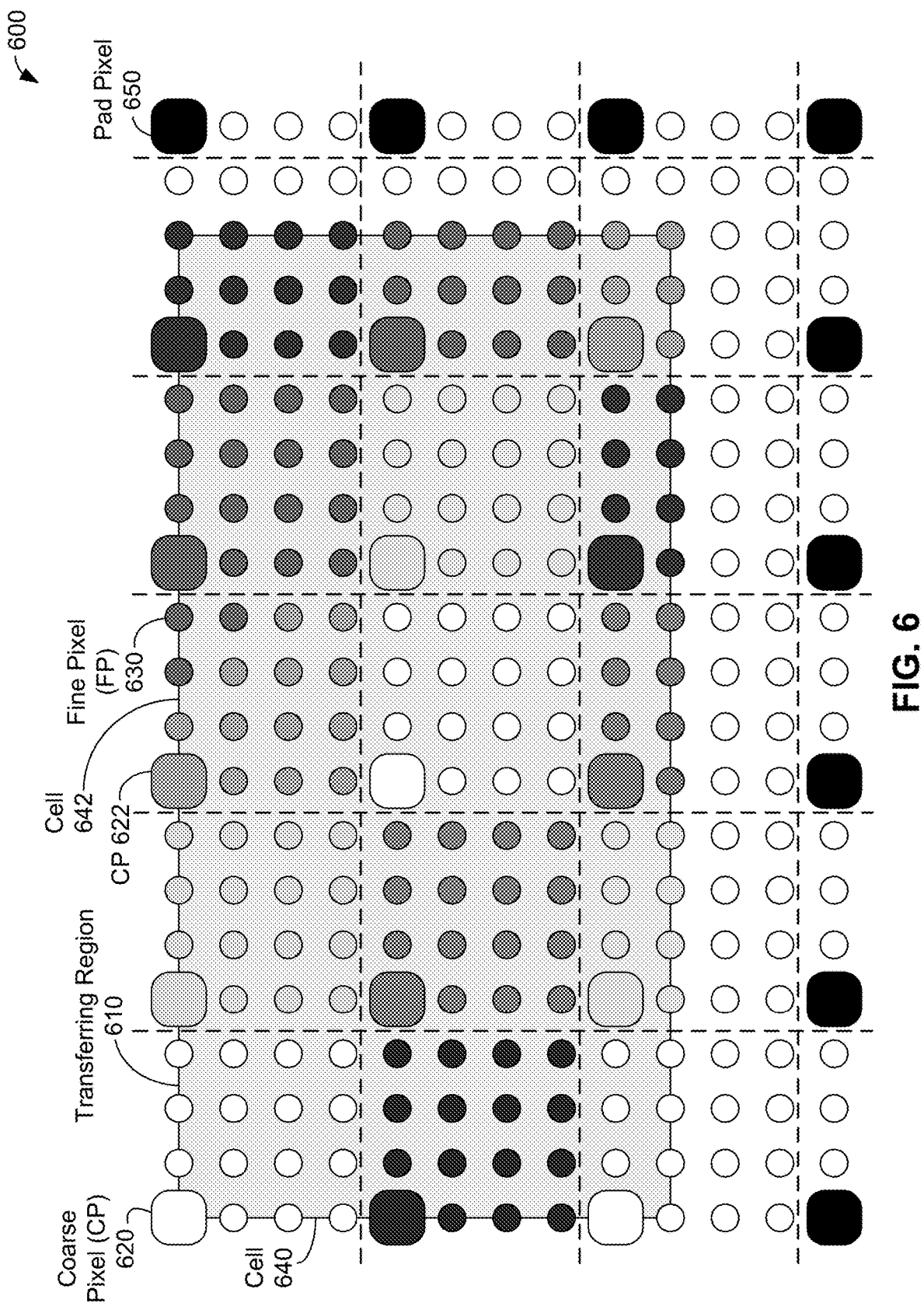
FIG. 6 illustrates an image depicted using a grid of pixels, according to an example embodiment.

Also, the radial gradient module can determine at least one coarse grid pixel per Gx×Gy grid of pixels. For example, the coarse grid pixel can be an upper-left or other corner pixel of a Gx×Gy grid of pixels—FIG. 6 illustrates an example image 600 where coarse grid pixels are upper-left corner pixels of 4×4 grids of pixels within a transferring region. In other examples, non-corner pixels can be selected as coarse grid pixels of the grids of pixels in the transferring region.

At block 140, the radial gradient module can determine t-values for coarse grid pixels. A t-value is a parameter value used to determine a color for the pixel based on a specific radial gradient rendering algorithm and the coordinates of the pixel within the source domain. As the pixel is an object in the destination domain, the radial gradient module can map coordinates of a source grid pixel to corresponding coordinates in the source domain, and then determine the t-value based on the mapped coordinates in the source domain for the coarse grid pixel. The specific t-value for the mapped coordinates in the source domain depends on the specific radial gradient rendering algorithm.

At block 150, the radial gradient module can determine whether any of the grids of pixels within the transferring region have edges; that is, the radial gradient module can detect edges within the grids of pixels. The edges can be based on edges formed by perimeters of circles, ellipses, cones and perhaps other geometric entities within the source domain. For example, the radial gradient module can have an edge detector that detects edges within the grids of pixels.

At block 160, the radial gradient module can perform fine grid processing to determine t-values for radial gradient rendering of pixels in grids with detected edges. Fine grid processing can involve determining t-values for each pixel within a Gx×Gy grid of pixels. As such, block 170 involves determining a t-value for each pixel in each grid of GX×Gy pixels where an edge was detected at block 150.

At block 170, the radial gradient module can use the t-values for coarse grid pixels and the t-values determined during fine grid processing to determine colors of pixels of transferring region. For example, a t-value can be used as a parameter to a color blend that converts t-values into colors. As an example of a gray-scale color blend for t-values between 0 and 1, a t-value of 0.0 can be associated with the Red/Green/Blue (RGB) color triple of [0, 0, 0] which represents a black color, a t-value of 1.0 can be associated with the color triple of [255, 255, 255] which represents a white color, and each t-value between 0.0 and 1.0 can be determined as the RGB triple [t*255, t*255, t*255], which represents a shade of gray. Many other color blends exists as well.

At block 180, the radial gradient module can render the image using the colored pixels in the transferring region. For example, the radial gradient module can print, display, save, transmit and/or otherwise output the image including at least part of the transferring region.

Figure 2A:
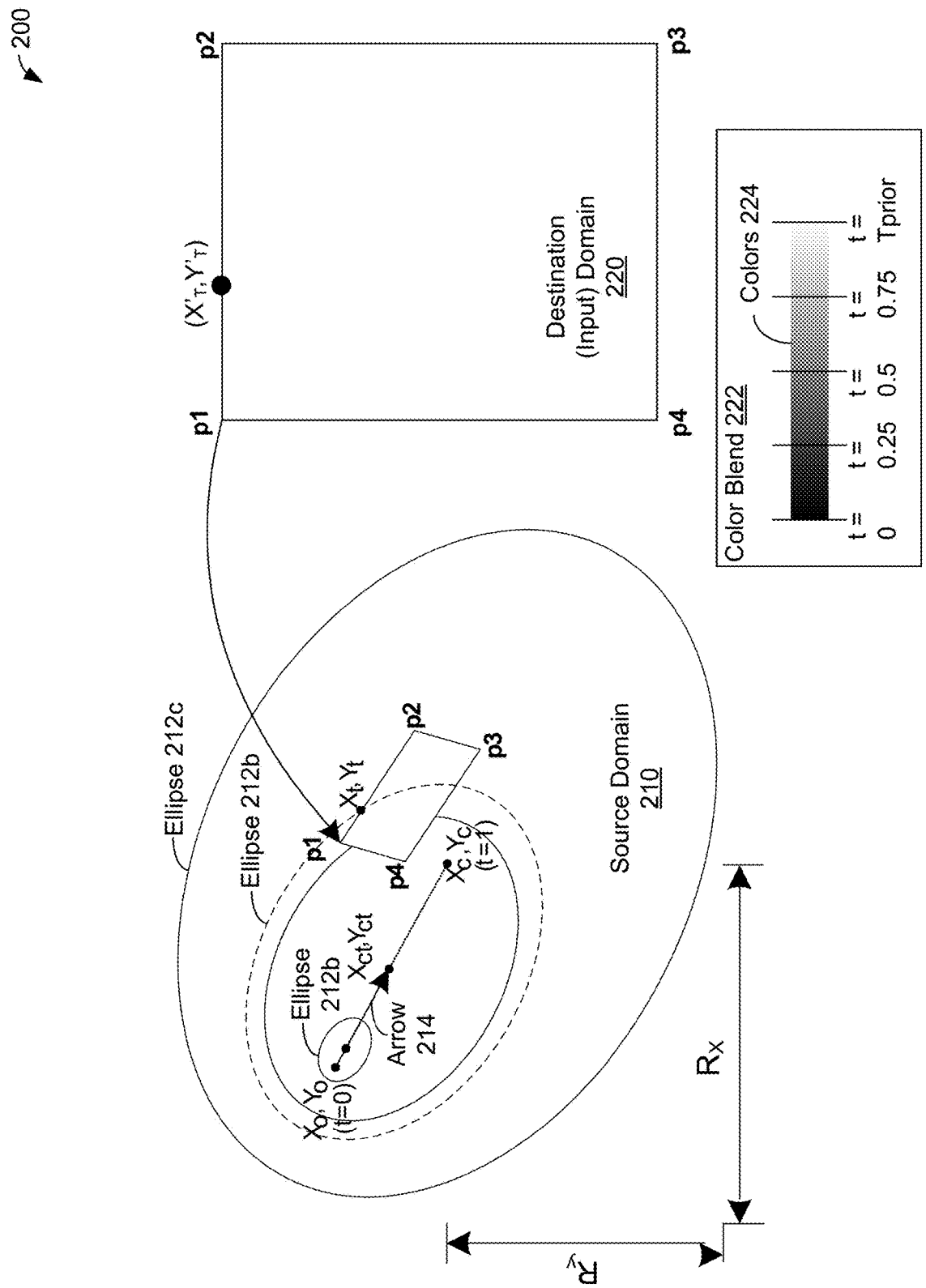
FIG. 2A is a diagram illustrating coordinates in a destination domain being mapped into coordinates in a source domain for radial gradient rendering, according to an example embodiment.

FIG. 2A includes diagram 200 illustrating coordinates $(X'_T, Y'_T)$ in destination domain 220 being mapped into coordinates $(X_r, Y_r)$ in source domain 210 for radial gradient rendering, according to an example embodiment. Diagram 200 can be associated with Algorithm A for radial gradient rendering. Algorithm A uses radial gradients to define color blend 222 that starts at the center of an ellipse $(X_c, Y_c)$ for shading images and ends at an ending ellipse or circle.

Destination domain 220 can include a frame or 2D grid of pixels, where the frame may also include additional data; e.g., grid size data, color scheme indicator (e.g., grayscale, RGB, CYMK, etc.). The frame can be bounded by four corner points: p1, p2, p3, and p4. FIG. 2A shows the coordinates $(X'_T, Y'_T)$ are along a line forming a top of the rectangular image between corner points p1 and p2. The frame can represent an image, where the image is depicted using the 2D grid of pixels of the frame.

After coordinates $(X'_T, Y'_T)$ in destination domain 220 are mapped to coordinates $(X_r, Y_r)$ in source domain 210, Algorithm A involves determining a "t-value". The t-value is a value of a parameter t indicating a distance along a line segment from a gradient origin $(X_o, Y_o)$ and ending at an ending center point $(X_c, Y_c)$ of an ending circle or ellipse, where the center point moves as indicated by a moving center point ($X_{ct}$, $Y_{ct}$), a radius $r_x$ along an X-axis (or horizontal axis) and a radius $r_y$ along a Y-axis (or vertical axis).

Regarding moving center point ($X_{ct}$, $Y_{ct}$), as the t-value increases, the corresponding ellipse increase in size. In the example shown in FIG. 2A, ellipses 212a, 212b, 212c increase in size, and corresponding center points of the increasingly-large ellipses 212a, 212b, 212c move along arrow 214 while going from the smallest inner ellipse to the largest outer ellipse, center point ($X_{ct}$, $Y_{ct}$), will move. For example, ($X_{ct}$, $Y_{ct}$) is the center of ellipse 212b and ($X_c$, $Y_c$) is the center of the ellipse 212c, and a line segment between ($X_{ct}$, $Y_{ct}$) and ($X_c$, $Y_c$) is in the direction of arrow 214. Then, a t-value can specify an ellipse whose edge includes the source domain coordinates ($X_t$, $Y_t$).

In some examples, the parameter t can take one of the following values:
- a value of 0 (or, more generally, a value $t_0$) at the gradient origin ($X_0$, $Y_0$),
- a value of 1 (or, more generally, a value $t_1$) at the ending center point ($X_c$, $Y_c$),
- a value between 0 and 1 (or, more generally, a value between $t_0$ and $t_1$) for points on a line segment LS of a line L connecting the gradient origin ($X_o$, $Y_o$) and the ending center point ($X_c$, $Y_c$),
- a value less than 0 (or, more generally, a value less than $t_0$) for a point behind the gradient origin ($X_o$, $Y_o$); that is, a point other than the gradient origin ($X_c$, $Y_c$) on a ray starting at the gradient origin and continuing in an opposite direction to a direction specified by starting at the gradient origin ($X_c$, $Y_c$) and ending at the ending center point ($X_c$, $Y_c$), or
- a value greater than 1 (or, more generally, a value greater than $t_1$) for a point beyond the ending point ($X_C$, $Y_C$); that is, a point other than the ending center point ($X_c$, $Y_c$) on a ray starting at the ending center point ($X_c$, $Y_c$) and continuing in a direction specified by starting at the gradient origin ($X_o$, $Y_o$) and ending at the ending center point ($X_c$, $Y_c$).

As coordinates ($X'_T$, $Y'_T$) mapped into source domain 210 may not lie on the line L connecting the gradient origin ($X_o$, $Y_o$) and the ending center point ($X_c$, $Y_c$), the coordinates ($X_t$, $Y_t$) can be associated with a mapped ellipse (or circle) that is centered at the moving center point ($X_{ct}$, $Y_{ct}$) and has radii $R_x$ and $R_y$, where ($X_{ct}$, $Y_{ct}$) lines on line segment LS (or more generally, on line L) between ($X_o$, $Y_o$) and ($X_c$, $Y_c$), and where the mapped ellipse (or circle) passes through the coordinates ($X_t$, $Y_t$). Then, the t-value for the mapped coordinates ($X_t$, $Y_t$) can be based on a distance from the gradient origin ($X_o$, $Y_o$) to a point where the mapped ellipse (or circle) intersects a line that includes the line segment from ($X_o$, $Y_o$) to ($X_c$, $Y_c$).

In the example shown in FIG. 2A, the mapped ellipse intersects a line having the line segment from ($X_o$, $Y_o$) to ($X_c$, $Y_c$) at a point somewhat beyond the ending center point ($X_c$, $Y_c$). Then, as ($X_c$, $Y_c$) corresponds to a t-value of 1 in this example, the t-value for the coordinates ($X_t$, $Y_t$) mapped into source domain 210 is greater than one.

Color blend 222 shows a mapping between t-values in the range t=0 to a value Tprior that is just less than prior to 1; e.g., t=Tprior=1−SMLNUM, e.g., 0<SMLNUM≤$10^{-4}$. In an example where SMLNUM equals $10^{-4}$, then Tprior equals 0.9999. Colors 224 show that the value t=0 is associated with a black color, and the value t=Tprior is associated with a white color, and intermediate values of t between 0 and Tprior are associated with gray colors that interpolate between the black color at t=0 and the white color at t=Tprior. In some examples where Tprior=1−SMLNUM, a fractional portion of a t-value can be used to determine a color value using color blend 222; e.g., if t=1.75, then the fractional portion of t=0.75, and use of color blend 222 for 0.75 would lead to a relatively-light shade of gray.

When Algorithm A is selected for use in method 100 or another method for radial gradient rendering, Equations (1)-(11) below can be used to determine t-values for Algorithm A.

$$At^2 + Bt + C = 0 \tag{1}$$

$$A = r_x^2 r_y^2 - r_y^2(X_c - X_0)^2 - r_x^2(Y_c - Y_0)^2 \tag{2}$$

$$B = 2r_y^2(X_c - X_0)(x - X_0) + 2r_x^2(Y_c - Y_0)(y - Y_0) \tag{3}$$

$$C = -r_y^2(x - X_0)^2 - r_x^2(y - Y_0)^2 \tag{4}$$

$$t = \frac{-C}{B} \text{ when } A = 0 \tag{5}$$

$$t^2 = \frac{B}{A}t + \frac{C}{A} = 0 \text{ when } A \neq 0 \tag{6}$$

$$t^2 + b't + c = 0 \text{ where } b' = \frac{B}{A} \text{ and } c = \frac{C}{A} \text{ when } A \neq 0 \tag{7}$$

$$b' = B1 * XOFF + B2 * YOFF, \text{ where:} \tag{8}$$

$$B1 = \frac{2r_y^2(X_c - X_0)}{A}, XOFF = (x - X_0),$$

$$B2 = \frac{2r_x^2(Y_c - Y_0)}{A}, YOFF = (y - Y_0),$$

$$c = C1 * XOFF^2 + C2 * YOFF^2, \text{ where:} \tag{9}$$

$$C1 = -\frac{r_y^2}{A}, XOFF = (x - X_0), C2 = -\frac{r_x^2}{A}, YOFF = (y - Y_0),$$

$$t = \frac{-b' - \sqrt{b'^2 - 4c}}{2} \text{ when } A \neq 0 \tag{10}$$

$$t' = \frac{-b' + \sqrt{b'^2 - 4c}}{2} \text{ when } A \neq 0 \tag{11}$$

Equation (1) shows the quadratic equation for determining t-values using Algorithm A. Equation (2) is an equation for determining a quadratic coefficient A for Equation (1), Equation (3) is an equation for determining a linear coefficient B for Equation (1), and Equation (4) is an equation for determining a constant value C for Equation (1). Equation (5) indicates determination of a single root value for t if A=0 (i.e., when Equation (1) degenerates to a linear equation). Equation (6) is a rewritten version of Equation (1) where the A coefficient has been divided through Equation (1), and thus is only calculable if A≠0. Equation (7) replaces the B/A and C/A terms of Equation (6) with corresponding b' and c values. Equations (8) and (9) are equations for the respective b' and c values based on B1, B2, C1, C2, XOFF, and YOFF values, and include expressions for the B1, B2, C1, C2, XOFF, and YOFF values. Equations (10) and (11) express the two roots of Equation (1) when A≠0. Equations (1)-(11) are expressed in terms of the above-mentioned: gradient origin ($X_o$, $Y_o$), ending center point of the outer/ending circle or ellipse ($X_c$, $Y_c$) having radius $r_x$, along the X-axis and radius $r_y$, along the Y-axis, and ($X_t$, $Y_t$) coordinates, where the ($X_t$, $Y_t$) coordinates are expressed in Equations (1)-(11) as corresponding values (x, y).

Then, the radial gradient module can use method 100 and Equations (1)-(11) to carry out Algorithm A. For Algorithm A, the radial gradient module can, at block 110 of method 100 determine as inputs one or more of: the gradient origin $(X_o, Y_o)$, the moving center point $(X_{ct}, Y_{ct})$, the ending center point $(X_c, Y_c)$, radius $r_x$, and radius $r_y$. In some cases, one or more of the inputs at block 110 can signal to the radial gradient module that radial gradient rendering is to be performed utilizing Algorithm A. Then, the radial gradient module can carry out blocks 120 and 130 of method 100 to determine a transferring region of an image, to determine Gx×Gy grids of pixels within the transferring region, and determine a coarse pixel for each Gx×Gy grid of pixels within the transferring region.

Continuing to carry out Algorithm A, the radial gradient module can carry out block 140 to determine the $(X_t, Y_t)$ coordinates in the source domain that correspond to each coarse pixel in the destination domain. Then, the radial gradient module can use Equations (1)-(11) operating on the inputs provided at block 110 and the $(X_t, Y_t)$ values to determine the corresponding t-values for each coarse pixel. The radial gradient module can carry out block 150 to detect edges within the Gx×Gy grids of the transferring region. At block 160, the radial gradient module can perform fine grid processing for each Gx×Gy grid having an edge detected at block 150. The fine grid processing involves: determining $(X_t, Y_t)$ coordinate values in the source domain for each destination-domain pixel subject to fine grid processing and carrying out Algorithm A to determine corresponding t-values by using Equations (1)-(11) operating on the inputs provided at block 110 and the $(X_t, Y_t)$ values for each destination-domain pixel subject to fine grid processing.

Then, while carrying out Algorithm A, the radial gradient module can carry out block 170 to determine color values based on the t-values calculated for each coarse grid pixel and for each pixel subject to fine grid processing using a color blend, such as color blend 222, applied to the t-values. In some examples, data about the color blend is provided at block 110 of method 100. Then, the radial gradient module can carry out block 180 to render the image including the transferring region.

Figure 2B:
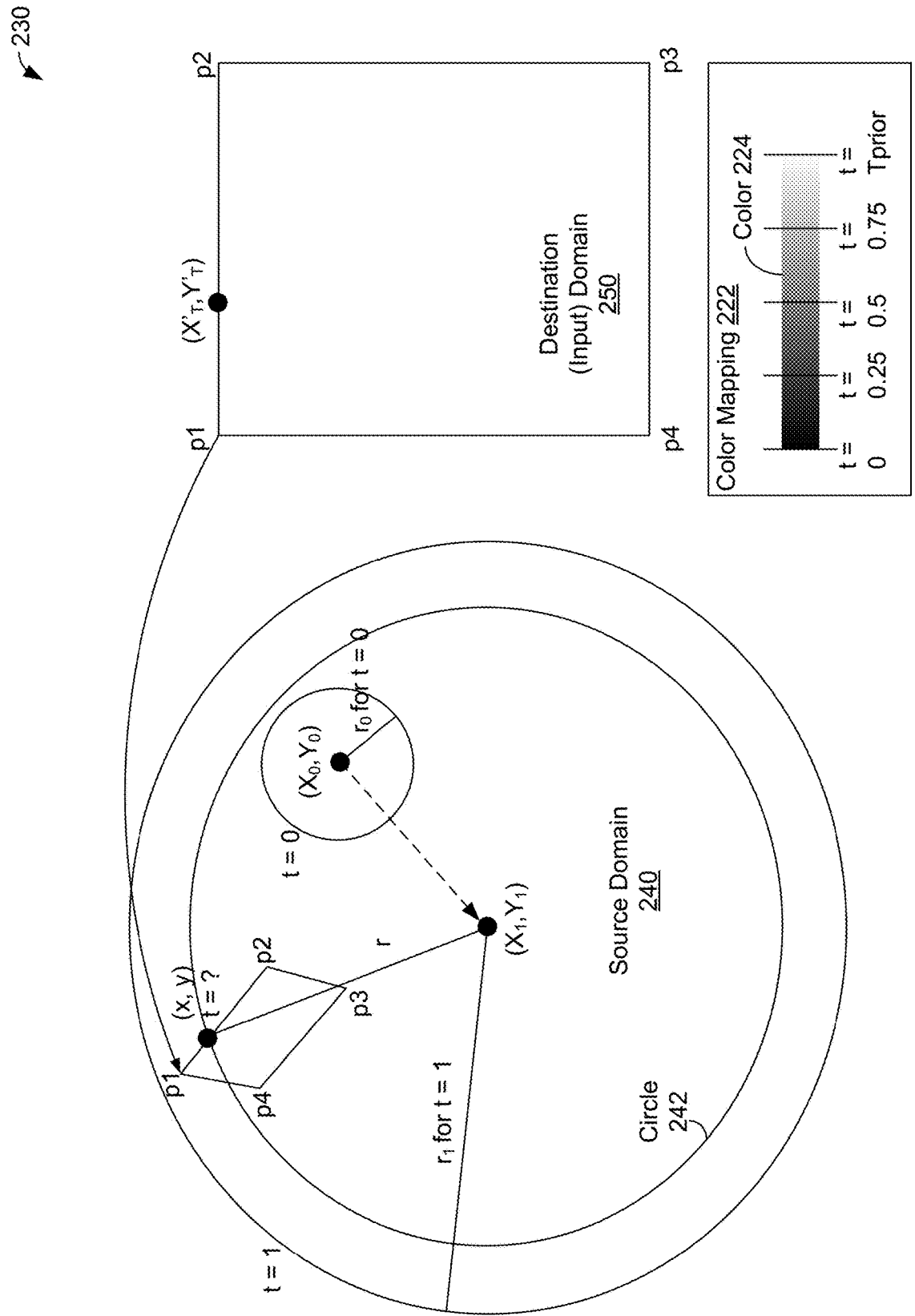
FIG. 2B is another diagram illustrating coordinates in a destination domain being mapped into coordinates in a source domain for radial gradient rendering, according to an example embodiment.

FIG. 2B includes diagram 230 illustrating coordinates $(X'_T, Y'_T)$ in destination domain 250 being mapped into coordinates (x, y) in source domain 240 for radial gradient rendering, according to an example embodiment. Destination domain 250 can be a frame of pixels related to an image, such as discussed above in the context of destination domain 220. Diagram 230 can be associated with Algorithm B for radial gradient rendering. Algorithm B uses radial gradients to define color blend 222 that starts at a circle about gradient origin $(X_o, Y_o)$ and ends at an ending circle for shading images using radial gradient rendering.

Destination domain 250 can include a rectangular image defined, in this example, by four corner points p1, p2, p3, and p4. FIG. 2B shows the coordinates $(X'_T, Y'_T)$ are along a line forming a top of the rectangular image between corner points p1 and p2. After coordinates $(X'_T, Y'_T)$ in destination domain 250 are mapped to coordinates $(X_T, Y_T)$ in source domain 240, Algorithm B involves determining a t-value indicating a distance along a line segment from a gradient origin $(X_o, Y_o)$ centering a starting circle having a radius $r_0$ and ending at an ending point $(X_1, Y_1)$ centering an ending circle having a radius $r_1$, where the starting circle is specified by and associated with a t-value equal to 0, and the ending circle is specified by and associated with a t-value equal to 1. As another example, an unknown t-value between 0 and 1 specifies circle 242 in source domain 240 whose edge includes the source domain coordinates $(X_T, Y_T)$.

In some examples, the parameter t can take one of the following values:

- a value of 0 (or, more generally, a value $t_0$) at the gradient origin $(X_o, Y_o)$,
- a value of 1 (or, more generally, a value $t_1$) at the ending point $(X_1, Y_1)$,
- a value between 0 and 1 (or, more generally, a value between $t_0$ and $t_1$) for points on a line segment LS of a line L connecting and between the gradient origin $(X_o, Y_o)$ and the ending point $(X_1, Y_1)$,
- a value less than 0 (or, more generally, a value less than $t_0$) for a point behind the gradient origin $(X_o, Y_o)$; that is, a point other than the gradient origin $(X_o, Y_o)$ on a ray starting at the gradient origin $(X_o, Y_o)$ and continuing in an opposite direction to a direction specified by starting at the gradient origin $(X_o, Y_o)$ and ending at the ending point $(X_1, Y_1)$, or
- a value greater than 1 (or, more generally, a value greater than $t_1$) for a point beyond the ending point $(X_1, Y_1)$; that is, a point other than the ending point $(X_1, Y_1)$ on a ray starting at the ending point $(X_1, Y_1)$ and continuing in a direction specified by starting at the gradient origin $(X_o, Y_o)$ and ending at the ending point $(X_1, Y_1)$.

In the example shown in FIG. 2B, the mapped circle intersects a line having the line segment from $(X_o, Y_o)$ to $(X_1, Y_1)$ at a point somewhat beyond $(X_1, Y_1)$. For this example, $(X_1, Y_1)$ corresponds to a t-value of 1.0, so the t-value for the coordinates (X, Y) mapped into source domain 240 is larger than 1.0.

Color blend 222 shows a mapping between t-values in the range t=0 to t=Tprior to colors 224. Color blends, such as color blend 222, are discussed in more detail above in the context of FIG. 2A.

When Algorithm B is selected for use in method 100 or another method for radial gradient rendering, Equations (12)-(23) below can be used to determine t-values for Algorithm B.

$$s = \frac{t - t_0}{t_1 - t_0} \qquad (12)$$

$$t = s(t_1 - t_0) + t_0 \qquad (12A)$$

$$As^2 + Bs + C = 0 \qquad (13)$$

$$A = (r_1 - r_0)^2 - (X_1 - X_0)^2 - (Y_1 - Y_0)^2 \qquad (14)$$

$$B = 2r_0(r_1 - r_0) + 2(x - X_0)(X_1 - X_0) + 2(y - Y_o)(Y_1 - Y_0) \qquad (15)$$

$$C = r_0^2 - (x - X_0)^2 - (y - Y_0)^2 \qquad (16)$$

$$s = \frac{-C}{B} \text{ when } A = 0 \qquad (17)$$

$$s^2 = \frac{B}{A}s + \frac{C}{A} = 0 \text{ when } A \neq 0 \qquad (18)$$

$$s^2 = b's + c = 0 \text{ where } b' = \frac{B}{A} \text{ and} \qquad (19)$$

$$c = \frac{C}{A} \text{ when } A \neq 0$$

$$b' = B0 + B1 * XOFF + B2 * YOFF, \text{ where:} \qquad (20)$$

-continued $$B0 = \frac{2r_0(r_1 - r_0)}{A}, B1 = \frac{2(X_1 - X_0)}{A},$$

$$XOFF = (x - X_0), B2 = \frac{2(Y_1 - Y_0)}{A},$$

$$YOFF = (y - Y_0), \text{ and } E = \frac{-r_0}{r_1 - r_0}$$

$$c = C0 * C1 * XOFF^2 + C2 * YOFF^2, \text{ where:} \quad (21)$$

$$C0 = \frac{r_0^2}{A}, C1 = -\frac{1}{A}, \text{ and } C2 = -\frac{1}{A},$$

$$s = \frac{-b' - \sqrt{b'^2 - 4c}}{2} \text{ when } A \neq 0 \quad (22)$$

$$s' = \frac{-b' + \sqrt{b'^2 - 4c}}{2} \text{ when } A \neq 0 \quad (23)$$

Equation (12) expresses a parameter s in terms of the parameter t, a value $t_0$ associated with the starting circle, and a value $t_1$ associated with the ending circle. The parameter s varies linearly between 0.0 and 1.0 as t varies across the domain from $t_0$ to $t_1$; that is, Equation (12) can be used to map t-values into "s-values", or values of the parameter s. In the case shown in FIG. 2B, $t_0$=0 and $t_1$=1. Equation (12A) expresses the parameter t in terms of the parameter s and values $t_0$ and $t_1$; that is, Equation (12A) can be used to map s-values into t-values. Then, the parameter s replaces the parameter t in Equations (13)-(23).

Equation (13) is a quadratic equation for determining s-values using Algorithm B. Equation (14) is an equation for determining a quadratic coefficient A for Equation (13), Equation (15) is an equation for determining a linear coefficient B for Equation (13), and Equation (16) is an equation for determining a constant value C for Equation (13). Equation (17) indicates determination of a single root value for s if A=0 (i.e., when Equation (13) degenerates to a linear equation). Equation (18) is a rewritten version of Equation (13) where the A coefficient has been divided through Equation (13), and thus is only calculable if A≠0. Equation (19) replaces the B/A and C/A terms of Equation (18) with corresponding b' and c values. Equations (20) and (21) are equations for the respective b' and c values based on B0, B1, B2, C0, C1, C2, XOFF, and YOFF values and include expressions for the B0, B1, B2, C0, C1, C2, XOFF, and YOFF values. Equation (20) also includes an expression for an E value, which is discussed below. Equations (22) and (23) express the two roots of Equation (13) if A≠0. Equations (12)-(23) are shown as ultimately being expressed in terms of the above-mentioned: gradient origin ($X_o$, $Y_o$) at a center of the staring circle having radius $r_0$, center point of the ending circle ($x_c$, $y_c$) having radius $r_1$ and ($x_1$, $y_1$) coordinates mapped in from destination domain 220.

Then, the radial gradient module can use method 100 and Equations (12)-(23) to carry out Algorithm B. The radial gradient module can determine as inputs at block 110 of method 100: the gradient origin ($X_o$, $Y_o$), the starting circle radius $r_0$, the center point of the ending circle ($X_1$, $Y_1$), and the ending circle radius $r_1$ for Algorithm B. In some cases, one or more of the inputs at block 110 can signal to the radial gradient module that radial gradient rendering is to be performed utilizing Algorithm B. Then, the radial gradient module can carry out blocks 120 and 130 of method 100 to determine a transferring region of an image, to determine GxxGy grids of pixels within the transferring region, and determine a coarse pixel for each GxxGy grid of pixels within the transferring region.

Continuing to carry out Algorithm B, the radial gradient module can carry out block 140 to determine the (x, y) coordinates in the source domain that correspond to each coarse pixel in the destination domain. Then, the radial gradient module can use Equations (12)-(23) operating on the inputs provided at block 110 and the (x, y) values to determine the corresponding s-values for each coarse pixel. The radial gradient module can carry out block 150 to detect edges within the GxxGy grids of the transferring region. At block 160, the radial gradient module can perform fine grid processing for each GxxGy grid having an edge detected at block 150. The fine grid processing involves: determining (x, y) coordinate values in the source domain for each destination-domain pixel subject to fine grid processing and carrying out Algorithm B to determine corresponding t-values by using Equations (12)-(23) operating on the inputs provided at block 110 and the (X, Y) values for each destination-domain pixel subject to fine grid processing.

Then, while carrying out Algorithm B, the radial gradient module can carry out block 170 to determine color values based on the t-values calculated for each coarse grid pixel and for each pixel subject to fine grid processing using a color blend, such as color blend 222, applied to the s-values (or t-values). In some examples, data about the color blend is provided at block 110 of method 100. Then, the radial gradient module can carry out block 180 to render the image including the transferring region.

Equations (12)-(23) related to the roots of the quadratic equation for Algorithm B use somewhat different terms than used in Equations (1)-(11) for Algorithm A. However, Equations (12)-(23) use only constants and two variable terms XOFF and YOFF, as well as two terms not used in Equations (1)-(11)—constants B0 and C0. In addition to constants B0 and C0, Algorithm B uses an additional term E. Term E is discussed below in the context of Table 2.

For Algorithm A, t-values greater than or equal to 1 or less than zero can be processed using the application of a spread processing technique discussed herein and illustrated using pseudocode in Table 3. For at least Algorithm B, a root selection technique can be used to select a correct root for use as a t-value and/or corresponding s-value, as discussed below in the context of Table 2.

Printing System Examples

Figure 3:
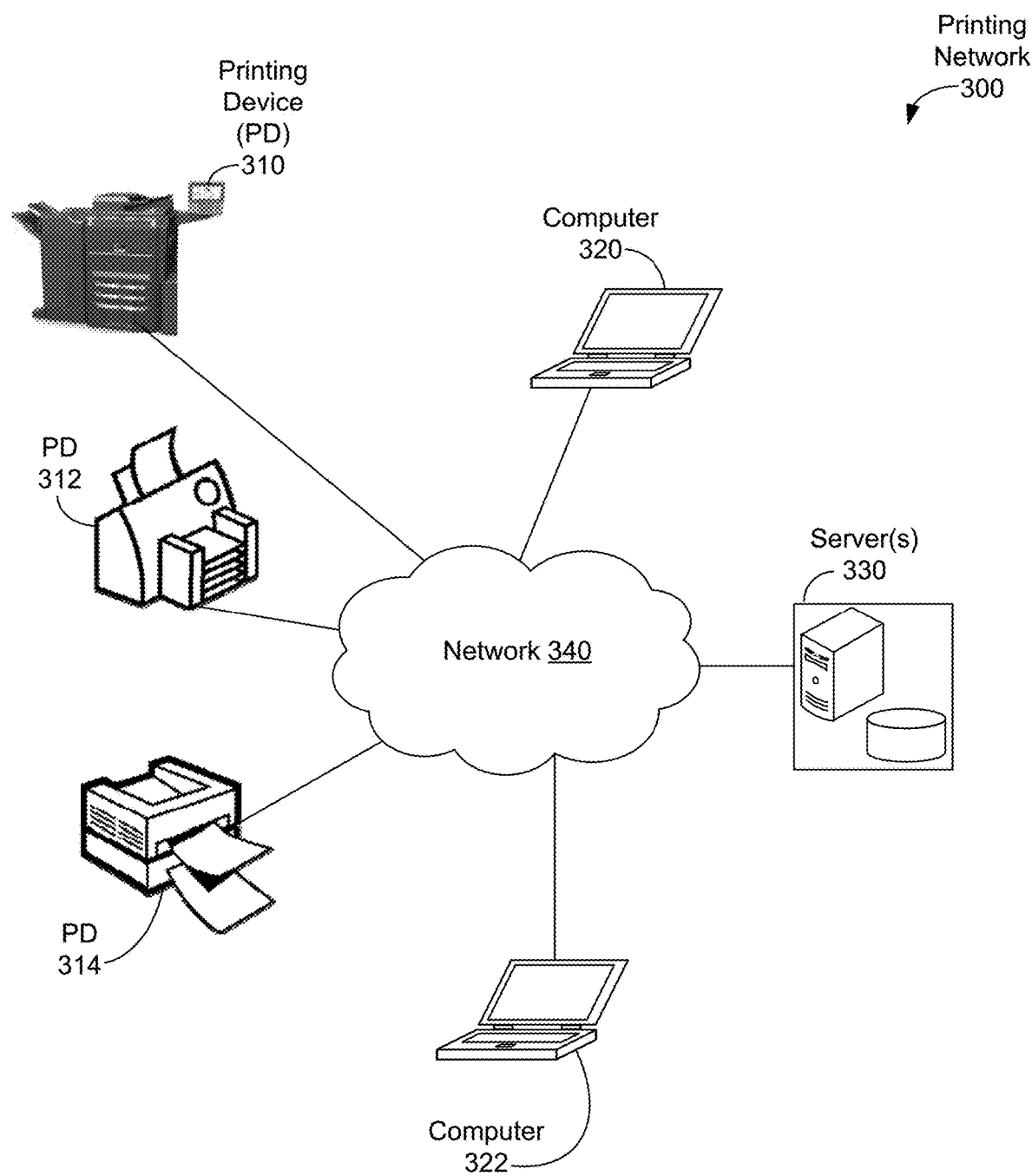
FIG. 3 is a diagram of a printing network, according to an example embodiment.

FIG. 3 is a diagram illustrating printing network 300, according to an example embodiment. Printing network 300 includes printing devices (PDs) 310, 312, 314, computers 320, 322, and one or more servers 330, all interconnected using network 340. In some examples, printing network 300 can have more, fewer, and/or different types of computing devices, servers, and/or printing devices than indicated in FIG. 3.

Printing devices 310, 312, 314 can include devices configured to scan, print, copy, e-mail, account for, communicate and/or otherwise process documents and/or files that are originally available either on paper or electronically. After processing by one or more of printing devices 310, 312, 314, the documents and/or files can be subsequently available either on paper or electronically, as requested. That is, printing devices 310, 312, 314 can process a paper document PD or electronic document ED by at least: creating an electronic document ED1 representing the contents of PD (e.g., scan PD to create ED1), making one or more paper copies of PD, printing one or more copies of ED and/or ED1 on one or more types of paper, make one or more electronic copies of ED and/or ED1, change a format of ED and/or ED1 (e.g., perform OCR scanning, convert a file format used to store ED and/or ED1), maintain remotely-accessible storage (e.g., a document box) enabling other devices than printing devices 310, 312, 314 to use/access ED and/or ED1, and/or communicate the contents of ED and/or ED1 to/from another device.

A document box can be storage allocated to an entity (e.g., a user, an administrator, a company, another type of entity) on a printing device, print server, or another device so the entity can keep and maintain documents, files, and/or other data. In some embodiments, the document box can be accompanied by and/or include storage for personal data, such as address book and/or device accounting storage. The document box, address book, and device accounting storage can store one or more documents, files, personal data, and/or other data, such as contacts, usage and usage limits.

In some embodiments, printing devices 310, 312, 314 can perform other tasks and/or other processing as well. Printing devices 310, 312, 314 can include products from various manufacturers with variations in color, speed, computing power, functionality, network connectivity, and/or other features.

In an example embodiment, some or all printing devices 310, 312, 314 can be connected to network 340 through one or more, possibly different, network protocols. Data can be transmitted between printing devices 310, 312, 314, computers 320, 322, and server(s) 330 over wired and/or wireless links between computers, computing devices, printing devices, servers and network 340. The format of each respective data transmission between devices in printing network 300 can include one or more of a variety of different formats including: text formats, image formats, extensible mark-up language (XML), Simple Network Maintenance Protocol (SNMP) formats, database tables, a flat file format, or another format.

Communications between the computers, computing devices, servers, and printing devices can include: computers 320, 322, and/or server(s) 330 sending data for print jobs and/or print job portions for printing to printing devices 310, 312, 314 and printing devices 310, 312, 314 sending alert, status, error, device information, colorant-usage information, maintenance-event information, and/or other messages to computers 320, 322, and/or server(s) 330 to inform other devices about colorant-usage, maintenance, error, and/or other conditions of the printing devices; e.g., idle, printing, sleeping, paper jam, low or out of paper, low or out of toner/ink, etc. Other communications between computers 320, 322, and/or server(s) 330 are possible as well, such as, but not limited to, requests to render images using radial gradient coloring and related responses to the requests, are possible as well.

Computers 320, 322 can create, obtain, update, display, and/or delete data (and perhaps related software) for configurations of printing network 300. Example data for configurations of printing network 300, includes, but is not limited to: data for configuring devices in printing network 300; e.g., data for printing devices 310, 312, 314, data for configuring network protocols (e.g., FTP, HTTP, JMS, KPDL, PCT, PDF, SOAP, SMS, SMTP, SNMP, TCP/IP, UDP, LDAP, MQ, and/or other protocols), access-management related data for clients and/or servers; (e.g., passwords, signatures, credentials, certificates, subscriptions, licenses, and/or tokens related to accessing part or all of the functionality of network 340 and/or cloud-based services, software and/or solutions) and data for customizing, configuring and managing applications on devices/servers of printing network 300. In particular, computers 320, 322 can provide displays related to maintaining printing devices, including displays related to colorant usage for printing devices and/or predictions related to colorant usage, where the printing devices can include but are not limited to printing devices 310, 312, 314.

One or more servers 330 can store, update, delete, retrieve, and provide functionality for learning patterns, trends, and/or features about data related to printing network 300, particularly related to printing devices, such as printing devices 310, 312, 314. Based on the learned patterns, trends, and/or features, machine learning server(s) 330 can generate outputs, such as predictions about the printing devices including but not limited to predictions of colorant usage by the printing devices. The data stored on server(s) 330 can include device information, colorant-usage information, maintenance-event information, and/or other information related to devices related to printing network 300. The stored data can be retrieved from server(s) 330 in response to a received query (or queries) requesting information about specific device(s), colorant usage, maintenance events, and/or other information.

In some embodiments, server(s) 330 can provide additional services as well (or instead), such as services related to some or all of the functionality for one or more document solutions and managed print services; e.g., functionality for accounting and maintenance of solutions and services, functionality for document workflows, such as processing forms, hard-copy signatures, client authentication/access functions, user interface functionality, local and/or remote network based storage management involving devices in printing network 300. For example, server(s) 330 additionally can provide functionality related to a print server. A print server can process jobs (e.g., spool job-related data, route jobs, provide user and/or server-related accounting for jobs, verify/enforce authentication and authorization rules related to jobs) and store data related to printing devices of printing network 300. The jobs processed by a print server can include, but are not limited to, print jobs/printing requests, communicating documents, files, and/or related data (e.g., data in e-mails, SMS messages, etc.), document and file-related requests (e.g., creating, formatting, scanning, reformatting, converting, accessing, updating and/or deleting one or more documents and files), jobs for document workflow, and/or processing information about errors/complaints about the printing device (e.g., creating, reviewing, updating, assigning, reassigning, communicating, and/or deleting trouble tickets related to errors/complaints about printing (and perhaps other) devices 310, 312, 314. The data can include data used in processing jobs (e.g., spooled data for print jobs, files for file-related requests, etc.), access-management related data, primary identification characteristics and/or model-dependent information about printing devices served by server(s) 330 and perhaps other data.

Figure 4:
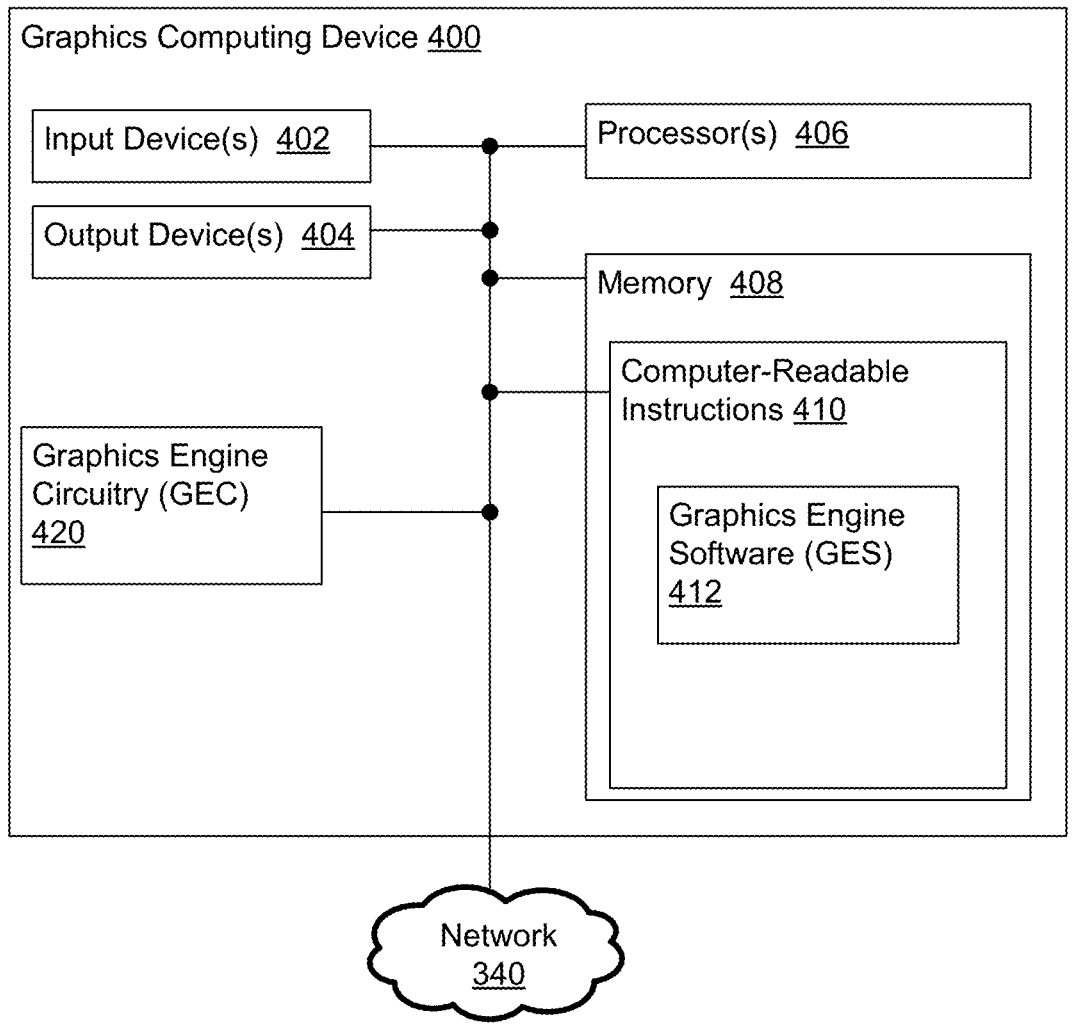
FIG. 4 is a block diagram illustrating a computing device, according to an example embodiment.

FIG. 4 is a schematic block diagram illustrating graphics computing device 400, according to an example embodiment. Graphics computing device 400 can include one or more input devices 402, one or more output devices 404, one or more processors 406, memory 408, and graphics engine circuitry 420.

In some embodiments, graphics computing device 400, including graphics engine circuitry 420, can be configured to perform one or more herein-described functions of and/or functions related to: methods 100, 700, 800, 900, 1000, 1400, 1600, 1700, 1800, Algorithm A, Algorithm B, Equations (1)-(31), printing network 300, printing devices 310, 312, 314, computers 320, 322, server(s) 330, network 340, images 600, 1210, 1220, 1510, 1520, diagrams 200, 230, 1100, and/or scenario 1300.

Input devices 402 can include user input devices, network input devices, sensors, and/or other types of input devices. For example, input devices 402 can include user input devices such as a touch screen, a keyboard, a keypad, a computer mouse, a track ball, a joystick, a camera, a voice recognition module, and/or other similar devices. Network input devices can include wired network receivers and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network, such as wired portions of network 340, and/or wireless network receivers and/or transceivers, such as a Bluetooth transceiver, a Zigbee transceiver, a Wi-Fi transceiver, a WiMAX transceiver, a wireless wide-area network (WWAN) transceiver and/or other similar types of wireless transceivers configurable to communicate via a wireless network, such as wireless portions of network 340. Sensors can include devices configured to measure conditions in an environment of graphics computing device 400 and provide data about that environment, such data including, but not limited to, location data, velocity (speed, direction) data, acceleration data, and other data about the environment for graphics computing device 400. Example sensors include, but are not limited to, GPS sensor(s), location sensors(s), gyroscope(s), accelerometer(s), magnetometer(s), camera(s), light sensor(s), infrared sensor(s), and microphone(s). Other input devices 402 are possible as well.

Output devices 404 can include user display devices, audible output devices, network output devices, and/or other types of output devices. User display devices can include one or more printing components, liquid crystal displays (LCD), light emitting diodes (LEDs), lasers, displays using digital light processing (DLP) technology, cathode ray tubes (CRT), light bulbs, and/or other similar devices. Audible output devices can include a speaker, speaker jack, audio output port, audio output device, headphones, earphones, and/or other similar devices. Network output devices can include wired network transmitters and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network, such as wired portions of network 340, and/or wireless network transmitters and/or transceivers, such as a Bluetooth transceiver, a Zigbee transceiver, a Wi-Fi transceiver, a WiMAX transceiver, a wireless wide-area network (WWAN) transceiver and/or other similar types of wireless transceivers configurable to communicate via a wireless network, such as wireless portions of network 340. Other types of output devices can include, but are not limited to, vibration devices, haptic feedback devices, and non-visible light emission devices; e.g., devices that emit infra-red or ultra-violet light. Other output devices 404 are possible as well.

Processors 406 can include one or more general purpose processors, central processing units (CPUs), CPU cores, and/or one or more special purpose processors (e.g., graphics processing units (GPUs), digital signal processors (DSPs), field programmable gated arrays (FPGAs), application specific integrated circuits (ASICs), etc.). Processors 406 can be configured to execute computer-readable instructions 410 that are contained in memory 408 and/or other instructions as described herein.

Memory 408 can include one or more computer-readable storage media configured to store data and/or instructions that can be read and/or accessed by at least one of processors 406. The one or more computer-readable storage media can include one or more volatile and/or non-volatile storage components, such as optical, magnetic, organic or other memory or disc storage, which can be integrated in whole or in part with at least one of processors 406. The computer-readable storage media can include one or more components that store data for short periods of time like register memories, processor caches, and/or random access memories (RAM). The computer-readable storage media can include non-transitory computer readable media that stores program code and/or data for longer periods of time, such as secondary or persistent long term storage; for example, read only memory (ROM), optical or magnetic disks, compact-disc read only memory (CD-ROM). In some embodiments, memory 408 can be implemented using a single physical device (e.g., one optical, magnetic, organic or other memory or disk storage unit), while in other embodiments, memory 408 can be implemented using two or more physical devices.

In particular, memory 408 can store computer-readable instructions 410 that, when executed by processor(s) 406, can cause a computing device to perform functions, such as but not limited to, some or all of at least the herein-described functionality of devices, networks, methods, diagrams, images, equations, and/or scenarios. In some embodiments, computer-readable instructions 410 can include at least instructions for graphics engine software (GES) 412. Graphics service software 412 can include software and/or firmware for providing graphics-related functionality; e.g., some or all of at least the functionality described in the context of method 100, Algorithm A, Algorithm B, Equations (1)-(31), and/or graphics engine circuitry 420.

Example Radial Gradient Modules

Figure 5:
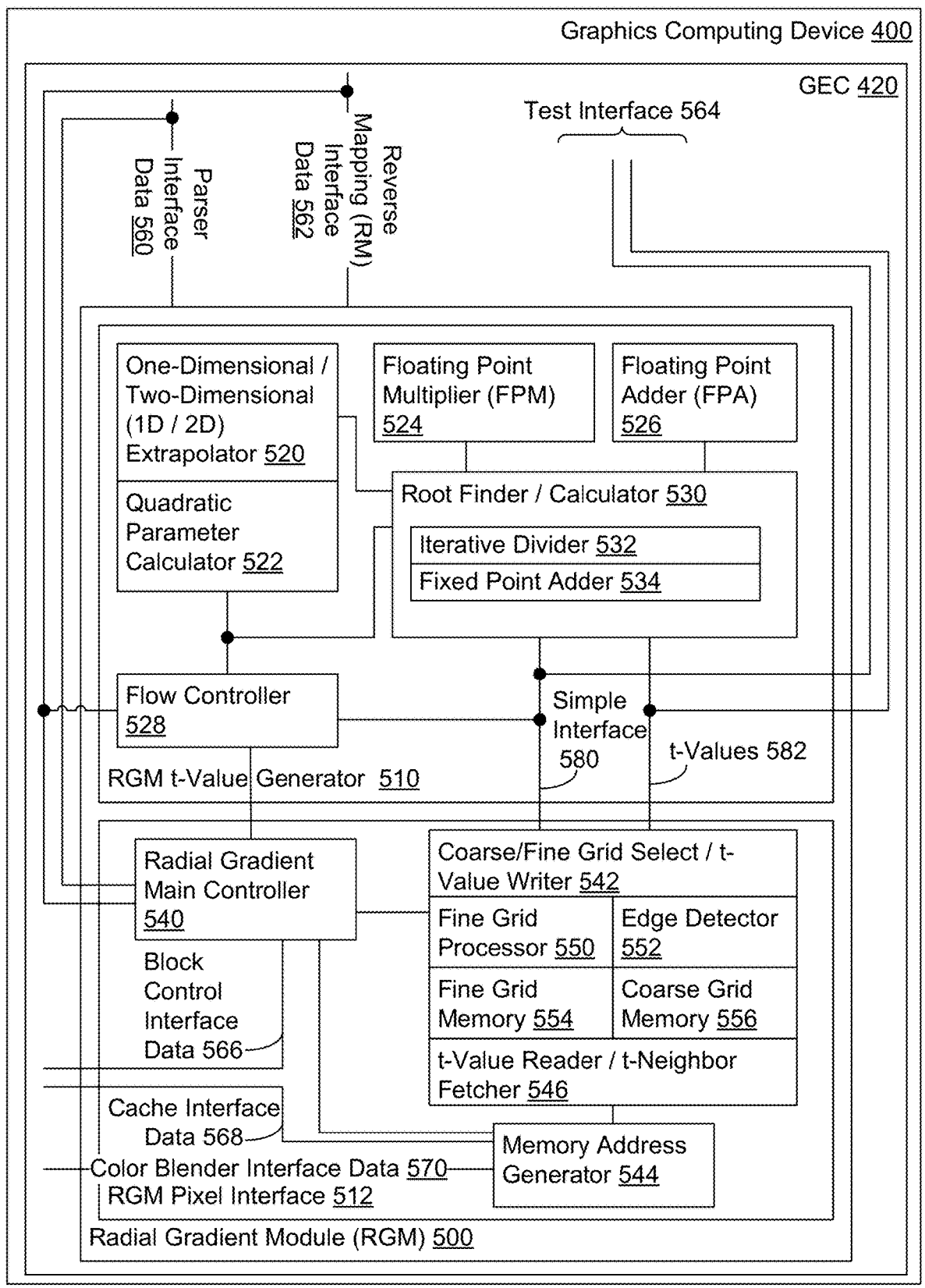
FIG. 5 is a block diagram illustrating graphics engine circuitry of the computing device shown in FIG. 4, according to an example embodiment.

FIG. 5 is a block diagram illustrating graphics engine circuitry (GEC) 420 of graphics computing device 400, according to an example embodiment. In some implementations, graphics engine circuitry 420 significantly accelerates radial gradient rendering over software-only approaches. Radial gradient rendering utilizes a number of computations, including radial-to-Cartesian coordinate transformation and 2D interpolation. These calculations can be done on a per-pixel basis, leading to a large amount of processing during rendering. In a software-only approach, a print job or other rendering request containing radial gradient features causes switching between software and hardware, stalling an imaging pipeline. Graphics engine circuitry 420, which includes dedicated hardware optimized for performing computationally intensive calculations used in radial gradient rendering, can eliminate switching between hardware and software rendering modes. Graphics engine circuitry 420 can also significantly improve radial gradient rendering performance; e.g., while printing an image rendered using radial gradient rendering to paper or another medium.

FIG. 5 shows that graphics computing device 400 includes graphics engine circuitry 420, which in turn includes radial gradient module (RGM) 500. Radial gradient module 500 includes RGM t-value generator 510 and RGM pixel interface 512. RGM t-value generator 510 includes 1D/2D extrapolator 520, quadratic parameter calculator 522, floating point multiplier (FPM) 524, floating point adder (FPA) 526, flow controller 528, and root finder/calculator 530, which in turn includes iterative divider 532, and fixed point adder 534. RGM pixel interface 512 includes radial gradient main controller 540, coarse/fine grid select/t-value writer 542, memory address generator 544, t-value reader/t-neighbor fetcher 546, fine grid processor 550, edge detector 552, fine grid memory 554 and coarse grid memory 556.

RGM t-value generator 510 and RGM pixel interface 512 together provide parser interface data 560 and reverse mapping (RM) interface data 562 to graphics computing device 400 and/or graphics engine circuitry 420. RGM t-value generator 510 also provides test interface 564 to access data on simple interface 580 and t-values 582 communicated between RGM t-value generator 510 and RGM pixel interface 512. RGM pixel interface 512 also provides block control interface data 566, cache interface data 568, and color blender interface data 570 to graphics computing device 400 and/or graphics engine circuitry 420. In other examples, radial gradient module 500 can include more, fewer, and/or different components and/or interfaces to those shown in FIG. 5.

In some embodiments, configuration and initialization values are programmed for radial gradient module 500 via radial gradient graphics and/or other orders, such as transfer orders. For example, radial gradient rendering for pattern transfers using radial gradient module 500 is enabled with a graphics order O1 that sets values for radial gradient rendering. Radial gradient processing is then active for one transfer order TO1 after order O1 and then automatically deactivated after transfer order TO1 completes, regardless of whether or not TO1 is a radial gradient graphics transfer order (i.e., a transfer order with a non-compressed pattern or opacity mask). The operands of O1 can include parameters passed to radial gradient module 500 for radial gradient processing. TO1 is then processed normally generating the radial gradient output for a pattern or opacity mask, and completes with either a done condition indicating successful radial gradient rendering or an error condition indicating unsuccessful radial gradient rendering.

RGM t-value generator 510 can calculate t-values and/or s-values for each destination pixel using 1D and 2D extrapolation, quadratic parameter calculations, the Newton-Raphson technique, and iterative division. RGM t-value generator 510 can also reserve memory for storing part or all of an image rendered using radial gradient rendering and can coordinate color processing of pixels during radial gradient rendering on a per-pixel, a per-line, and/or a per-column basis. A line can be a horizontal array of pixels, such as part or all of one or more rows of pixels of an image. A column can be a vertical array of pixels, such as part or all of one or more columns of pixels of an image. In some examples, a line of pixels can be a line of cells or blocks of pixels. A NR×NC cell or block of pixels can be a 2D grid of pixels having NR rows and NC columns; e.g., a 4×4 cell of pixels is a grid of pixels having 4 rows and 4 columns for a total of 16 pixels.

RGM t-value generator 510 can schedule calculations for 1D or 2D extrapolations, quadratic equation parameter calculations, calculations for the Newton-Raphson technique, iterative division calculations, and/or other calculations performed during radial gradient rendering. In particular, RGM t-value generator 510 can schedule calculations to performed using some or all of 1D/2D extrapolator 520, quadratic parameter calculator 522, floating point multiplier 524, floating point adder (FPA) 526, flow controller 528, root finder/calculator 530, iterative divider 532, and fixed point adder 534. In addition, RGM t-value generator 510 can handle input flow control of reverse mapping interface data 562 as well as the output flow control of t-values 582 to RGM pixel interface 512.

1D/2D extrapolator 520 can provide initial values via extrapolation techniques of roots of quadratic equations such as Equations (1) and (13); that is, where the roots are t-values and s-values. The initial values can be used to reduce a number of root-finding iterations used to find the roots of quadratic equations such as Equations (1) and (13); e.g., using the Newton-Raphson technique for finding roots of equations. Quadratic parameter calculator 522 can determine parameters for expressing and solving quadratic equations. Floating point multiplier 524 and floating point adder 526 can respectively perform multiplication operations and addition operations on floating point numbers for radial gradient module 500.

Flow controller 528 can coordinate communication of data between components of graphics engine circuitry 420 and data communication to components outside of graphics engine circuitry 420; e.g., data communicated as reverse mapping interface data 562. Reverse mapping can involve mapping coordinates in a destination domain, such as coordinates $(X'_T, Y'_T)$ of destination domain 220 or coordinates $(X'_T, Y'_T)$ of destination domain 250 to coordinates in a source domain, such as coordinates $(X_t, Y_t)$ of source domain 210 or coordinates (x, y) of source domain 240.

Root finder/calculator 530 can use the Newton-Raphson technique or another technique for finding roots of quadratic equations such as Equations (1) and (13); e.g., can find s-values and/or t-values for radial gradient rendering. Root finder/calculator 530 can use iterative divider 532 and fixed point adder 534 to find the roots, where iterative divider 532 can carry out a division-by-convergence or another related technique to perform floating point division while finding roots of quadratic equations. Fixed point adder 534 can perform fixed point addition, or addition for a pre-determined or fixed number of digits before and/or after a radix point of each operand of an addition operation.

RGM t-value generator 510 can determine t-values and/or corresponding s-values for radial gradient rendering. To determine t-values/s-values, RGM t-value generator 510 can solve quadratic equations for t (or s). For example, for Algorithm A, Equations (2), (3), and (4) express respective quadratic coefficients A, B, and C of Equation (1) in terms of radii $r_x$, $r_y$, the gradient origin coordinates $(X_o, Y_o)$, the ending center point coordinates $(X_c, Y_c)$, and destination point coordinates (x, y), which correspond to the $(X_t, Y_t)$ coordinates shown in FIG. 2A. Then, for given values of radii $r_x$, $r_y$, the gradient origin coordinates $(X_o, Y_o)$, and the ending center point coordinates $(X_c, Y_c)$, Equation (1) can be solved for each point (x, y), to find the corresponding t-value. The t-value can be used to determine an ellipse in the destination domain that corresponds to a color for rendering; e.g., where the t-value to color correspondence can be determined using a color blend, such as color blend 222.

As another example, for Algorithm B, Equations (14), (15), and (16) express respective quadratic coefficients A, B, and C of Equation (13) in terms of radii $r_0$, $r_1$, the gradient origin coordinates $(X_o, Y_o)$, the ending point coordinates $(X_1, Y_1)$, and destination point coordinates (x, y), which correspond to the $(X'_t, Y'_t)$ coordinates shown in FIG. 2B. Then, for given values of radii $r_0$, $r_1$, the gradient origin coordinates $(X_o, Y_o)$, and the ending point coordinates $(X_1, Y_1)$, Equation (13) can be solved for each point (x, y), to find the corresponding s-value. The s-value can be used to determine an ellipse in the destination domain that corresponds to a color for rendering; e.g., where the s-value to color correspondence can be determined using a color blend, such as color blend 222.

Further, both Equation (2) for Algorithm A and Equation (14) for Algorithm B indicate that the A, or quadratic, coefficient is a constant value assuming known values of the radii, the gradient origin coordinates, and ending point coordinates. Then, assuming A≠0, Equation (1) can be rewritten as Equation (24) below:

$$t^2 + bt + c = 0 \quad \text{where } b = \frac{B}{A} \text{ and } c = \frac{C}{A} \tag{24}$$

Then, Equation (25) expresses the roots of Equation (24), where the roots of Equation (1A) can be used as t-values for Algorithm A.

$$t = \frac{-b \pm \sqrt{b^2 - 4c}}{2} \tag{25}$$

A similar equation to Equation (24) expressed in terms of s can be used for Algorithm B. Then, a similar equation to Equation (25) expressed in terms of s can be used to find roots/s-values for Algorithm B.

Equation (25) has two solutions, corresponding to the two roots of quadratic Equation (24). Only one of these two solutions leads to a "correct root" that provides a correct radial gradient visual effect. For most cases, the larger positive root is the correct root. However, when A<0, the positive root closest to 0 is the correct root. When A<0, the root found by root finder/calculator 530 may not be the correct root. Then, when A<0, a root R by root finder/calculator 530 can be compared to −b/2. If R is greater than −b/2, then R can be subtracted from −b to obtain the correct (smaller) positive root.

As mentioned above, the Newton-Raphson technique can be used by root finder/calculator 530 to find roots of quadratic equations, and thereby find t-values and s-values for Algorithms A and B. The Newton-Raphson technique is an iterative technique to solve an equation or function f(x)=0, using a linear approximation of f(x) that can be determined based on an initial estimate $x_0$ for a root of f(x), where f(x) has at least one derivative f'(x), and where both f(x) and f'(x) can be determined for any value x. Then, the Newton-Raphson technique determines a second estimate $x_1$ for the root of f(x) as:

$$x_1 = x_0 - \frac{f(x_0)}{f'(x_0)}.$$

More generally, the Newton-Raphson technique determines an $n^{th}$ estimate $x_{n+1}$ of the root of f(x) based on the prior $(n-1)^{st}$ estimate as:

$$x_{n+1} = x_n - \frac{f(x_n)}{f'(x_n)}.$$

To apply the Newton-Raphson technique to Equation (24), root finder/calculator 530 can use Equation (26) below to find the $n^{th}$ estimate $t_{n+1}$ to a root of Equation (24):

$$t_{n+1} = t_n - \frac{t_n^2 + bt_n - c}{2t_n + b} \tag{26}$$

Root finder/calculator 530 can perform discriminant processing of Equation (24) to remove some visual artifacts during radial gradient rendering. For example, radial gradient module 500 can calculate a discriminant DISC of Equation (25), where DISC=$b^2$−4ac, to optimize quadratic equation root calculations. During calculations of the quadratic equation root, if DISC is less than zero then an error condition is flagged, since the roots of Equation (24) would then include imaginary values. However, because the Newton-Raphson technique for root finding starts with an initial estimated root $t_0$; an initial value of discriminant DISC may be less than zero while the discriminant DISC may converge to a value very close to but greater than zero thus resulting in a valid value at −b/2. To reduce processing for these cases, root finder/calculator 530 can compare discriminant DISC to the negative value of SMLNUM. If discriminant DISC is less than or equal to −SMLNUM, the discriminant DISC is determined to be truly negative and therefore erroneous. This discriminant processing reduces the number of possible visual artifacts, such as jaggedness, in a resulting image. If the discriminant DISC is between −SMLNUM and +SMLNUM, then DISC has a value that is very close to zero, and so DISC is set to the value −b/2.

Radial gradient module 500 can be configured to select a color of associated with a correct root/t-value for radial gradient rendering. In particular, radial gradient module 500 can determine a t-value of Algorithm A using techniques illustrated by the pseudo-code below in Table 1.

TABLE 1

```
//
// Pseudo-code for Algorithm A
// Inputs: A, B, C: values for quadratic Equation (1)
//         At*t + Bt + C = 0
//     b: value of B / A, when A ≠ 0; OR value of B when A = 0.
//     c: value of C / A, when A ≠ 0; OR value of C when A = 0.
//     D: discriminant of quadratic equation:
//        D = b² − 4c
//     SM: a spread method value.
//        SM = 1 is for padding spread mode.
//        SM = 2 is for reflection spread mode.
//        SM = 3 is for repeat spread mode.
//     ERRCTL: a value controlling error processing
// Outputs: t-value = t-value of Algorithm A.
//
1  if (A == 0) // Degenerate Case 1: A = 0
2    if (b ≠ 0.0)
3      t-value = −c/b
4    else
5      t-value = −1.0
6    endif
7  else if (D < 0) // Degenerate Case 3: D < 0
8    t-value = −1.0
9  otherwise
10   if ((A < 0) and (abs (D) < SMLNUM))// if A < 0 and D ≈ 0
11     root = −b/2.0 // Special handling of discriminant
12   else
13     root = NewtonsMethod( ) // use Newton root finding
14     if root = −1.0 // if Newton did not converge
15       t-value = −1.0
16       goto POST_PROCESS
17   endif
18   endif
19   // Check if Newton returned correct quadratic root
20   if (A < 0) // Degenerate Case 2: A < 0
21     if ((b < 0.0) and (root > −b/2.0)) // if larger root
22       t-value = −b − root // return smaller root
23     else
24       t-value = root
25     endif
26   otherwise // Normal Case, A > 0
27     if (root < −b/2.0) // if smaller root
28       t-value = −b − root // return larger root
```

TABLE 1-continued

```
29     else
30         t-value = root
31     endif
32   endcase
33 endcase
34
35 POST PROCESS:
36 if (t-value = −0.0) // Floating point 0.0 can be negative
37   t-value = 0.0 // Return "positive" 0.0
38 elseif (t-value > 1.0) and (t-value ≠ +∞)
39   case SM = 1 // PAD
40     t-value = 1.0
41   case SM = 2 // REFLECT
42     root_floor_halved = floor(t-value) / 2.0
43     if floor(root_floor_halved) = root_floor_halved
44         t-value = t-value − floor(t-value)
45     else
46         t-value =1 − (t-value − floor(t-value))
47     endif
48   case SM = 3 // REPEAT
49     t-value = t-value − floor(t-value)
50   endcase
51 elseif ((t-value < 0.0) or (t-value = +∞) or(t-value = −∞))
52   case ERRCTL: // t-value error processing
53     0: t-value = (SM = 2 /*REFLECT*/)? 0.0 : 1.0
54     1: t-value = 0.0
55     2: t-value = 1.0
56   endcase
57 endif
```

In Table 1, the pseudo-code for Algorithm A determines an output t-value to use for determining a color based on the values of the inputs A, B, C, D, b, c, and SM. The inputs include: A, B, C, which are coefficients for Equation (1); D, which is a discriminant of Equation (1); b, which is set to the value B/A; c, which is set to the value C/A; and SM, which is a spread mode indicator.

The pseudo-code for Algorithm A starts at line 1 of Table 1. At lines 1-6 of Table 1, a degenerate case where A=0 is handled; that is, the case where Equation (1) is linear, not quadratic. Lines 7 and 8 handle a degenerate case where D<0 is handled. In both of these degenerate cases, a t-value of −1.0 is returned if Equation (1) would return a non-real root value. Lines 10 and 11 process a case where A<0 and D is approximately equal to zero; then, a root value is set to −b/2. Lines 13-16 process the case where A>0 or D is not approximately equal to zero; then a Newton-Raphson technique for finding roots of equations is used to find a root for Equation (1). If the Newton-Raphson technique did not converge, the t-value is set to −1 and a post processing procedure for Algorithm A is invoked at line 16.

At lines 20-33 of Table 1, cases of non-zero A values are processed. Negative A values are processed at lines 20-25— if b<0.0 and root>−b/2.0, then the t-value is set to −b−root; otherwise the t-value is set to the root value. At lines 26-33 of Table 1, positive A values are processed—if root<−b/2.0, then the t-value is set to −b−root; otherwise the t-value is set to the root value. Then, the post-processing procedure for Algorithm A is invoked.

The post-processing procedure for Algorithm A is shown at lines 35-57 of Table 1. First, a "negative"−0.0 t-value is set to 0.0 at lines 36 and 37. If the t-value is between 1.0 and infinity, then the t-value is set based on the spread mode indicator SM. In the pseudo-code of Table 1, the spread mode indicator can take one of three values: 1 for a PAD spread mode, 2 for a REFLECT spread mode, or 3 for a REPEAT spread mode. At lines 39-40 of Table 1, the PAD spread mode is processed by setting the t-value to 1.0. At lines 41-47 of Table 1, the REFLECT spread mode is processed by setting the t-value to either: (a) a value that is either the fractional part of the t-value (when the t-value is even), or (b) a value that is one minus the fractional part of the t-value (when the t-value is odd). At lines 48-49, the REPEAT spread mode is processed by setting the t-value equal to the fractional part of the t-value. At lines 51-57, errors, such as negative and infinite t-values, are processed based on error processing value ERRCTL—the resulting t-value after error processing can be either 0.0 or 1.0. The t-value returned from the pseudo-code of Table 1 is in the range [0.0, 1.0] and so can be used for color determination by a color blend, look up table, function, and/or other data/software to determine a color associated with the t-value.

Radial gradient module 500 can determine a t-value of Algorithm B using techniques illustrated by the pseudo-code below in Table 2.

TABLE 2

```
// 
//   Pseudo-code for Algorithm B
//   Inputs: A, B, C: values for quadratic Equation (13)
//             As*s + Bs + C = 0
//         b: value of B / A, when A ≠ 0; OR value of B when A = 0.
//         c: value of C / A, when A ≠ 0; OR value of C when A = 0.
//         D: discriminant of quadratic equation set to D = b² − 4c
//         r₀: starting circle radius
//         r₁: ending circle radius
//
//         E: a "pole" value set to  E = −r₀ / (r₁ − r₀)
//
//         XS: flag set to TRUE if extending starting circle
//         XE: flag set to TRUE if extending ending circle
//   Outputs: t-value = t-value of Algorithm B.
//         small = indicator whether the larger or smaller root
//                 was selected. small = TRUE if smaller root
//                 selected or small = FALSE if larger root selected
//
 1  if (A == 0) // Degenerate Case 1: A = 0
 2    if (b ≠ 0.0) return t-value = map_root(−c/b), small = FALSE
 3    elseif (E ≥ 0.0)return t-value = map_root(−∞), small = FALSE
 4    else return t-value = map_root(+∞), small = FALSE
 5  else if (D <= −SMLNUM)  // Degenerate Case 3: D < 0
 6    return t-value = −1.0, small = FALSE
 7  otherwise
 8    if ((A < 0) and (abs (D) < SMLNUM))   // if A < 0 and D ≈ 0
 9      root = −b/2.0 // Special handling of discriminant
10    else // Newton's returns −1.0 if no convergence
11      root = NewtonsMethod( )
12    endif
13  endif
14  // Check for correct quadratic root
15  if (A < 0)  // Degenerate Case: A < 0
16    if (root > −b/2.0 )  // Newton returned larger root
17      temp = map_root(root)
18      if (temp ≠ −1.0) return t-value = temp, small = FALSE
19      else return t-value = map_root(−b − root), small = TRUE
20    else // Newton returned smaller root
21      temp = map_root(−b − root)
22      if (temp ≠ −1.0) return t-value = temp, small = FALSE
23      else return t-value = map_root(root), small = TRUE
24    endif
25  otherwise // Normal Case, A > 0
26    if (E ≤ 0.0)
27      if (root < −b/2.0) return t-value = map_root(−b − root), small = FALSE
28      else return t-value = map_root(root), small = FALSE
29    else
30      if (root ≥ −b/2.0) return t-value = map_root(−b − root), small = TRUE
31      else return t-value = map_root(root), small = TRUE
32    endif
33  endif
34  endif
35
36  // map_root maps root (t-value) to a color
```

TABLE 2-continued

```
37   // map_root returns one of:
38   //     -1.0 = use color of background
39   //     +0.0 = use color of starting circle
40   //     range (0.0, 1.0) = use color blend for color
41   //     +1.0 == use color of ending circle
42   function map_root(root)
43     if root = -0.0  // Floating point 0.0 can be negative
44       return 0.0    // Return "positive" 0.0
45     elseif (root >= 0.0) and (root <= 1.0)
46       return root   // Return values in legal lookup range
47     else
48       if XS         // If extend the starting circle
49         if (root < 0.0) and ((root >= E) or (E >= 1.0))
50           return 0.0 // Return color of starting circle
51         else
52           return -1.0 // In the background region
53         endif
54       endif
55
56       if XE         // If extend from the ending circle
57         if (root > 1.0) and ((root <= E) or (E <= 0.0))
58           return 1.0 // Return color of ending circle
59         else
60           return -1.0 // Flag we're in the background region
61         endif
62       endif
63     endif
64   endfunction
```

In Table 2, the pseudo-code for Algorithm B determines two output values: a t-value to use for determining a color, and a "small" value that indicates whether a smaller root or a larger root of Equation (13) was used to determine the t-value. The t-value and small value are determined by the pseudo-code for Algorithm B based on the values of the inputs A, B, C, b, c, D, $r_0$, r1, E, XS, and XE. The inputs include: A, B, C, which are coefficients for Equation (13); b, which is set to the value B/A; c, which is set to the value C/A; D, which is a discriminant of Equation (13); $r_0$, which is a radius of a starting circle for Algorithm B; $r_1$, which is a radius of an ending circle for Algorithm B; E, which is a "pole" value set to $$\frac{-r_0}{r_1 - r_0};$$

XS, which is a flag set to TRUE if the starting circle is to be extended, and XE, which is a flag set to TRUE if the ending circle is to be extended.

The pseudo-code for Algorithm B starts at line 1 of Table 2. At lines 1-4, a degenerate case where A=0 is handled; that is, the case where Equation (1) is linear, not quadratic. Line 2 indicates that, when b is not equal to zero, then the t-value is determined after invocation of the map_root( ) function operating on the value "−c/b" and the small value is set to FALSE. Line 3 indicates that if b=0 and E is greater than or equal to 0, then the t-value is determined after invocation of the map_root( ) function operating on the value "−∞" and the small value is set to FALSE. Line 4 indicates that if b=0 and E is less than 0, then the t-value is determined after invocation of the map_root( ) function operating on the value "+∞" and the small value is set to FALSE.

Lines 5 and 6 handle the case where D is less than 0; in these cases, the t-value is set to −1.0 and the small value is set to FALSE. Lines 7-14 handle the cases where A≠0 and D≥0. At lines 8-9, if A<0 and D is approximately equal to 0, then a root value is set to −b/2.0; otherwise, the root value is determined by using a Newton-Raphson technique for finding roots of equations to find a root for Equation (13).

Lines 15-34 check the root value for correctness, where lines 15-24 process the root in the case where A<0 and where lines 25-34 process the root in the case where A>0—note that the case where A=0 was processed at lines 1-4. In the case where A<0, line 16 determines whether the root value is greater than the value −b/2.0. If the root value is greater than the value −b/2.0, then lines 17-19 of Table 2 are utilized for processing. At line 17, the map_root( ) function is invoked on the root value, and a value "temp" is used to store the return value of map_root( ). At lines 18 and 19, if the temp value is not equal to −1.0, the temp value is returned as the t-value and the return small value is set to FALSE; otherwise, the temp value is equal to −1.0, and the return t-value is set to result of invoking the map_root( ) function operating on a value "−b−root", and the return small value is set to TRUE.

If the root value is less than or equal to the value −b/2.0, then lines 21-23 of Table 2 are utilized for processing. At line 21, the map_root( ) function is invoked on a value of "−b−root", and a value "temp" is used to store the return value of map_root( ). At lines 22 and 23, if the temp value is not equal to −1.0, the temp value is returned as the t-value and the return small value is set to FALSE; otherwise, the temp value is equal to −1.0, and the return t-value is set to a result of invoking the map_root( ) function operating on the root value, and the return small value is set to TRUE.

As mentioned above, lines 25-34 of Table 2 process the root in the case where A>0. At line 26, a determination is made as to whether the E value is less than or equal to 0.0; if E is less than 0.0, then lines 27-28 are utilized. At line 27, the root value is compared to −b/2.0; if the root value is less than −b/2.0, then the return t-value is set to a result of invoking the map_root( ) function operating on a "−b−root" value, and the return SMALL value is set to FALSE. If the root value is greater than or equal to −b/2.0, line 28 indicates that the return t-value is set to a result of invoking the map_root( ) function operating on the root value, and the return SMALL value is set to FALSE.

If E is greater than or equal to 0.0, then lines 30-31 are utilized. At line 30, the root value is compared to −b/2.0; if the root value is greater than or equal −b/2.0, then the return t-value is set to a result of invoking the map_root( ) function operating on a "−b−root" value, and the return SMALL value is set to TRUE. If the root value is less than −b/2.0, line 31 indicates that the return t-value is set to a result of invoking the map_root( ) function operating on the root value, and the return SMALL value is set to TRUE.

The map_root( ) function is shown on lines 42-64 of Table 2. The map_root( ) function takes one parameter, root, as an input, and returns a corresponding value that can be used for color lookup. The value returned by map_root( ) can be used for color determination by a color blend, look up table, function, and/or other data/software to determine a color associated with the return value of map_root( ). In particular, map_root( ) returns one of: (i) −1.0, which indicates that a color of the background region is to be used; (ii), +0.0, which indicates a color of a starting circle is to be used; (iii) a value in the range (0.0, 1.0), which indicate use of a color blend, look up table, function, and/or other data/software for color determination; or (iv)+1.0, which indicates a color of an ending circle is to be used. In some cases, when map_root( ) returns −1.0 indicating that a color of the background region is to be used, the value returned by map_root can indicate either that the background color is to be used or that the color is to be unchanged. For example, the color of the background region can be used when a background option is enabled, and the color can be left unchanged when the background option is not enabled.

Lines 42 and 43 of Table 2 indicate that the map_root( ) function converts a −0.0 input root value to a +0.0 return value. Lines 45 and 46 process root values in the range (0.0, 1.0) by returning the corresponding root value. Lines 48-53 of Table 2 process a case where the XS flag set to TRUE—that is, the starting circle is to be extended. If XS is set to true, then, if the input root value is negative and if the root value is greater than or equal to E or if E is greater than or equal to 1.0, the return value is set to 0.0; else the return value is set to −1.0. Lines 56-63 of Table 2 process a case where the XE flag set to TRUE—that is, the ending circle is to be extended. If XS is set to true, then, if the input root value is greater than 1.0 and if the root value is less than or equal to E or if E is less than or equal to 0.0, the return value is set to 1.0; else the return value is set to −1.0.

In some examples, division operations in the Newton-Raphson technique utilizing Equation (26) can be relatively difficult. Some division algorithms (and their speed optimizations, such as SRT or high-radix division), use add/subtract and shift operations. The operation count in these division algorithms is linearly proportional to the word size. Since radial gradient module 500 uses floating point multipliers, floating point multipliers can also be used to accelerate the division operation of the Newton-Raphson technique. The resulting division operation uses a "division by convergence" technique that has a convergence rate that is logarithmically proportional to the word size.

The division by convergence technique can be carried out by iterative divider 532 at least to perform divisions used by the Newton-Raphson technique in finding s-values and t-values. In the division by convergence technique, let Q be a quotient, N be a numerator, and D be a denominator. Then, Q=N/D, where the value Q can be determined in m iterations using Equation (27)

$$Q = \frac{N}{D} = \frac{N * R_0 R_1 \ldots R_{m-1}}{D * R_0 R_1 \ldots R_{m-1}} \to \frac{Q}{1} \quad (27)$$

where $R_i = 2 - D_i$ $D_{i+1} = D_i * R_i$ $N_{i+1} = N_i * R_i$

Then, each iteration of the division by convergence technique involves three operations as indicated in the where clause of Equation (27): (1) a 2's complement operation to determine $R_1$, (2) a multiplication to determine $D_{i+1}$, and (3) a multiplication to determine $N_{i+1}$. Since the division by convergence technique has a convergence rate that is logarithmically proportional to the word size of Q, the number of operations performed is proportional to $\log_2(\text{sizeof}(Q))$. For example, if Q, N, and D are each stored in 23-bit long words, the number of operations is proportional to the $\log_2$ of the sizeof(Q)=$\log_2(23)$=4.52 or 5 iterations.

To guarantee convergence within a fixed number of steps (e.g., 5 steps for a 23-bit value of Q), iterative divider 532 can scale denominator D to be in the range 0.5<D<1.0. To accomplish this scaling, iterative divider 532 can:

1. Sign bits of the numerator N and denominator D can be XORed and stored for later insertion; e.g., during a final t-value calculation.
2. The sign of both N and D can be set to positive (zero) for the scaling calculations.
3. The exponent of N can be scaled to compensate for the scaling to be done on the denominator: numerator exponent−the denominator exponent+C, where C is a constant amount of bias removed during this subtraction of the denominator exponent; e.g., C can be equal to 126 (0x7E) or another constant value.
4. The exponent of D is set to C, which scales D to the range of 0.5<D<1.0.

In some examples, iterative divider 532 can use fixed point adder 534 to scale the numerator exponent and denominator exponent before beginning iterations of the division by convergence technique. In particular examples, fixed point operations to scale the numerator exponent and denominator exponent are done in parallel with the floating point addition and multiplication calculations, thus no extra processor cycles are utilized for scaling these exponents.

In other examples, before starting iterative division, the denominator D is compared to zero. If D is zero, then the division result Q is set to −b/2 and the t-estimate for the next round of Newton's approximation is therefore set to zero. If the value of −b/2, i.e., the division result or the error from the Newton-Raphson technique is less than the divergence threshold then the result of t-estimate minus (−b/2) is returned for the next iteration of the Newton-Raphson technique. In some of these examples, one or more iterations of the division by convergence technique are eliminated, as well as Newton-Raphson technique which may take multiple iterations to converge or may not converge at all and then results in an error condition. In other of these examples, such error conditions can be observed as jaggedness in an image generated using the radial gradient technique.

For division by convergence, iterative divider 532 can first scale the denominator and numerator as described above and then calculate R values in Equation (27). For an R value calculation, the process shown in Equation (27) can be modified to simplify processing and reduce timing. First the mantissa of the floating point denominator D can be converted to a fixed point number by stripping off the sign bit and the some of the most significant bits (MSBs) of the exponent and using the remaining bits of the floating point number. For the scaled denominator, the least significant bit of the exponent can represent the decimal portion of this fixed point number of the form 1.xxxxxx or the form 0.xxxxxx. The fractional portion of the denominator contains a "hidden bit" as part of its floating point representation. Since the denominator has been scaled to 0.5<D<1.0, this hidden bit has a value of 0.5. Rather than add the hidden bit back into the fixed point value of the denominator and then subtract this from 2.0, the denominator can be subtracted from 1.5 (2.0−0.5). Next, a fixed point denominator value (without the hidden bit) can be subtracted from 1.5. Finally, the MSBs of the fixed point denominator can be shifted right one place and the shifted MSBs used to form a floating point representation of the denominator. The floating point representation can be used by floating point multiplier 524 to multiply the numerator (N) and the denominator (D) by the floating point value of R. The modified equation for R becomes $R_i=1.5-(\text{specialD}_i)$, where specialD$_i$=D$_i$−0.5 to account for the hidden bit value.

The numerator $N_{i+1}$ and denominator $D_{i+1}$ can be iteratively multiplied by each new $R_i$ value, as described in Equation (27) above, and a new $R_{i+1}$ value can be computed using the denominator $D_{i+1}$ until the R value converges to 1.0. For each iteration of the division by convergence technique, an iteration count can be incremented by one. If the iteration count reaches a division convergence threshold (e.g., 4, 5, or 6 for 23-bit values of R, N, D, and/or Q) and the calculated R value does not equal 1.0, then a division divergence error condition can be flagged.

When the Newton-Raphson technique is applied to Equation (24) using Equation (26), each iteration involves a floating point calculation of Equation (26), which utilizes four floating point additions/subtractions, two floating point multiplications, and one floating point division. To improve throughput, the number of iterations, and thereby the number of times Equation (26) is calculated, can be minimized to reach a required precision of a root that indicates convergence. To reduce the number of iterations performed during the Newton-Raphson technique, an initial t-value (or s-value) t-estimate (or s-estimate) can be determined by graphics engine circuitry 420 as a good initial guess for the t-value (or s-value).

In particular, 1D/2D extrapolator 520 can generate a 2D extrapolation as an initial estimate of a root of a quadratic equation; e.g., Equation (1), Equation (13), or Equation (24). Equation (28) can be used to determine a 2D extrapolation value $t_{i+\Delta,j\Delta\Delta}$ for use as a t-estimate $$t_{i+\Delta,j+\Delta} = t_{i+\Delta,j} + t_{i,j+\Delta} - t_{i,j} \quad (28)$$

where i and j denote the X and Y coordinates, respectively, and where $\Delta$ denotes an increment size for each 2D extrapolation calculation. The three t-values $t_{i,j}$, $t_{i+\Delta,j}$, and $t_{i,j+\Delta}$ used in Equation (28) used for 2D extrapolation are collectively referred to as "t-neighbors". The t-neighbors can also be called T0 to refer to $t_{i,j}$, T1 to refer to $t_{i+\Delta,j}$, T2 to refer to $t_{i,j+\Delta}$, and T3 to refer to $t_{i+\Delta,j+\Delta}$. An example of four t-values/t-neighbors is shown at an upper portion of FIG. 9.

In some examples, such as scanline, trapezoid, and some shape list graphics orders, there is no fixed spatial relation between scanlines, and therefore 2D extrapolation is not feasible. When 2D extrapolation is not feasible, Equation (29) can be used to determine a 1D extrapolation value $t_{i+\Delta,j}$ for use as a t-estimate:

$$t_{i+\Delta,j} = 2t_{i,j} - t_{i-\Delta,j} \quad (29)$$

where i and j denote the X and Y coordinates, respectively, and where $\Delta$ denotes an increment size for each 1D extrapolation calculation.

The use of a good initial guess for a t-value (or s-value) can significantly improve performance for calculating t-values (or s-values). In some examples, the use of 1D extrapolation values as initial guesses for t-values (or s-values) can take up to 21 processor cycles of graphics engine circuitry 420 to calculate a t-value (or s-value), while the use of 2D extrapolation values as initial guesses for t-values (or s-values) takes approximately 13 processor cycles of graphics engine circuitry 420 to calculate a t-value (or s-value), saving 38% of the processor cycles used by graphics engine circuitry 420 when determining t-values using 2D extrapolation values in comparison to use of 1D extrapolation values.

As indicated above, the radial gradient calculations of Algorithms A and B rely on solving quadratic equations; e.g., one or more of Equation (1), Equation (13), or Equation (24). As such, some degenerate cases of quadratic equations can be processed by radial gradient module 500 of FIG. 5 while solving these quadratic equations, as indicated above in at least the context of Tables 1 and 2.

Let Equation (1), which is: $At^2+Bt+C=0$, be used as an example quadratic equation for illustration of degenerate cases. Three degenerate cases occur when:

Degenerate Case 1: A=0;
Degenerate Case 2: A<0; and
Degenerate Case 3: $b^2-4c<0$.

For Degenerate Case 1, radial gradient module 500 determines that A=0 and indicates that Degenerate Case 1 is present by marking a related flag equal to TRUE. After determining that Degenerate Case 1 is present, radial gradient module 500 can determine whether B≠0. If B≠0, radial gradient module 500 can use Equation (5), which is $$t = \frac{-C}{B},$$

to find a t-value result (or if finding s-values, radial gradient module 500 can use related Equation (17)). If B=0, then radial gradient module 500 (that is, A=B=0 for Equation (1)), radial gradient module 500 sets the t-value result=−1 as an "error flag" or indication of an error flag. In some cases, spread processing is used for negative t-values—such spread processing is discussed below, including example spread processing pseudocode shown in Table 3.

For Degenerate Case 2 where A<0 for Algorithm A, the value b'=B/A of Equation (7) is calculated. Then, if both (A<0) and (b'<0), then the smaller of the two possible roots of Equation (1) is the correct root to use for the radial gradient. When both (A<0) and (b'<0), a root/t-value result of Equation (1) is found using the above-mentioned Newton-Raphson technique. Then, the t-value result is compared to the value b'/2. If the t-value result is greater than b'/2, radial gradient module 500 sets the t-value result=−b'−result; otherwise, the t-value result is less than or equal to b'/2, and the t-value result is not changed after the comparison. The condition where A<0 is also discussed below at least in the context of FIG. 11.

For Degenerate Case 3, where $b^2-4c<0$, radial gradient module 500 detects Degenerate Case 3 and again sets the t-value result=−1 as an error flag. In some cases, spread processing is used for negative t-values—an example spread processing technique is discussed immediately below, including example spread processing pseudocode shown in Table 3. Degenerate Case 3 can also handle the result where $0<b^2-4c<$SMLNUM by assuming that $b^2-4c=0$, and so determining the root of the equation to be −b/2. After radial gradient module 500 processes each of Degenerate Cases 1, 2, and 3, the result value is used by radial gradient module 500 as the t-value in subsequent processing, including the spread processing described below.

A spread processing technique can be used by radial gradient module 500 to process t-values>1.0 and t-values<0. The spread processing technique is controlled by two parameters SPREAD_METHOD and DVGCT. The SPREAD_METHOD parameter can be set to one of the following three values: PAD, REFLECT, and REPEAT. The DVGCT parameter can be set one of the following three values: 0, 1, or 2.

For processing of t-values>1.0, the SPREAD_METHOD parameter is checked. When the SPREAD_METHOD parameter is set to PAD, t-values>1.0 are set equal to 1.0, which effectively fills areas beyond a ring/ellipse associated with t-value=1.0 to the same color associated with a t-value of 1.0; or, in some cases, the same color associated with a t-value of Tprior. When the SPREAD_METHOD parameter is set to REFLECT, a t-value>1.0 is adjusted to represent an area beyond the ring/ellipse associated with t-value=1.0 is filled with a reflection of the area inside the ellipse. When the SPREAD_METHOD parameter is set to REPEAT, a t-value>1.0 is adjusted to represent an area beyond the ring/ellipse associated with t-value=1.0 is filled with a repeat of the area inside the ellipse.

For processing of t-values<0, the DVGCT parameter is checked first. If the DVGCT parameter equals 0, then the SPREAD_METHOD parameter is checked. When the SPREAD_METHOD parameter is equal to REFLECT, a t-value<0 is reset to 0; otherwise (i.e., SPREAD_METHOD=PAD or REPEAT) the t-value<0 is reset to 1.0. If the DVGCT parameter equals 1, then a t-value<0 is reset to 0. If the DVGCT parameter equals 2, then a t-value<0 is reset to 1. Pseudocode for the spread processing technique is shown below in Table 3.

TABLE 3

```
// spread processing based on SPREAD_METHOD and DVGCT
parameters
if (t-value > 1.0) begin
    case (SPREAD_METHOD)
        PAD : t-Value = 1.0
        REPEAT : t-Value = t-value –floor (t-value);
        REFLECT:
            root_floor_halved = floor(t-value) / 2.0f
            If (floor (root floor halved) == root_floor_halved
                t-Value = t-Value – floor (t-Value)
            else
                t-Value = 1 =31 (t-Value – floor (t-Value))
            end
    end case
end // if (t-value >= 1.0)
if (t-value < 0.0) begin
    if (DVGCT == 0) begin
if (SPREAD_METHOD == REFLECT) begin
        t-value = 0.0
    end else begin
        t-value = 1.0
    end
    end else if (DVGCT == 1) begin
        t-value ==0.0;
    end else if (DVGCT == 2) begin
        t-value =1.0
    end
end // if (t-value < 0.0)
```

As shown in FIG. 5, radial gradient module 500 includes RGM t-value generator 510 and RGM pixel interface 512. As mentioned above, RGM pixel interface 512 includes radial gradient main controller 540, coarse/fine grid select/t-value writer 542, memory address generator 544, t-value reader/t-neighbor fetcher 546, fine grid processor 550, edge detector 552, fine grid memory 554 and coarse grid memory 556.

RGM pixel interface 512 takes t-values 582 for each destination pixel from RGM t-value generator 510 and stores them in either fine grid memory 554 or coarse grid memory 556. In some examples, t-values are provided via test interface 564, simple interface 580 and/or via another interface.

In some examples, RGM pixel interface 512 can default to low resolution, coarse grid processing which processes and stores t-values for each cell or other collection of pixels in coarse grid memory 556; e.g., a cell of 2×2 pixels, 4×4 pixels, a line of 1×N pixels, a column of N×1 pixels, a cell of N×M pixels, with N>0 and M>0. When two (or more) coarse grid lines have been processed and stored in coarse grid memory 556 and when edge detection is enabled, edge detection can be performed by edge detector 552. Edge detector 552 can dynamically detect whether an edge formed by an ellipse or ring that can be perceived by the human eye is present in a cell of pixels (e.g., a 4×4 cell of pixels) using one or more of the herein-described edge detection techniques. After detecting the edge, edge detector 552 can switch from coarse grid processing to fine grid processing, where a t-value is calculated for each pixel in the cell of pixels. If an edge formed by an ellipse or ring is detected by edge detector 552, then fine grid processing can be utilized for a corresponding cell where the edge is detected and/or the corresponding cell can be flagged as requiring fine grid processing.

When t-values for an entire line have been processed, RGM pixel interface 512 can send a new block (or cell) request as part of reverse mapping interface data 562 to a reverse mapper (not shown in FIG. 5) to process pixels of one or more cells that have been flagged; e.g., all 16 pixels of a flagged 4×4 cell. The reverse mapper can transform coordinates of a destination frame; e.g., destination domain 220 or destination domain 250 to coordinates of a source frame; e.g., source domain 210 or source domain 240. RGM pixel interface 512 can provide line and column counts as reverse mapping interface data 562 to the reverse mapper, where the line and column counts can be used to flag one or more edge locations and establish starting X and Y position(s) of the destination pixel(s) of cells to be processed by fine grid processing. RGM pixel interface 512 can also provide cell width and cell height values as reverse mapping interface data 562 to the reverse mapper in order to specify a size of a cell to be processed. The cell to be processed by the reverse mapper can be stored; e.g., in fine grid memory 554 and/or in coarse grid memory 556. After the cell is stored, the reverse mapper can process a new block, beginning with a next line of an image. In parallel, the conversion of stored t-values to pixel colors can be started.

Radial gradient main controller 540 can monitor and control conversion of t-values to colors of pixels. Radial gradient main controller 540 can instruct the reverse mapper to process a block of pixels. After t-neighbors are fetched for t-value estimation, radial gradient main controller 540 can request t-values from RGM t-value generator 510. When radial gradient main controller 540 receives a t-value from RGM t-value generator 510, radial gradient main controller 540 store the received t-values in fine grid memory 554 or coarse grid memory 556.

Initially radial gradient main controller 540 defaults to coarse grid processing. During coarse grid processing, for each t-value that is processed in a line of pixels of an image, a cell count is incremented and a line count is incremented at the end of each line. When the second line of t-values has been processed, edge detection is done on four corner t-values of a cell by edge detector 552. If an edge is detected by edge detector 552, the cell count is placed in a queue for later processing. At the completion of that line, if the number of cells in the queue is greater than zero, then radial gradient main controller 540 can request fine grid processing. The reverse mapper is then restarted using the cell count to calculate X and Y destination pixels for the cell. Block width and block height values for the cell are determined; e.g., for a 4×4 cell, the block width=the block height=4. For each entry in the queue, the reverse mapper is restarted with a new block request and the t-values received from the radial gradient t-value generator for these blocks are stored in fine grid memory 554. At the completion of each line, fine grid processing is executed (if needed), the parameters of a next coarse grid block are calculated, and the reverse mapper is restarted.

After each line is processed, the lines of t-values of the coarse grid array are shifted to allow a new line of t-values to be determined by RGM t-value generator 510. Colors of a previous line of t-values are read from a reverse mapping cache and passed to a color blender (not shown in FIG. 5). For example, the reverse mapping cache can implement color blend 222; i.e., the reverse mapping cache can store a lookup table or other data structure storing one or more color values, such as grayscale values, CYMK color values, or RGB color values. In this example, a reverse mapping cache RMC can be an array of up to $2^{LUTSIZ}$ color value entries, where 0≤LUTSIZ≤12 or some other maximum value, where the reverse mapping cache can be addressed using an integer reverse mapping cache address value RMCA in the range of [0, $2^{LUTSIZ}-1$]. Then, the reverse mapping cache RMC can store a color value RMC[RMCA] that corresponds to the reverse mapping cache address value RMCA. Then, when reverse mapping cache RMC receives reverse mapping cache address value RMCA, then reverse mapping cache RMC can provide the resulting color value RMC[RMCA], thereby translating reverse mapping cache addresses to color values.

As a particular example, if color blend 222 has 64 greyscale colors, then LUTSIZ=6, RMCA can be an integer in the range [0, 63], and reverse mapping cache RMC can be an array of 64 color value entries storing values for the 64 grey scale colors, where a grayscale value of 0 can represent black, grayscale value of 1 can be slightly lighter than the black of greyscale value 0, and so on until reaching a greyscale value of 255 representing white. Continuing the color blend example, RMC[0] can store a greyscale value of 0, RMC[1] can store a value of greyscale value of 4, . . . RMC[E] could store a grayscale value of 4*E, and so on until reaching RMC[63] which can store a greyscale value of 252—in this example, reverse mapping cache would store greyscale values representing a smooth transition from black to white as reverse mapping cache addresses increased, corresponding to color blend 222 shown in FIG. 2A and in FIG. 2B.

T-values generated by RGM t-value generator 510; e.g., t-values 582, are stored by RGM pixel interface 512 in either fine grid memory 554 or coarse grid memory 556, where flow of this processing is controlled by the radial gradient main controller 540.

One or more processes can access the t-values stored in coarse grid memory 556. These processes can include a process that writes t-values 582 received from RGM t-value generator 510 to coarse grid memory 556, a process that "fetches" or retrieves t-neighbors from coarse grid memory 556 for t-value estimation/extrapolation by t-value reader/t-neighbor fetcher 546, a process that fetches t-values from coarse grid memory 556 for edge detection by edge detector 552, and a process that fetches t-values from coarse grid memory 556 for reverse mapping cache address generation of pixel color addresses in a reverse mapping cache. Fine grid memory 554 can be used by one or more processes writing and/or reading t-values during fine grid processing.

In some examples, fine grid memory 554 can include on-chip memory; e.g., on-chip static random access memory (SRAM) configured to store at least 32 bits for at least 256 entries (32 entries/row×8 rows). In other examples, coarse grid memory 556 can include one or more arrays of registers; e.g., including an array of registers for storing at least 9 columns by at least 3 rows of t-values. The array(s) of registers can be indexed for both writing and reading using the column and row number of a cell currently being processed.

To generate a reverse mapping cache address, RGM pixel interface 512 can fetch a t-value from either fine grid memory 554 or coarse grid memory 556. The fetched t-value is converted to an address in the reverse mapping cache, which stores pixel colors, and the address is used to read a specific pixel color. The specific pixel color is passed to a color blender using simple interface 580. In some examples, a reverse mapping cache address RMCA can be calculated using an input pattern address PA for a pattern or opacity mask and an input t-value (or s-value) TVAL for a lookup table/color blend of size $2^{LUTSIZ}$ using Equation (30) below:

$$RMCA = PA + TVAL \times 2^{LUTSIZ} \quad (30)$$

In some of these examples, RMCA can be range checked and/or restricted to a range of values; e.g., the range [0, $2^{LUTSIZ}-1$] discussed above. In other examples where PA=0; then Equation (30) can be simplified to yield Equation (31) below expressing a reverse mapping cache address RMCA in terms of t-value (or s-value) TVAL for a lookup table/color blend of size $2^{LUTSIZ}$.

$$RMCA = TVAL \times 2^{LUTSIZ} \quad (31)$$

To improve throughput, a reduction in the spatial resolution is implemented as coarse grid processing. Due to the nature of radial gradient rendering, most neighboring pixels approximate each other in their pixel values. In most cases, a gradient calculation for radial gradient rendering can be done in a lower spatial resolution; e.g., using a coarse grid of pixels, and the output difference is not noticeable. In one example, a simulation was executed and indicated that, in the vast majority of cases from real printing jobs, the gradient calculation can be once for every 4×4 cell of pixels without visible artifacts. Reducing the gradient calculation t to once per 16 pixels correspondingly lowers a number of t-value calculations from 16 to 1 for 16 pixels. Performing a gradient calculation once for a cell of 2 or more pixels; e.g., once per 4×4 cell of pixels, is referred to herein as coarse grid processing. By reducing the number of t-value calculations required for each 4×4 cell of pixels from 16 to 1, radial gradient module 500 can expend 16 clock cycles to calculate and process a radial gradient t-value for a 4×4 cell of pixels and still maintain maximum throughput.

In some examples, t-value calculations indicate that visible artifacts may be present when processed using coarse grid processing. To reduce or eliminate these visible artifacts, radial gradient module 500 can perform fine grid processing, which involves performing gradient calculations for each pixel of a cell of pixels; e.g., performing gradient calculations for all 16 pixels of a 4×4 cell of pixels.

In other examples, radial gradient module 500 can include some or all of the reverse mapping cache, the reverse mapper, and the color blender. In still other examples, some or all of the reverse mapping cache, the reverse mapper, and the color blender can be part of graphics engine circuitry 420 that differs from radial gradient module 500.

FIG. 6 illustrates image 600 depicted using a grid of pixels, according to an example embodiment. Image 600 includes transferring region 610 that includes 19 columns by 10 rows of pixels, where transferring region 610 is shown using a large gray rectangle in FIG. 6, a "coarse pixel" of image 600, such as coarse pixel (CP) 620 of cell 640 of pixels, is shown in FIG. 6 using a relatively large rounded rectangle, and a "fine pixel" of image 600, such as fine pixel (FP) 630, is shown in FIG. 6 using a circle. Image 600 also includes some extra or "pad" pixels—including coarse pad pixel 650—outside of transferring region 610; e.g., on a right side and below transferring region 610. In other examples not shown in FIG. 6, the pad pixels are not included in image 600; i.e., image 600 only includes the pixels in transferring region 610.

Transferring region 610 includes pixels that are colored using radial gradient processing. Then, pad pixels, such as pad pixel 650, can be added to transferring region 610 can be added to ensure that image 600 is made up of complete 4×4 cells plus an additional row and column of pixels to provide additional coarse pixels to allow radial gradient rendering of image 600 without having to process partial 4×4 grids of pixels while rendering the pixels in transferring region 610. In FIG. 6, cell boundaries within image 600 are shown using dashed lines—these dashed lines would not be depicted as part of image 600, but are shown in FIG. 6 to aid illustration of cells.

During coarse grid processing, a color of a representative pixel of a cell of pixels is determined using radial gradient rendering, and that color is used for all pixels in the cell of pixels. In the example shown in FIG. 6, coarse pixel 620 is used as the representative pixel of 4×4 cell 640 of pixels that includes coarse pixel 620 and the nearby 15 fine pixels all shown colored in white.

During fine grid processing, a color of each pixel in a cell of pixels is determined using radial gradient rendering. As such, each pixel in the cell can have different colors. For example, cell 642 is a 4×4 cell of pixels colored using fine grid processing, where thirteen of the sixteen pixels, including coarse pixel 622, are colored using a relatively-light gray color, and the remaining three pixels of cell 642, including fine pixel 630, are colored using a relatively-dark gray color.

Figure 7:
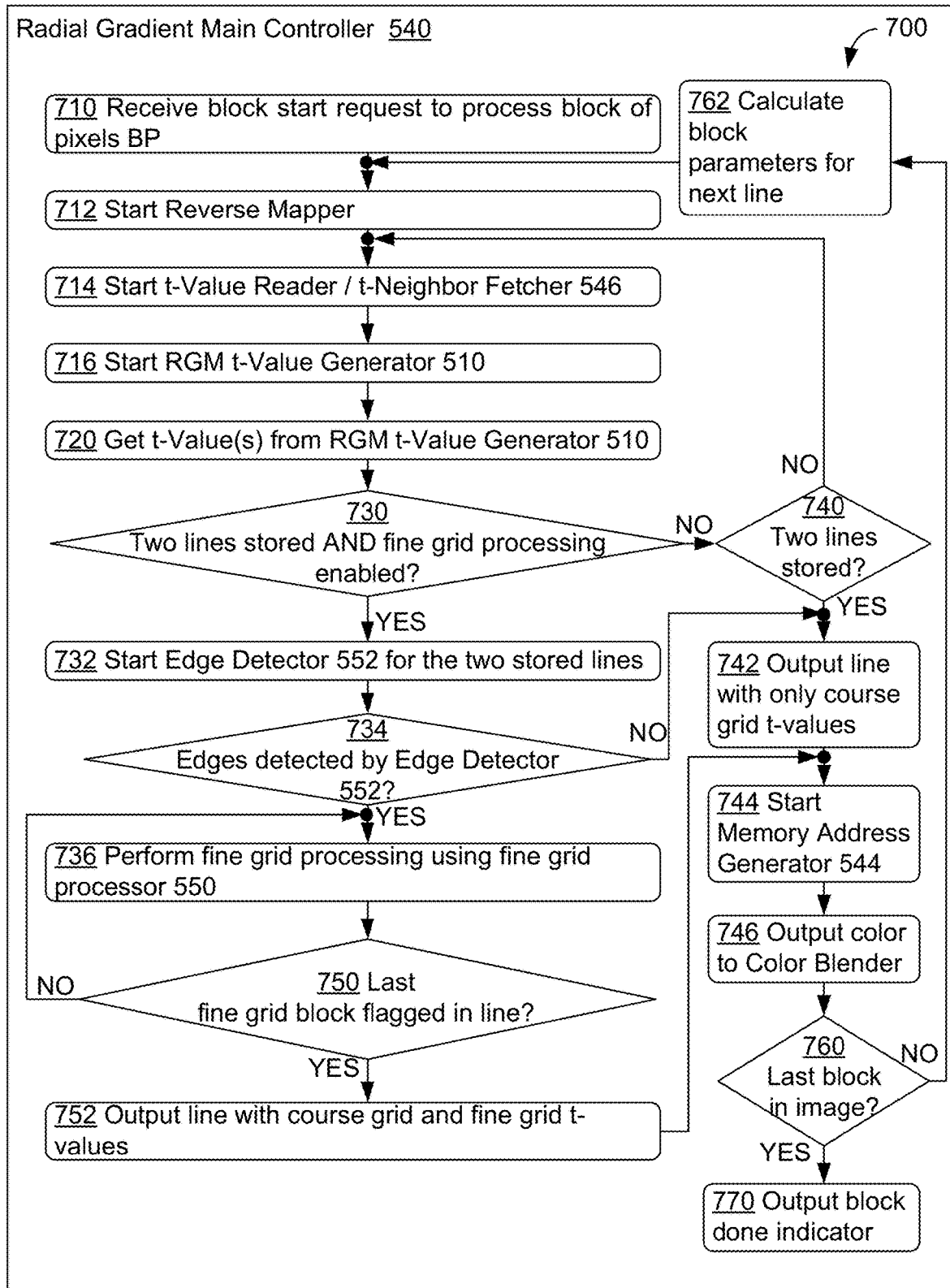
FIG. 7 shows a radial gradient main controller of the graphics engine circuitry of FIG. 4, according to an example embodiment.

FIG. 7 shows a radial gradient main controller 540 of graphics engine circuitry 420, according to an example embodiment. During radial gradient rendering, radial gradient module 500 calculates t-values and stores them in either fine grid memory 554 or coarse grid memory 556, depending on the resolution of the pixel grid. Radial gradient main controller 540 can schedule and monitor processing flow during this radial gradient rendering. As shown in FIG. 5, radial gradient main controller 540 is augmented with several sub-function controllers and logic blocks; e.g., coarse/fine grid select/t-value writer 542, memory address generator 544, t-value reader/t-neighbor fetcher 546, fine grid processor 550, and edge detector 552.

FIG. 7 shows that radial gradient main controller 540 can execute method 700 to schedule and monitor processing flow during radial gradient rendering of a block of pixels. A block of pixels in the context of method 700 can include some or all of the pixels of an image; e.g., one or more pixels of the image, one or more cells of pixels of the image, one or more lines of pixels of the image, one or more columns of pixels of the image. In the context of method 700, the image can be stored in a 2D grid of pixels of a frame. In some examples, method 700 can include: (a) t-neighbor/t-estimate fetching from fine grid memory 554 or coarse grid memory 556 for 1D or 2D extrapolation of the t-value estimates; (b) t-value generation by RGM t-value generator 510; (b) edge detection; (d) fine grid processing; and (e) address generation for a reverse mapping cache following storage of a line of pixels in either fine grid memory 554 or coarse grid memory 556.

Method 700 begins at block 710, where radial gradient main controller 540 can receive a block start request to request processing (i.e., radial gradient rendering) of a block of pixels BP of an image. The block start request can include one or more parameters for processing block of pixels BP. For example, the block start request can include information about block-destination coordinates of block of pixels BP in the image and/or coordinates of a 2D grid of pixels of a frame storing the image.

At block 712, radial gradient main controller 540 can start the reverse mapper to begin a block transfer for the block of pixels BP by having the reverse mapper determine block-source coordinates in the source domain corresponding to the block-destination coordinates of BP.

At block 714, radial gradient main controller 540 can start t-value reader/t-neighbor fetcher 546 to obtain t-value estimates from either fine grid memory 554 or coarse grid memory 556, where the t-value estimates are associated with the block-source coordinates in the source domain determined at block 712. For example, if at least one pixel PR has been rendered in a line of pixels associated with the block of pixels BP being processed, then a t-value of pixel PR can be fetched from either fine grid memory 554 or coarse grid memory 556 as a t-value estimate for t-values in BP. These t-value estimates can be used for 1D and/or 2D extrapolation of t-values.

At block 716, radial gradient main controller 540 can start RGM t-value generator 510 to determine t-values for the block of pixels BP based on available fetched t-value estimates using Algorithm A or Algorithm B. For example, RGM t-value generator 510 can use the Newton-Raphson technique to obtain t-values, along with 1D or 2D extrapolation of the t-value estimates associated with the block-source coordinates obtained at block 714. In some cases, such as for the first pixel being rendered of an image, t-value estimates may not be available. Then, RGM t-value generator 510 can determine t-values for BP without use of t-value estimates; e.g., using the Newton-Raphson technique to obtain t-values without extrapolation.

At block 720, radial gradient main controller 540 can receive one or more t-values determined for the block of pixels BP by RGM t-value generator 510; e.g., as one or more of t-values 582. T-value generation is discussed in more detail as part of the discussion of RGM t-value generator 510.

At block 730, radial gradient main controller 540 can determine whether fine grid processing is enabled and whether t-values for at least two lines of the image have been stored in memory; e.g., in fine grid memory 554 and/or coarse grid memory 556. Radial gradient main controller 540 can determine whether fine grid processing is enabled based on a fine grid processing flag (or other indicator) that can indicate at least that fine grid processing is either enabled or disabled. If fine grid processing is enabled and t-values for at least two lines of the image have been stored in memory, then radial gradient main controller 540 can proceed to block 732. Otherwise, either fine grid processing is not enabled or t-values for at least two lines of the image have not been stored in memory, and radial gradient main controller 540 can proceed to block 740.

At block 732, radial gradient main controller 540 can start edge detector 552 for the two stored lines identified at block 730. In some cases, radial gradient main controller 540 can start edge detector 552 only when an edge detection flag (or other indicator) indicates that edge detection is enabled to be performed or disabled, and not to be performed. In particular of these cases, enabling fine grid processing implies enabling edge detection and disabling fine grid processing implies disabling edge detection; then, use of a fine grid processing flag (or other indicator) to indicate that fine grid processing is enabled or disabled can act as the edge detection flag as well. In the specific example of method 700, the fine grid processing flag discussed above in the context of block 730 acts as an edge detection flag as well.

Once started, edge detector 552 can attempt to detect edges of ellipses/rings in block of pixels BP, as discussed herein at least in the context of edge detector 552, scenario 1300, and method 1400.

At block 734, radial gradient main controller 540 can determine whether one or more edges were detected in block of pixels BP by edge detector 552. If edge detector 552 detected one or more edges in BP, then radial gradient main controller 540 can proceed to block 736; otherwise, no edges were detected in BP by edge detector 552 and radial gradient main controller 540 can proceed to block 742.

At block 736, radial gradient main controller 540 can use fine grid processor 550 to perform fine grid processing for the block of pixels BP. Once fine grid processor 550 has completed fine grid processing for BP, radial gradient main controller 540 can proceed to block 750.

At block 740, radial gradient main controller 540 can determine whether t-values for at least two lines of the image have been stored in memory; e.g., in fine grid memory 554 and/or coarse grid memory 556. If t-values for at least two lines of the image have been stored in memory, then radial gradient main controller 540 can proceed to block 742. Otherwise, t-values for at least two lines of the image have not been stored in memory, and radial gradient main controller 540 can proceed to block 712.

At block 742, radial gradient main controller 540 can output one or more coarse grid t-values for a line of pixels of the image that includes block of pixels BP for use by memory address generator 544.

At block 744, radial gradient main controller 540 can start memory address generator 544 to obtain a reverse cache address for each of the one or more t-values output at block 742. Determination of reverse cache addresses is discussed herein at least in the context of FIG. 5.

At block 746, radial gradient main controller 540 can determine one or more colors corresponding to the one or more t-values output at block 742. The color(s) can be determined using the reverse cache addresses determined at block 744. For example, the reverse cache addresses can be used as indices/addresses of a reverse mapping cache embodying a lookup table or other data structure that stores colors for a color blend or other color representation, such as discussed herein at least in the context of FIG. 5. Upon completion of the procedures of block 746, radial gradient main controller 540 can proceed to block 760.

At block 750, radial gradient main controller 540 can determine whether the block of pixels BP is a last block of pixels in a line of pixels that was flagged as requiring fine grid processing and/or having a detected edge; e.g., an edge detected by edge detector 552 at block 732. If BP is the last block of pixels in the line of pixels that was flagged as requiring fine grid processing and/or having a detected edge, then radial gradient main controller 540 can proceed to block 752. Otherwise, BP is not the last block of pixels in the line of pixels that was flagged as requiring fine grid processing and/or having a detected edge; i.e., one or more other blocks of pixels have been flagged, then radial gradient main controller 540 can proceed to block 736.

At block 752, radial gradient main controller 540 can output one or more coarse grid t-values and fine grid t-values for the line of pixels of the image that includes block of pixels BP for use by memory address generator 544. Upon completion of the procedures of block 752, radial gradient main controller 540 can proceed to block 744.

At block 760, radial gradient main controller 540 can determine whether block of pixels BP is the last block of pixels of the image. If BP is the last block of pixels of the image, radial gradient main controller 540 can proceed to block 770. Otherwise, BP is not the last block of pixels of the image, radial gradient main controller 540 can proceed to block 762.

At block 762, radial gradient main controller 540 can determine one or more parameters for processing a next block of pixels BP2, such as the one or more parameters discussed above in the context of block 710. Upon completion of the procedures of block 762, radial gradient main controller 540 can proceed to block 712.

At block 770, radial gradient main controller 540 can generate and output a block done indicator to indicate all pixels of the image have been processed by radial gradient main controller 540; that is, all of the pixels of the image have been rendered using radial gradient rendering. Upon completion of the procedures of block 770, method 700 can be completed.

Figure 8:
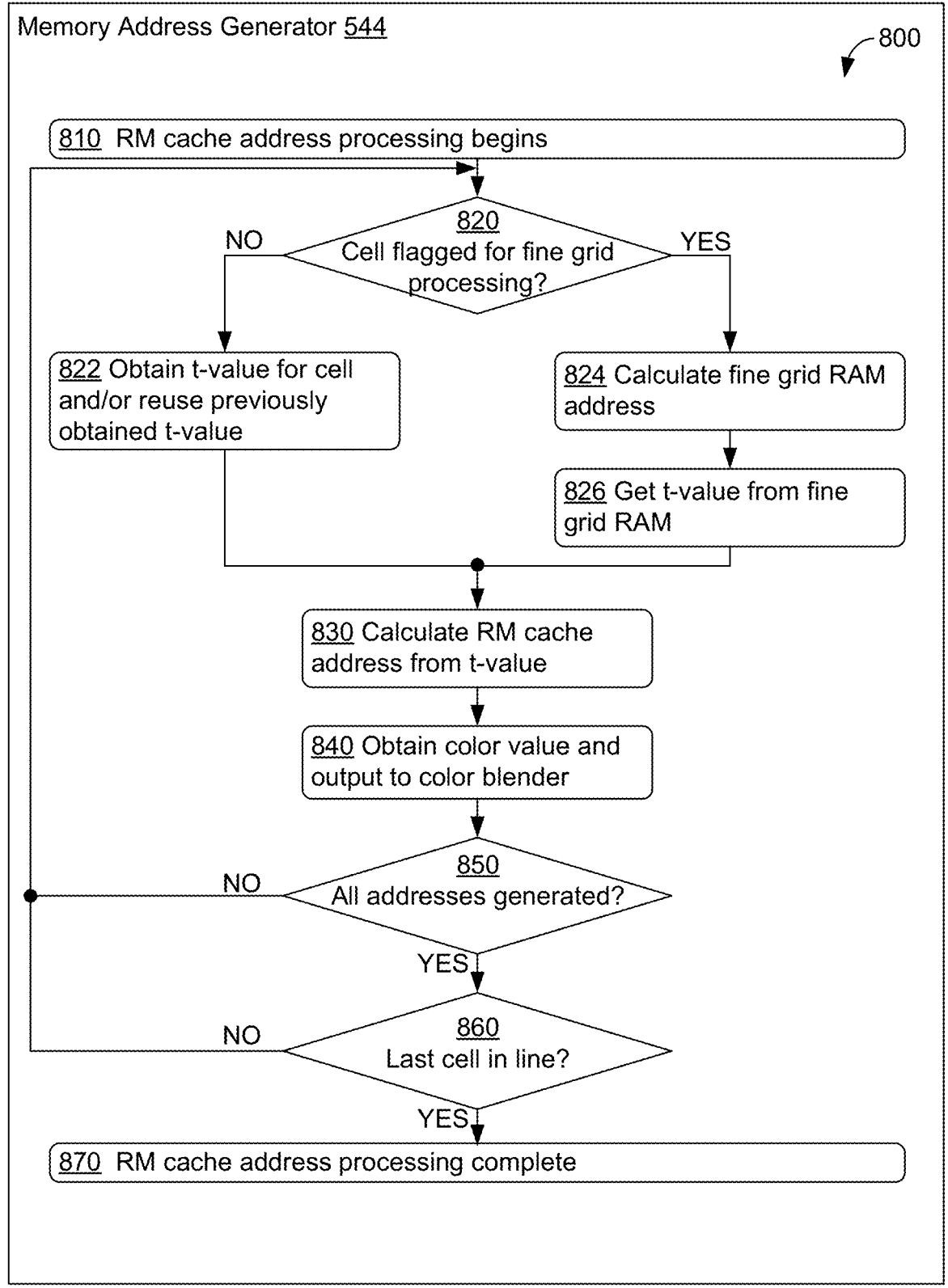
FIG. 8 depicts a memory address generator of the graphics engine circuitry of FIG. 4, according to an example embodiment.

FIG. 8 depicts a memory address generator 544 of graphics engine circuitry 420, according to an example embodiment. Memory address generator 544 can generate reverse mapping cache addresses associated with related, input t-values (or s-values). As indicated above, a reverse mapping cache address can be an index (or address) into a reverse mapping cache. The reverse mapping cache can be a lookup table or other representation of colors used during radial gradient rendering; e.g., an implementation of color blend 222. That is, memory address generator 544 can receive input t-values and output reverse mapping cache addresses representing colors of pixels associated with the input t-values. For example, memory address generator 544 can use Equation (30) or Equation (31) to determine an reverse mapping cache address RMCA based on an input t-value (or s-value). Then, the address RMCA can be provided to the reverse mapping cache RMC to determine a color corresponding to the input t-value, such as discussed at least above in the context of FIG. 5.

Reverse mapping can be performed for a line of cells of pixels; e.g., a line of 4×4 cells of pixels representing 4 rows of an image or frame. Before reverse mapping cache address generation begins for one or more 4×4 cells of pixels, a value can be obtained from a fine grid processing queue that indicates whether a t-value (or s-value) is to be read from coarse grid memory 556 as part of coarse grid processing of a 4×4 cell of pixels or from fine grid memory 554 as part of fine grid processing of the 4×4 cell of pixels. If fine grid processing is not indicated, a t-value (or s-value) is read from coarse grid memory 556 and the t-value duplicated for each of the 16 values in the 4×4 cell. If fine grid processing is indicated, each of 16 individual t-values (or s-values) is read from fine grid memory 554 and used for the 16 pixels of the 4×4 cell. Then, memory address generator 544 can use Equation (30) or Equation (31) to determine a reverse mapping cache address RMCA based on the input t-values for the 4×4 cell.

FIG. 8 shows that memory address generator 544 can execute method 800 to determine reverse mapping cache addresses and related colors for a line of cells of pixels LCP; e.g., a line of 4×4 cells of pixels.

Method 800 can begin at 810, as shown by FIG. 8. In some examples, a first input cell IC of pixels can be selected for processing from line of cells of pixels LCP during block 810. In particular of these examples, a first current pixel CP can be selected for processing from input cell IC. In other examples, other and/or additional initialization functionality for method 800 can be performed at block 810.

At block 820, memory address generator 544 can determine if input cell of pixels IC is indicated or flagged for fine grid processing. If input cell IC is indicated for fine grid processing, then memory address generator 544 can proceed to block 824. Otherwise, input cell IC is not indicated for fine grid processing, and memory address generator 544 can proceed to block 822.

At block 822, memory address generator 544 can obtain a t-value (or s-value) TVIN for use for current pixel CP of input cell IC; e.g., from coarse grid memory 556, or, if the t-value TVIN has already been obtained for input cell IC, the t-value (or s-value) TVIN can be reused for current pixel CP. Upon completion of the procedures of block 822, memory address generator 544 can proceed to block 830.

At block 824, memory address generator 544 can determine a fine grid address for a t-value for the current pixel CP of input cell IC.

At block 826, memory address generator 544 can read a t-value (or s-value) TVIN for the current pixel CP of input cell IC from fine grid memory 554 using the fine grid address determined at block 824.

At block 830, memory address generator 544 can use Equation (30) or Equation (31) to determine a reverse mapping cache address RMC_IN corresponding to t-value (or s-value) TVIN.

At block 840, memory address generator 544 can use reverse mapping cache address RMC_IN as an index into a reverse mapping cache determine a color value CV for the current pixel CP. Once color value CV has been obtained, the color value CV can be output to a color blender; e.g., color value CV can be output from memory address generator 544 as part of color blender interface data 570.

At block 850, memory address generator 544 can determine whether reverse mapping cache addresses have been generated for all pixels of input cell of pixels IC. If reverse mapping cache addresses have been generated for all pixels of input cell of pixels IC, then memory address generator 544 can proceed to block 860. Otherwise, reverse mapping cache addresses have not been generated for all pixels of input cell of pixels IC, then memory address generator 544 can update the current pixel CP within input cell IC to a pixel whose address has not been generated and proceed to block 820.

At block 860, memory address generator 544 can determine whether input cell IC is a last cell in the line of cells of pixels LCP to be processed for reverse mapping cache addresses. If input cell IC is a last cell in the line of cells of pixels LCP to be processed for reverse mapping cache addresses, then memory address generator 544 can proceed to block 870. Otherwise, input cell IC is not a last cell in the line of cells of pixels LCP to be processed for reverse mapping cache addresses, then an unprocessed cell of line of cells of pixels LCP can be selected for processing, and memory address generator 544 can proceed to block 820.

At block 870, memory address generator 544 can determine that processing of all cells of the line of cells of pixels LCP has been completed, and therefore method 800 can be completed. In some examples, clean-up and/or other ending functionality for method 800 can be completed as part of block 870.

During t-value generation, a good estimate of the t-value can extrapolated to reduce the number of iterations of the Newton-Raphson technique, as discussed herein at least in the context of FIG. 5. For a first processed pixel of a 2D frame, grid, or block of pixels, no t-value estimate is used and no t-value is fetched by t-value reader/t-neighbor fetcher 546. In some of these cases for the first processed pixel of a frame, grid, or block of pixels, a t-value can be set to a TINIT value which is the t-value for the first pixel of a frame, grid, or block of pixels, and can be calculated by graphics computing device 400 and passed as a parameter to radial gradient module 500. For a second processed pixel of the grid of pixels, an estimate of the t-value can be set to the t-value for the first processed pixel, as there are not yet enough t-values calculated to perform extrapolation. For each successive pixel of a first line of the grid of pixels, the t-estimate can be calculated using 1D extrapolation as indicated by Equation (29) above.

For the first column of the second line of the frame, grid, or block, the estimate is again set to the previous result, i.e., the t-value calculated for the first pixel of the block. For each successive pixel of the first column of the frame, grid, or block, the t-estimate is again calculated using 1D extrapolation using Equation (29). For all other pixels of the frame, grid, or block, Equation (28) is used to perform 2D extrapolation.

The 1D and 2D extrapolation is done during the radial gradient t-value generation, but the t-values required and an estimation mode, i.e., 2D extrapolation, 1D extrapolation, "use T0 as is for t-estimate", or "use T0 as is for t-value", can be determined by t-value reader/t-neighbor fetcher 546. T-value reader/t-neighbor fetcher 546 can read up to three neighboring t-values of a current pixel from fine grid memory 554 or coarse grid memory 556. Based on the row and column numbers of the current pixel, existing t-values previously stored for the neighboring t-values are read as values T0, T1, and T2 and output to the t-value generator along with an estimation mode value Tmode. The first t-value provided by t-value reader/t-neighbor fetcher 546 is set to the TINIT value. TINIT can be used "as is" or as a t-estimate for a first invocation of the Newton-Raphson technique.

In some examples, when one or more lines of pixels of a frame, grid, or block is longer than a pre-determined number of pixels (e.g., 16, 24, 32, 40, 48, 64, etc.), radial gradient module can break up the line(s) of pixels into columns having lines no longer than the pre-determined number of pixels. In these examples, a first t-estimate for a first column of the frame, grid, or block can be initialized to TINIT or some other default value. For the first t-value of all successive columns of the frame, grid, or block, an initial t-estimate can be set to the last t-value of the previous column for a first invocation of the Newton-Raphson technique on a current column. For the first t-value of the first column of the second and successive rows, a t-estimate can be set to a first t-value of the first column of the previous row. For fine grid processing of a cell of pixels, the first corner t-value of the cell can be fetched from coarse grid memory 556. Since this corner t-value has already been processed, the t-value can be used "as is".

Figure 9:
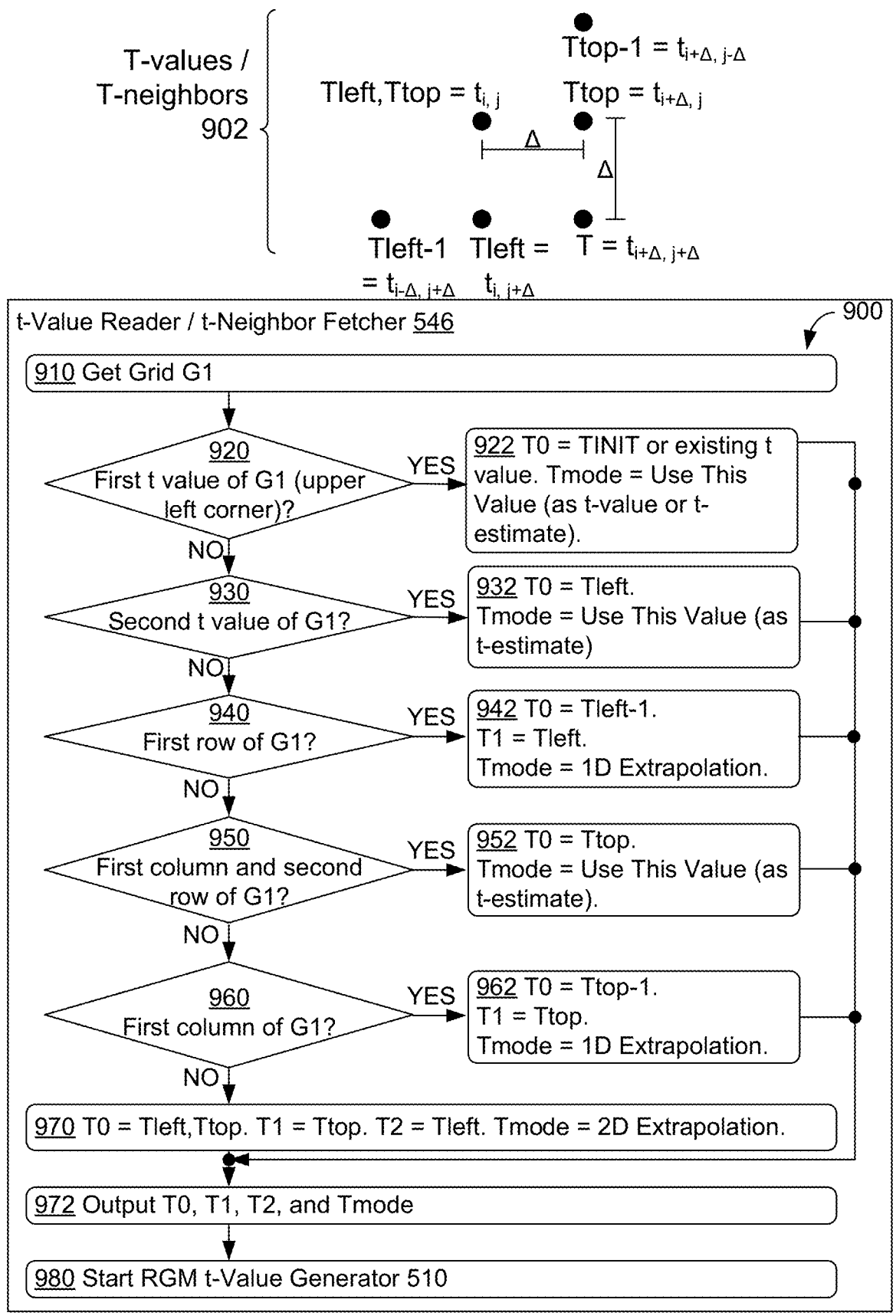
FIG. 9 shows a t-value reader/t-neighbor fetcher of the graphics engine circuitry of FIG. 4, according to an example embodiment.

FIG. 9 shows a t-value reader/t-neighbor fetcher 546 of graphics engine circuitry 420, according to an example embodiment. T-value reader/t-neighbor fetcher 546 can retrieve t-values (or s-values) and/or t-neighbors (or corresponding s-neighbors). An example set of five t-values/t-neighbors 902 is shown in an upper portion of FIG. 9. T-values/t-neighbors 902 include t-value T located at source domain coordinates $(i+\Delta, j+\Delta)$; t-value Tleft located at source domain coordinates $(i, j+\Delta)$ (i.e., just left of t-value T); t-value Ttop located at source domain coordinates $(i+\Delta, j)$ (i.e., just above/atop of t-value T), Tleft, Ttop located at source domain coordinates $(i, j)$ (i.e., left and above t-value T); t-value Tleft−1 located at source domain coordinates $(i-\Delta, j+\Delta)$ (i.e., two t-values left of t-value T), and t-value Ttop−1 located at source domain coordinates $(i+\Delta, j-\Delta)$ (i.e., two t-values above of t-value T); where A is a pre-determined distance in the source domain, Δ>0.

T-value reader/t-neighbor fetcher 546 utilizes four values in operation: up to three t-values/t-neighbor values T0, T1, and T2 as illustrated in FIG. 9, and an estimate mode control Tmode to control and/or indicate a mode used for t-value estimation. In other examples, T-value reader/t-neighbor fetcher 546 can retrieve t-value T3 as well.

In the example illustrated by FIG. 9, t-value reader/t-neighbor fetcher 546 can set estimate mode control Tmode to one of three mode values: (1) a mode value of "Use This Value" to indicate that T0 can be used as a fetched t-value and that T1 and T2 can be ignored; (2) a mode value of "1D Extrapolation" to indicate that T0 can be used as a fetched t-value, T1 can be used as a fetched t-value for 1D extrapolation purposes, and T2 can be ignored; and (3) a mode value of "2D Extrapolation" to indicate that T0 can be used as a fetched t-value and that T1 and T2 can be used as a fetched t-values for 2D extrapolation purposes. Other mode values are possible as well.

FIG. 9 shows that t-value reader/t-neighbor fetcher 546 can execute method 900 to provide t-values and t-neighbor values associated with a grid G1 of pixels. In one example, G1 is a 32×32 grid of pixels arranged as an 8×8 grid of 4×4 cells of pixels; in other examples, G1 can have a different number of rows than 32 and/or a different number of columns than 32 and/or is not arranged as a grid of cells of pixels.

Method 900 can begin at block 910, where t-value reader/t-neighbor fetcher 546 can obtain part or all of grid G1; e.g., receive part or all of G1 as an input; read part or all of G1 from memory, such as fine grid memory 554 or coarse grid memory 556. In some examples, t-value reader/t-neighbor fetcher 546 additionally can initialize one or more values at block 910; e.g., a current pixel value, which can be set to a pixel at an upper-left corner of grid G1 or another pixel in grid G1, a current cell value, which initialized to a cell that includes the current pixel value, a current t-value, which can be initialized to TINIT or another default value, T0, T1, T2, Tmode, etc.

Method 900 fetches t-values/t-neighbors related to pixels of grid G1 from left to right and from top to bottom; i.e., method 900 starts with a pixel (or cell) at the upper-left corner of grid G1, proceeds across an upper line of (grids of) pixels of G1 from left to right, proceeds across a line of (grids of) pixels just below the upper line of (grids of) pixels of G1 from left to right, and so on until reaching a rightmost pixels of a lowest line of (grids of) pixels of G1; that is a pixel (or cell) in the lower-right corner of grid G1.

At block 920, t-value reader/t-neighbor fetcher 546 can determine whether a current t-value is a first t-value of grid G1; e.g., is t-value reader/t-neighbor fetcher 546 obtaining a t-value when the current pixel (or cell) is at the upper-left corner of grid G1. If the current t-value is the first t-value of grid G1, t-value reader/t-neighbor fetcher 546 can proceed to block 922. Otherwise, the current t-value is not the first t-value of grid G1 and t-value reader/t-neighbor fetcher 546 can proceed to block 930.

At block 922, t-value reader/t-neighbor fetcher 546 can set T0 to a default value; e.g., TINIT, or an existing t-value; e.g., a t-value of a previously processed grid or column of pixels. T-value reader/t-neighbor fetcher 546 can also set Tmode equal to an estimation mode value to "Use This Value" as a t-value or t-estimate. Upon completion of the procedures of block 922, t-value reader/t-neighbor fetcher 546 can proceed to block 972.

At block 930, t-value reader/t-neighbor fetcher 546 can determine whether a current t-value is a second t-value of grid G1; e.g., is t-value reader/t-neighbor fetcher 546 obtaining a t-value for a pixel (or cell) immediately right of an upper-left corner of grid G1. If the current t-value is the second t-value of grid G1, t-value reader/t-neighbor fetcher 546 can proceed to block 932. Otherwise, the current t-value is not the first t-value of grid G1 and t-value reader/t-neighbor fetcher 546 can proceed to block 940.

At block 932, t-value reader/t-neighbor fetcher 546 can set T0 to Tleft, which is a t-value of a pixel (or cell) immediately to the left of a current pixel (or cell) as illustrated by t-values/t-neighbors 902. T-value reader/t-neighbor fetcher 546 can also set Tmode equal to an estimation mode value to "Use This Value" as a t-estimate. Upon completion of the procedures of block 932, t-value reader/t-neighbor fetcher 546 can proceed to block 972.

At block 940, t-value reader/t-neighbor fetcher 546 can determine whether a current t-value is in a first row of grid G1; e.g., is t-value reader/t-neighbor fetcher 546 obtaining a t-value for a pixel (or cell) in an uppermost row of grid G1. If the current t-value is in the first row of G1, t-value reader/t-neighbor fetcher 546 can proceed to block 942. Otherwise, the current t-value is not the first t-value of grid G1 and t-value reader/t-neighbor fetcher 546 can proceed to block 950.

At block 942, t-value reader/t-neighbor fetcher 546 can set T0 to Tleft−1, which is a t-value of a pixel (or cell) immediately to the left of the Tleft value, as illustrated by t-values/t-neighbors 902, and can set T1 to Tleft. T-value reader/t-neighbor fetcher 546 can also set Tmode equal to an estimation mode value to "1D Extrapolation". Upon completion of the procedures of block 942, t-value reader/t-neighbor fetcher 546 can proceed to block 972.

At block 950, t-value reader/t-neighbor fetcher 546 can determine whether a current t-value is in a first column and second row of grid G1; e.g., is t-value reader/t-neighbor fetcher 546 obtaining a first t-value for a pixel (or cell) for a second-from-uppermost row of grid G1. If the current t-value is in the first column and second row of G1, t-value reader/t-neighbor fetcher 546 can proceed to block 952. Otherwise, the current t-value is not the first t-value of grid G1 and t-value reader/t-neighbor fetcher 546 can proceed to block 960.

At block 952, t-value reader/t-neighbor fetcher 546 can set T0 to Ttop, which is a t-value of a pixel (or cell) immediately above a current pixel (or cell) as illustrated by t-values/t-neighbors 902. T-value reader/t-neighbor fetcher 546 can also set Tmode equal to an estimation mode value to "Use This Value" as a t-estimate. Upon completion of the procedures of block 952, t-value reader/t-neighbor fetcher 546 can proceed to block 972.

At block 960, t-value reader/t-neighbor fetcher 546 can determine whether a current t-value is in a first column of grid G1; e.g., is t-value reader/t-neighbor fetcher 546 obtaining a first t-value for a pixel (or cell) of a row of grid G1. If the current t-value is in the first column of G1, t-value reader/t-neighbor fetcher 546 can proceed to block 962. Otherwise, the current t-value is not the first t-value of grid G1 and t-value reader/t-neighbor fetcher 546 can proceed to block 970.

At block 962, t-value reader/t-neighbor fetcher 546 can set T0 to Ttop−1, which is a t-value of a pixel (or cell) immediately above the Ttop value, as illustrated by t-values/t-neighbors 902, and can set T1 to Ttop. T-value reader/t-neighbor fetcher 546 can also set Tmode equal to an estimation mode value to "1D Extrapolation". Upon completion of the procedures of block 942, t-value reader/t-neighbor fetcher 546 can proceed to block 972.

At block 970, t-value reader/t-neighbor fetcher 546 can set T0 to Tleft, Ttop, set T1 to Ttop, and set T2 to Tleft. Tleft, Ttop is a t-value of a pixel (or cell) immediately left of and immediately above the t-value, as illustrated by t-values/t-neighbors 902. T-value reader/t-neighbor fetcher 546 can also set Tmode equal to an estimation mode value to "2D Extrapolation".

At block 972, t-value reader/t-neighbor fetcher 546 can output T0, T1, T2, and Tmode; e.g., to RGM t-value generator 510.

At block 980, t-value reader/t-neighbor fetcher 546 can instruct RGM t-value generator 510 to start and determine a new t-value based on T0, T1, T2, and Tmode output at block 972. Upon completion of the procedures of block 980, method 900 can be completed.

Each t-value generated is stored in either in fine grid memory 554 (when fine grid processing is being performed) or coarse grid memory 556. In some examples, fine grid memory 554 can include one or more locations of RAM and/or coarse grid memory 556 can include a coarse grid array of registers. Coarse/fine grid select/t-value writer 542 can determine one or more indices into fine grid memory 554 and coarse grid memory 556 and can store a t-value into one or more memory locations and/or registers addressed by the calculated index/indices. Coarse/fine grid select/t-value writer 542 can maintain a column number value CNV and a row number value RNV; for each t-value stored by coarse/fine grid select/t-value writer 542, column number value CNV can be incremented; then, when each row or lines of a frame or grid is completed, row number value RNV can be incremented. The CNV and RNV values can be used to index or address t-value storage; e.g., index coarse grid memory 556, address fine grid memory 554.

In some examples, coarse grid memory 556 can be indexed by coarse/fine grid select/t-value writer 542 using the above-mentioned column number and row number values; e.g., if coarse grid memory can be considered to be a 2-D array of registers (or other memory locations) CGM, then CGM(RNV, CNV) can be used to obtain a t-value (or other value) stored at row RNV and column CNV of the 2D array of coarse grid memory 556. In another example, fine grid memory 554 can be indexed by coarse/fine grid select/t-value writer 542 as a 1D array of memory locations FGM storing data for 4×4 cells of pixels, where an address FGMA can be calculated as FGMA=(4*CNV+i)+(4*RNV+j), where i and j are cell indexes, each taking a value selected from {0, 1, 2, 3}. Other addressing procedures/formulas for fine grid memory 554 and/or coarse grid memory 556 are possible as well. In other examples, coarse/fine grid select/t-value writer 542 can have priority in accessing fine grid memory 554 and/or coarse grid memory 556 over memory address generator 544, t-value reader/t-neighbor fetcher 546, edge detector 552, and/or other components of radial gradient module 500.

Figure 10:
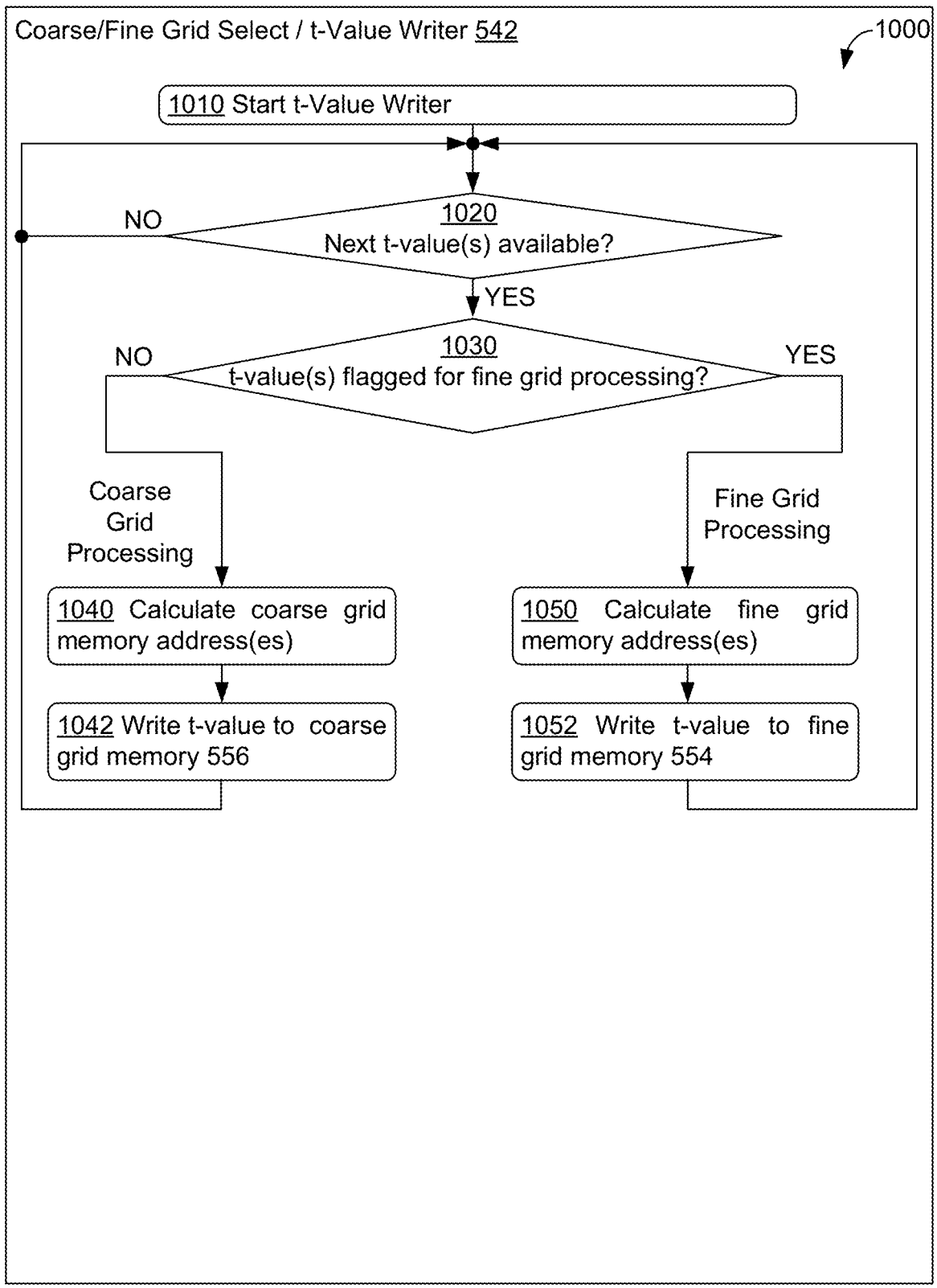
FIG. 10 shows a coarse/fine grid select/t-value writer of the graphics engine circuitry of FIG. 4, according to an example embodiment.

FIG. 10 shows that coarse/fine grid select/t-value writer 542 can execute method 1000 to write t-values to memory, such as fine grid memory 554 and coarse grid memory 556, according to an example embodiment. Method 1000 can begin at block 1010, where coarse/fine grid select/t-value writer 542 can begin execution.

At block 1020, coarse/fine grid select/t-value writer 542 can determine whether one or more t-values are available for writing to memory. If the t-value(s) are available, coarse/fine grid select/t-value writer 542 can proceed to block 1030; otherwise, no t-value is available and coarse/fine grid select/t-value writer 542 can proceed to block 1020. In some examples, when no t-value is available and coarse/fine grid select/t-value writer 542 can proceed to block 1020. In other examples, when the last t-value is flagged by an end of block signal, then coarse/fine grid select/t-value writer 542 can stop execution of method 1000.

At block 1030, coarse/fine grid select/t-value writer 542 can receive one or more available t-values, if not already received, and determine whether fine-grid processing is to be performed for the available t-value(s). For example, the available t-value(s), one or more pixels associated with the available t-value(s), and/or one or more cells associated with the available t-value(s) can be flagged to perform (or not to perform) fine-grid processing, and coarse/fine grid select/t-value writer 542 can use one or more flags of the flagged t-value(s), pixel(s), and/or cell(s) to determine whether fine-grid processing is to be performed for the available t-value(s). If coarse/fine grid select/t-value writer 542 determines that fine-grid processing is to be performed for the available t-value(s), then coarse/fine grid select/t-value writer 542 can proceed to block 1050. Otherwise, coarse/fine grid select/t-value writer 542 determines that fine-grid processing is not to be performed for the available t-value(s) and coarse/fine grid select/t-value writer 542 can proceed to block 1040.

At block 1040, coarse/fine grid select/t-value writer 542 can calculate one or more coarse grid memory addresses for storing the available t-value(s). For example, coarse/fine grid select/t-value writer 542 can calculate one or more coarse grid memory addresses using the column number value CNV and a row number value RNV as addresses for indexing into coarse grid memory 556 as discussed above.

At block 1042, coarse/fine grid select/t-value writer 542 can write the available t-value(s) to coarse grid memory 556 using the coarse grid memory address(es) generated at block 1040. Upon completion of the procedures of block 1042, coarse/fine grid select/t-value writer 542 can proceed to block 1020. In some examples, the column number value CNV can be incremented and, if at the end of a row, the row number value RNV can be incremented as part of the procedures of block 1042.

At block 1050, coarse/fine grid select/t-value writer 542 can calculate one or more fine grid memory addresses for storing the available t-value(s). For example, coarse/fine grid select/t-value writer 542 can calculate one or more fine grid memory addresses using the column number value CNV and a row number value RNV as inputs to the above-mentioned equation for a fine grid memory address FGMA mentioned above; e.g., FGMA=(4*CNV+i)+(4*RNV+j), where i and j are indices into a cell of pixels being processed using fine grid processing as also mentioned above.

At block 1052, coarse/fine grid select/t-value writer 542 can write the available t-value(s) to fine grid memory 554 using the fine grid memory address(es) generated at block 1050. Upon completion of the procedures of block 1052, coarse/fine grid select/t-value writer 542 can proceed to block 1020. In some examples, the column number value CNV can be incremented and, if at the end of a row, the row number value RNV can be incremented as part of the procedures of block 1052.

A quadratic equation, such as Equation (1), Equation (13), or Equation (24), can have two roots when a quadratic coefficient (e.g., coefficient A in Equation (1)) of the quadratic equation is non-zero. Radial gradient module 500 can select one of the two roots as a correct root. The selection of a root as being correct (or incorrect) can be based on the absence (or presence) of visual artifacts. Generally speaking, radial gradient rendering depicts transitions of colors based on a color blend or other data structure mapping t-values to colors. In cases where a color blend shows a smooth transition between colors, such as color blend 222, an image rendered by radial gradient rendering using such a color blend, often has smooth transitions of colors in accord with the color blend.

Radial gradient module 500 can select a correct root based on the value of a quadratic coefficient A of a quadratic equation for Algorithm A. If A equals 0, radial gradient module can perform the procedures discussed in the context of Degenerate Case 1 to determine a root, if any, of the quadratic equation; i.e., Equation (1) does not have a root when A=B=0 and C≠0. That root is then presumed to be the correct root of the quadratic equation. In some examples, Degenerate Case 1 processing is also used by radial gradient module 500 for Algorithm B as indicated in Tables 1 and 2. In particular of these examples, Degenerate Case 3 processing is also used by radial gradient module 500 for both Algorithms A and B as indicated in respective Tables 1 and 2.

When A is less than 0 for Algorithm A, radial gradient module 500 can select a smaller root S of the quadratic equation as discussed above at least in the context of Degenerate Case 2 and Table 1. Then, let b'=B/A, and radial gradient module 500 can determine whether both b'<0 and the root is greater than −b'/2. If both b'<0 and the root is greater than −b'/2 (i.e., the larger root), then the root can be set to −b'−root to find the smaller root, S. Radial gradient module 500 can then use the value of S as the correct root value for Algorithm A when A<0.

When A is greater than 0 for Algorithm A, radial gradient module 500 can first determine a larger root L of the quadratic equation. It can compare the root to −b'/2, where b'=B/A, and where B=a linear coefficient of the quadratic equation. If the root is less than −b'/2, then the root can be set to −b'−root to find the larger root, L. Radial gradient module 500 can then use the value of L as the correct root value for Algorithm A when A>0.

Correct root selection for Algorithm B is illustrated in Table 2. If A<0 in Equation (13), a larger root L of Equation (13) is first selected as the correct root for Algorithm B, and if that does not lead to a successful result, a smaller root S of Equation (13) is used instead for the correct root for Algorithm B. If A>0 in Equation (13), radial gradient module 500 can determine a value $$E = \frac{-r_0}{r_1 - r_0},$$

where $r_0$ and $r_1$ are radii values of Algorithm B. Then, if E≤0, the larger root L can be selected as a correct root for Algorithm B; otherwise E>0 and the smaller root S is selected as the correct root for Algorithm B.

Figure 11:
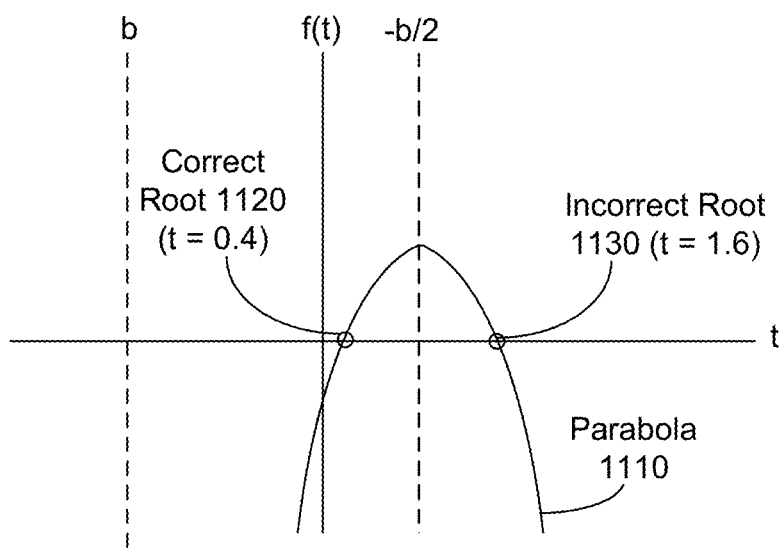
FIG. 11 shows a diagram of a parabola having two real roots, according to an example embodiment.

FIG. 11 shows diagram 1100 of parabola 1110 having two real roots 1120, 1130, according to an example embodiment. Parabola 1110 depicts values of a function f(t), which is specific example of Equation (1) with A=−1, B=2, and C=−0.64; e.g., $-t^2+2t-0.64=0$. In FIG. 11, t values are illustrated using a horizontal axis, and f(t) values are illustrated using a vertical axis. The roots of f(t), or t-values where f(t)=0, are root 1120 having a value of 0.4 and root 1130 having a value of 1.6.

When the quadratic coefficient A is less than 0, such as indicated for f(t) above, a smaller positive root of the quadratic equation can be selected as the correct root. FIG. 11 indicates that root 1120 is the smaller positive root, and so is labeled as "Correct Root" 1120, while root 1120 is not the correct root and so is labeled as "Incorrect Root" 1130.

FIG. 12 shows two images 1210, 1220 generated utilizing radial gradient techniques, each image associated with one of the two real roots of FIG. 11, according to an example embodiment. Images 1210 and 1220 are illustrations of radial gradient rendering based on a same quadratic equation having a quadratic coefficient A<0, using a color blend similar to color blend 222, and with all other parameters the same for both example images 1210, 1220.

Image 1210 is generated based on selections of smaller positive roots as t-values, leading to correct radial gradient rendering 1212 showing a smooth transition of colors from a relatively-dark pixel at a beginning of an arrow illustrating radial gradient rendering 1212 to a relatively-light pixel at the end of the arrow illustrating radial gradient rendering 1212. Image 1220 is generated based on selections of larger positive roots as t-value, leading to incorrect radial gradient rendering 1222 illustrated using an arrow; e.g., using the larger root results in a mirroring effect and other artifacts. In particular, incorrect radial gradient rendering 1222 shows non-smooth transitions of colors in image 1220 from a relatively-dark pixel at a beginning of the arrow to relatively-light pixels then to relatively-dark pixels until reaching location 1224, and, following the arrow past 1222, colors in image 1220 rapidly change from relatively-dark to relatively light.

As indicated herein, radial gradient module 500 can process a frame, grid, or block of pixels organized as cells of pixels; e.g., 4×4 cells. In particular, RGM pixel interface 512 can use coarse grid processing which calculates and stores one t-value for each 4×4 cell of pixels. When two lines of a frame, grid, or block of pixels have been processed, and four corner t-values of the 4λ4 cell in the coarse grid array are available, RGM pixel interface 512 can use edge detector 552 to detect edges of ellipses or rings in the 4×4 cell. If an edge is detected in a 4×4 cell on a line L1 of the frame, grid, or block of pixels, then fine grid processing is used and a location of the cell can be flagged for fine grid processing. When t-values for the entire line L1 have been processed using coarse grid processing, the reverse mapper is restarted with a new block request to process all 16 pixels of each 4×4 cell in line L1 that has been flagged for fine grid processing.

During fine grid processing of 4×4 cell C1 in line L1, a t-value is determined for each pixel in cell C1. The resulting sixteen t-values can be stored in fine grid memory 554. Fine grid processing of determining a t-value for each pixel in a cell can be repeated for each flagged cell in the line L1. After t-values for the flagged cells are stored, the reverse mapper can be (re)started to process a new block beginning with the next line with t-values of the first line being mapped to a colors and output to the color blender.

There are three cases that can lead to visible artifacts when processed using reduced spatial resolution; i.e., using coarse grid processing. These artifacts are caused by the jaggedness of low resolution, high contrast edges of an ellipse or ring within a grid. The first two cases leading to artifacts can occur when a radial gradient origin is outside an ellipse of Algorithm A; i.e., at the edge of the "cone." Such artifacts are generated where the quadratic coefficient A of Equation (1) for algorithm A is less than 0 (one case leading to artifacts) or A is equal to 0 (a second case leading to artifacts. Processing by radial gradient module 500 when A≤0 is described above in the context of at least Tables 1 and 2, Degenerate Cases 1 and 2, and FIGS. 5, 11, and 12. The third case leading to artifacts occurs when the above-mentioned SPREAD_METHOD parameter is set to a value of REPEAT and an edge occurs when a t-value changes from 0 to 1. Spread processing technique is discussed above, including spread processing pseudocode shown in Table 3 above.

Radial gradient module 500 can enable fine grid processing when any of these three cases leading to artifacts occur. In some cases, the default for radial gradient module 500 is to process cells of pixels at low resolution/using coarse grid processing; then, radial gradient module 500 switches to higher resolution/uses fine grid processing upon detection of an edge, such as discussed immediately above. When, fine grid processing is used, t-values are calculated for all 16 pixels of a 4×4 cell where an edge is detected. When edge detection is enabled, radial gradient module 500 can also process one extra column of pixels and one extra row of pixels around a cell, so fine grid processing can use coarse grid cells of a last column and/or a last row as necessary. For example, if edge detection is enabled for a 4×5 cell of pixels, adding the extra row and column of pixels can involve radial gradient module 500 processing a 5×6 cell of pixels). Fine grid processing is also discussed above in the context of at least FIGS. 1, 5, and 7-10.

A simulation has been performed to estimate a percentage of cells that would use fine grid processing when radial gradient module 500 can perform the herein-described technique of adaptively switching between coarse grid processing and fine grid processing. For example, in a 1600×1600 pixel radial gradient region, the simulation indicated that 938 4×4 cells would use fine grid processing out of a total of 160,000 4×4 cells in the region; leading to an average number of calculations per cell of the simulation of 1.0875. That is, for the 2,560,000 pixels of the 1600×1600 radial gradient region, the number of t-values calculated would be: (938×16)+(159,062×1)=(15,008)+(159,062)=174,070. In comparison, a second technique that calculated a t-value per pixel would involve calculating 2,560,000 t-values for the 1600×1600 radial gradient region. Then the ratio of a number of t-values calculated using the herein-described technique to number of t-values calculated using the second technique would equal 174,070/2,560,000≅0.068=6.8% of the number of t-values. Thus, the herein-described technique of adaptively switching between coarse grid processing and fine grid processing can significantly reduce processing for radial gradient rendering. This suggests that, for many regular radial gradient rendering operations, performance overhead due to fine grid processing will be less than 10%.

To identify an edge the following processing is implemented: After t-values have been determined for every corner pixel of the 4×4 cell, but before applying spreading, an edge can be detected using one or more the following edge detection techniques:

Delta greater than threshold—this technique finds the difference or "delta" between any two adjacent t-values of the four corner t-values of a cell of pixels; e.g., a 4×4 cell of pixels, and corresponding t-values. The technique proceeds by comparing the delta to a threshold value TH_DELTA and if delta>TH_DELTA, then an edge is detected. This technique for edge detection can find edges where the gradient over a 4×4 cell is relatively large and therefore causes a visible artifact.

Sign difference—this technique can detect a difference in the signs between any two adjacent t-values of the four corner t-values of a cell of pixels and corresponding t-values. For example, this edge detection technique can find an edge generated by a perimeter of a starting circle in the source domain.

Greater than one difference—this technique can determine whether a corner t-value T of a cell of pixels and corresponding t-values is greater than 1.0. If T>1.0, the technique can set a flag for the corner of the cell associated with T based on this comparison. A difference in this flag between any two adjacent t-values of the four corner t-values of a 4×4 cell will indicate an edge. For example, this edge detection technique can find an edge generated by a perimeter of an ending circle in the source domain.

Integral difference—this technique can determine whether any two adjacent t-values of the four corner pixels of a cell and corresponding t-values have different integer part values; i.e., for the real values 2.345, 320, −3.7, and −4.2×10$^3$, the corresponding respective integer part values are 2, 320, −3, and −4200. If the two adjacent t-values have different integer part values, then the technique can detect an edge. For example, this edge detection technique can find an edge generated by a perimeter of a repeating ellipse where the t-values transition between 0.0 and 1.0 after the spread method has been applied.

Negative discriminant—this technique can determine whether any of the four corner pixels of a cell have a negative discriminant value; e.g., the value of the discriminant $b^2-4c<0$, where b=B/A, c=C/A, and where A, B, and C are as defined for Equation (1) for Algorithm A or as similarly defined for Equation (13) for Algorithm B. If at least one corner pixel has a negative discriminant value, then the technique can detect an edge. For example, this edge detection technique can find an edge generated at a boundary of a cone. In some examples, an appropriate flag or error value (e.g., a t-value of −1.0) can be used to signal that a corner pixel has a negative discriminant value.

Root size difference—this technique can determine whether any two adjacent t-values of the four corner pixels of a 4×4 cell and corresponding t-values select different sized roots of a quadratic equation. If there is a difference in the root selected, i.e., larger root or smaller root, between any two adjacent t-values of the four corner t-values of a 4×4 cell, an edge will be detected. For example, this technique can detect an edge when an ending circle overlays a starting circle.

Other edge detection techniques are possible as well. Then, if an edge is detected in a cell, fine grid processing is used to calculate a radial gradient for the cell at a higher resolution than used by coarse grid processing.

In some examples, a pre-condition for using the above-mentioned detection techniques can be a check that the SPREAD_METHOD parameter is equal to REPEAT and/or that the quadratic coefficient A is less than or equal to zero. For some edge detection techniques, such as the integral difference edge detection technique, are only carried out when the SPREAD_METHOD parameter is equal to REPEAT.

Radial gradient module 500 can calculate t-values first for all cells at a coarse-grid resolution, and then calculate t-values at a fine-grid resolution for each cell flagged for fine grid processing and/or edge detection. For an example using 4×4 cells of pixels, coarse-grid resolution can be 1 t-value per cell, which is equivalent to calculating 1 t-value per 16 pixels, and fine-grid resolution can be 1 t-value per pixel per cell flagged for fine grid processing and/or edge detection.

Other possible cell sizes, coarse-grid resolutions and/or fine-grid resolutions are possible as well. For example, radial gradient module 500 can operate in a "full resolution" mode, where radial gradient module 500 calculates a t-value for each pixel of a frame, grid, or block of pixels; i.e., no coarse grid processing is performed while in full resolution mode. In the full resolution mode, t-neighbors for the "Use This Value", "1D Extrapolation", and "2D Extrapolation" estimation modes can be processed using neighboring pixels. In the full resolution mode, one full row of pixels of the frame, grid, or block of pixels is processed at a time followed by the next row with no pixels or rows being skipped in this mode.

The resulting output of radial gradient module 500 can be a stream of t-values in plain line-to-line sequence. In some examples, radial gradient module 500 can pipeline the t-value calculation and the output scan at the coarse-grid resolution; e.g., the pipeline can involve calculating t-values of one row of cells and reading out the stream of t-values for pixels of previous row of cells.

Figure 13A:
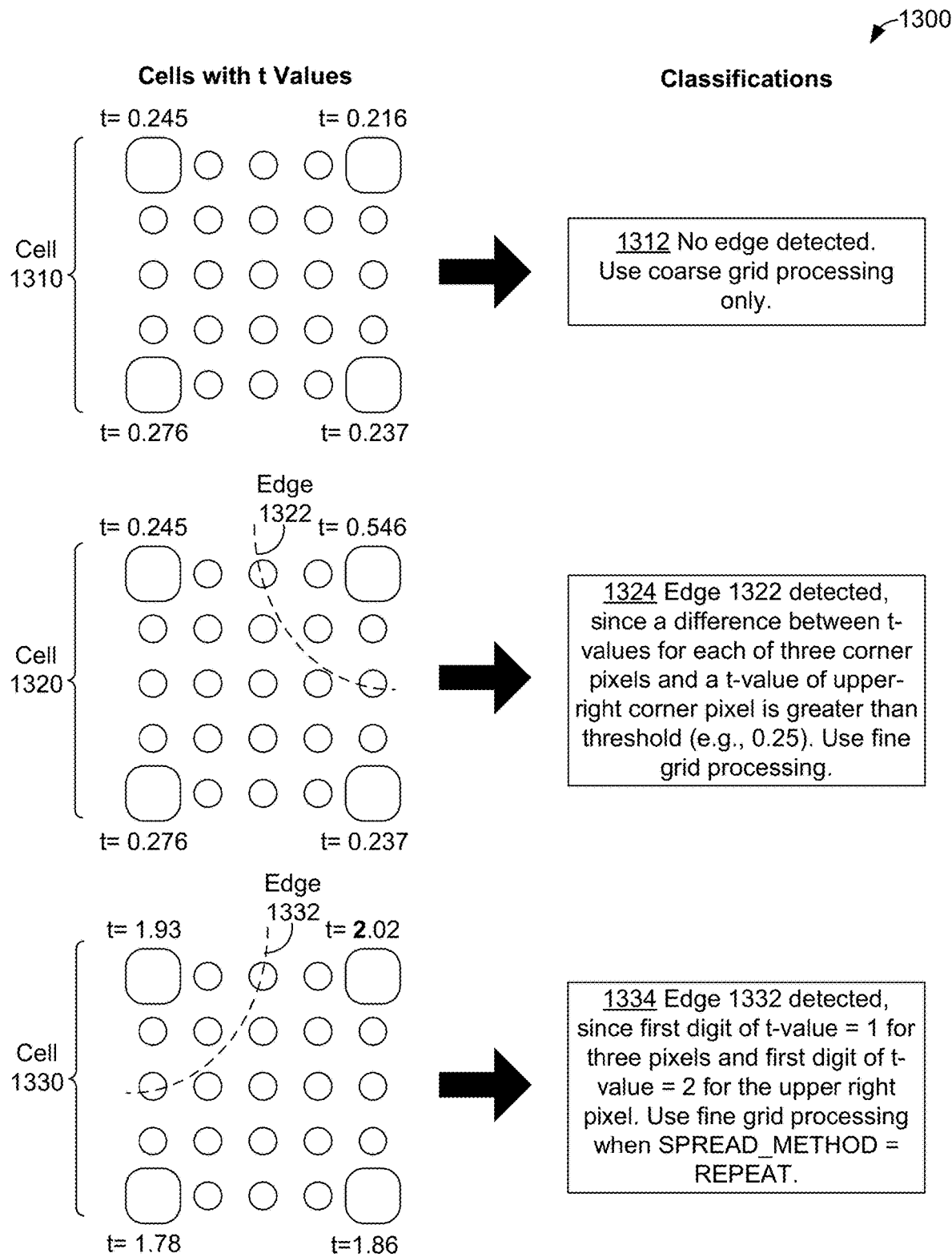
FIGS. 13A, 13B, and 13C show a scenario related to one or more grids of pixels and associated classifications of the grid(s), according to an example embodiment.
Figure 13B:
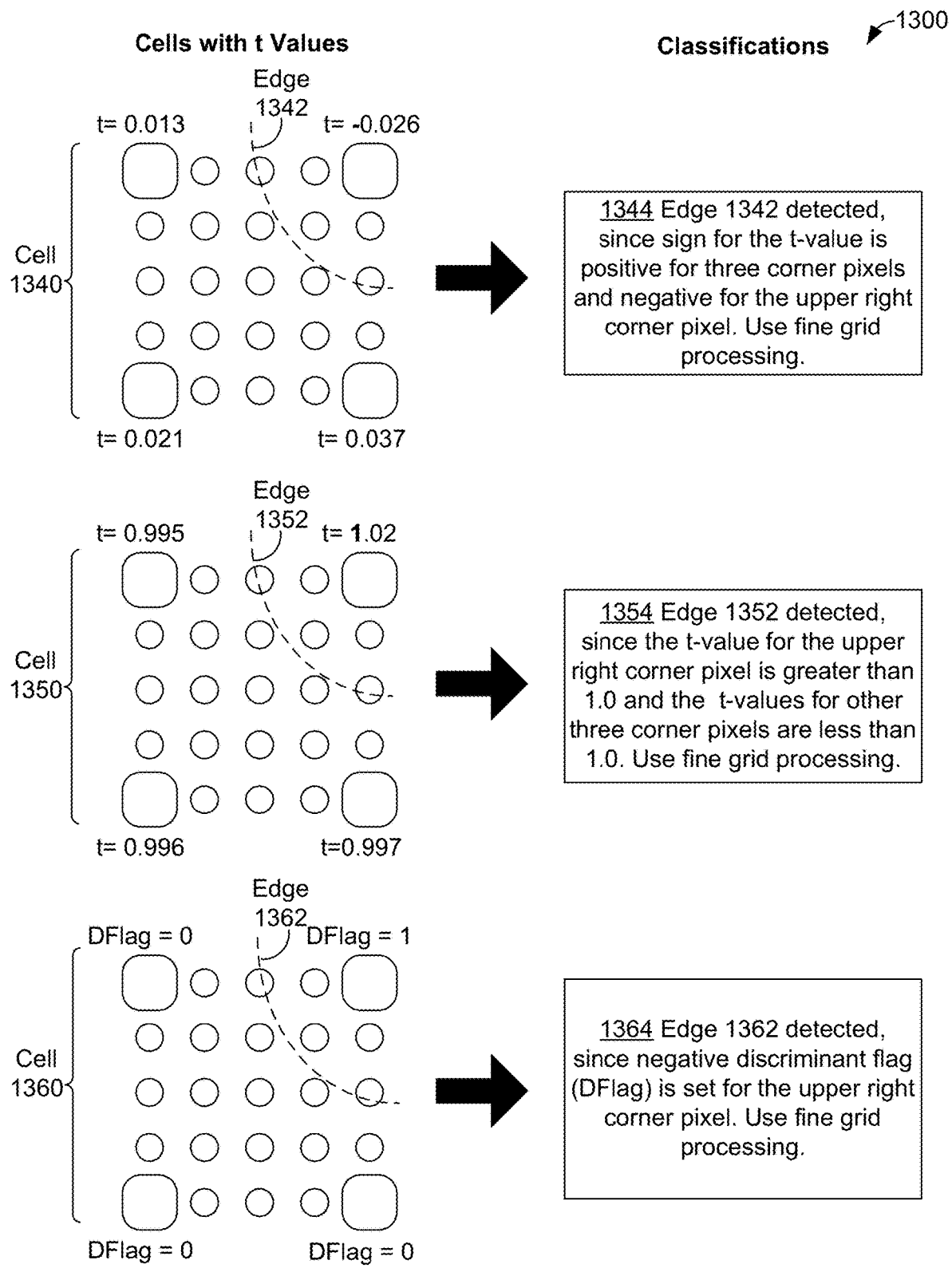
Figure 13C:
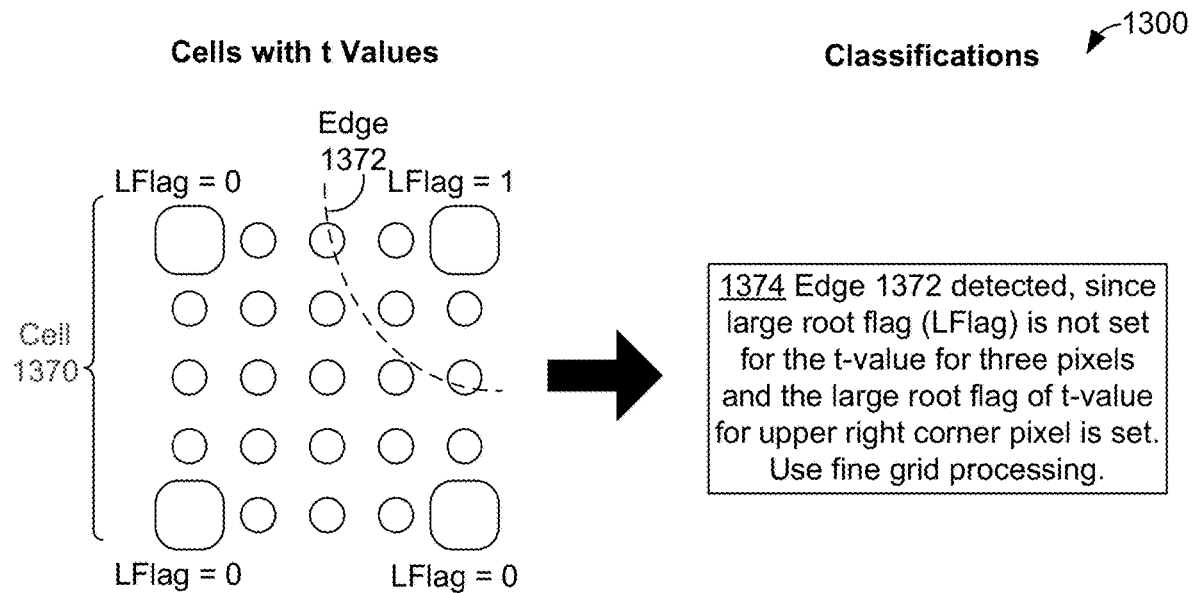

FIGS. 13A, 13B, and 13C show scenario 1300 related to one or more grids of pixels and associated classifications of the grid(s), according to an example embodiment. Scenario 1300 involves edge detection performed in cells 1310, 1320, 1330, 1340, 1350, 1360, 1370 of a frame of pixels FP1300 representing an image. The edge detection in scenario 1300 is performed by edge detector 552.

Note that the corners of each of cells 1310, 1320, 1330, 1340, 1350, 1360, 1370 include a t-value: one t-value in an upper-left corner of the cell, e.g., at cell coordinates (0,0); one t-value in an upper-right corner of the cell, e.g., at cell coordinates (0,4); one t-value in a lower-left corner of the cell, e.g., at cell coordinates (4,0); and one t-value in a lower-right corner of the cell, e.g., at cell coordinates (4,4). FIGS. 13A, 13B, and 13C depict the corners of cells 1310, 1320, 1330, 1340, 1350, 1360, 1370 as coarse pixels, and illustrate the t-values calculated for each of these corners. The remaining (non-corner) pixels of cells 1310, 1320, 1330, 1340, 1350, 1360, 1370 are depicted in FIGS. 13A, 13B, and 13C as fine pixels.

Scenario 1300 can be carried out by edge detector 552 of radial gradient module 500. In scenario 1300, edge detector 552 is configured to carry out each of the edge detection techniques listed above for each 4×4 cell of frame FP1300; e.g., the delta greater than threshold, the sign difference, the greater than one difference, the integral difference, the negative discriminant, and the root size difference edge detection techniques. In particular, in scenario 1300, edge detector 552 carries out the edge detection techniques until either (a) an edge detection technique detects an edge, leading edge detector 552 to stop carrying out edge detection and to classify the cell has having a detected edge or (b) all of the edge detection techniques have been carried out without detecting an edge, leading edge detector 552 classify the cell has not having a detected edge. After carrying out the edge detection techniques as necessary on a cell during scenario 1300, edge detector 552 also indicates whether the cell is to be processed using coarse grid processing or using fine grid processing.

Scenario 1300 begins with edge detector 552 receiving cell 1310 of frame FP1300. An upper portion of FIG. 13A indicates that cell 1310 has corner t-values of: 0.245 at the upper-left corner, 0.216 at the upper-right corner; 0.276 at the lower-left corner, and 0.237 at the lower-right corner. After receiving cell 1310, edge detector 552 carries out all of the edge detection techniques mentioned above without detecting an edge in cell 1310. Then, as indicated by classification 1312, edge detector 552 classifies cell 1310 as a cell with "No edge detected". Since no edge is detected, edge detector 552 determines that cell 1310 is to be processed using "coarse grid processing only" as indicated by classification 1312.

Scenario 1300 continues with edge detector 552 receiving cell 1320 of frame FP1300. A middle portion of FIG. 13A indicates that cell 1320 has corner t-values of: 0.245 at the upper-left corner, 0.546 at the upper-right corner; 0.276 at the lower-left corner, and 0.237 at the lower-right corner. After receiving cell 1320, edge detector 552 carries out at least the delta greater than threshold edge detection technique using a threshold value of "0.25" as shown in FIG. 13A. Then, as indicated by classification 1324, edge detector 552 indicates "Edge 1322 detected" in cell 1320 using the delta greater than threshold edge detection technique, since "a difference between t-values for each of three corner pixels and a t-value of upper-right corner pixel is greater than" the "threshold" of "0.25". More specifically, the difference between the upper-right corner pixel's t-value and the upper-left corner pixel's t-value=0.546−0.245=0.301; the difference between the upper-right corner pixel's t-value and the lower-left corner pixel's t-value=0.546−0.276=0.270; and the difference between the upper-right corner pixel's t-value and the lower-right corner pixel's t-value=0.546−0.237=0.309, and all three of these differences (0.301, 0.270, 0.309) are greater than the threshold value of 0.25. Since the differences are greater than a threshold, edge 1322 is likely to lead to a visual artifact. Since edge 1322 is likely to lead to a visual artifact, edge detector 552 determines that cell 1320 is to be processed using "fine grid processing".

Scenario 1300 continues with edge detector 552 receiving cell 1330 of frame FP1300. A lower portion of FIG. 13A indicates that cell 1330 has corner t-values of: 1.93 at the upper-left corner, 2.02 at the upper-right corner; 1.78 at the lower-left corner, and 1.86 at the lower-right corner. After receiving cell 1330, edge detector 552 detects edge 1332 in cell 1330 using the integral difference technique. Then, as indicated by classification 1334, edge detector 552 indicates "Edge 1332 detected" in cell 1330. In scenario 1300, edge 1332 is an edge generated by a perimeter of a repeating ellipse where the t-values transition between 1.0 and 2.0 as indicated by classification 1334. Specifically, classification 1334 states that a "first digit of t-value=1 for three pixels" and a "first digit of t-value=0 for the upper right pixel", indicating the t-value transition between 0.0 and 1.0. As the t-values of cell 1330 do transition between 1.0 and 2.0, edge detector 552 determines that edge 1332 could lead to a visual artifact depending on whether edge 1332 is generated by a perimeter of a repeating ellipse, such as when SPREAD_METHOD is equal to REPEAT. Since edge 1332 could lead to a visual artifact depending on a setting of SPREAD_METHOD, edge detector 552 determines that cell 1330 is to be processed using "fine grid processing" if "SPREAD_METHOD=REPEAT" as shown by classification 1334.

Scenario 1300 continues with edge detector 552 receiving cell 1340 of frame FP1300. An upper portion of FIG. 13B indicates that cell 1340 has corner t-values of: 0.013 at the upper-left corner, −0.026 at the upper-right corner; 0.021 at the lower-left corner, and 0.037 at the lower-right corner. After receiving cell 1340, edge detector 552 detects edge 1342 in cell 1340 using the sign difference technique. Then, as indicated by classification 1344, edge detector 552 indicates "Edge 1342 detected" in cell 1340 as a "sign for the t-value is positive for three corner pixels and negative for the upper right corner pixel". In scenario 1300, edge 1342 is an edge generated by a perimeter of a starting circle in the source domain, and is likely to lead to a visual artifact. Since edge 1342 is likely to lead to a visual artifact, edge detector 552 determines that cell 1340 is to be processed using "fine grid processing" as shown by classification 1344.

Scenario 1300 continues with edge detector 552 receiving cell 1350 of frame FP1300. A middle portion of FIG. 13B indicates that cell 1350 has corner t-values of: 0.995 at the upper-left corner, 1.02 at the upper-right corner; 0.996 at the lower-left corner, and 0.997 at the lower-right corner. After receiving cell 1350, edge detector 552 detects edge 1352 in cell 1350 using the integral difference technique. Then, as indicated by classification 1354, edge detector 552 indicates "Edge 1352 detected" in cell 1350 as a "t-value for the upper right corner pixel is greater than 1.0 and the t-values of the other three corner pixels are less than 1.0". In scenario 1300, edge 1352 is an edge generated by a perimeter of an ending circle in the source domain, and is likely to lead to a visual artifact. Since edge 1352 is likely to lead to a visual artifact, edge detector 552 determines that cell 1350 is to be processed "using fine grid processing".

Scenario 1300 continues with edge detector 552 receiving cell 1360 of frame FP1300. A lower portion of FIG. 13B indicates that cell 1360 has three corner pixels with a "DFlag" set to 0, and an upper-right corner pixel with the DFlag set to 1. In scenario 1300, the DFlag for a pixel is set to 0 if the pixel has a non-negative discriminant; e.g., a value of $b^2-4ac \geq 0$, where $b=B/A$, $c=C/A$, and where A, B, and C are as defined for Equation (1) for Algorithm A or as similarly defined for Equation (13) for Algorithm B, and the DFlag for a pixel is set to 1 if the pixel has a negative discriminant; e.g., a value of $b^2-4ac<0$. After receiving cell 1360, edge detector 552 detects edge 1362 in cell 1360 using the negative discriminant technique. Then, as indicated by classification 1364, edge detector 552 indicates "Edge 1362 detected" in cell 1360 as a "negative discriminant flag (DFlag) is set for the upper right corner pixel". In scenario 1300, edge 1362 is an edge at a boundary of a cone, and is likely to lead to a visual artifact. Since edge 1362 is likely to lead to a visual artifact, edge detector 552 determines that cell 1360 is to be processed using "fine grid processing".

Scenario 1300 continues with edge detector 552 receiving cell 1370 of frame FP1300. An upper portion of FIG. 13C indicates that cell 1370 has three corner pixels with an "LFlag" set to 0, and an upper-right corner pixel with the LFlag set to 1. In scenario 1300, the LFlag for a pixel is set to 1 if a larger root of a quadratic equation; e.g., Equation (1), Equation (13), is used for a t-value for the pixel, and the LFlag is set to 0 if a smaller root of the quadratic equation is used for the t-value for the pixel. After receiving cell 1370, edge detector 552 detects edge 1372 in cell 1360 using the root size difference technique. Then, as indicated by classification 1374, edge detector 552 indicates "Edge 1372 detected" in cell 1370 "since large root flag (LFlag) is not set for the t-value for three [corner] pixels and the large root flag of t-value for upper right corner pixel is set". In scenario 1300, edge 1372 is an edge when an ending circle overlays a starting circle, and is likely to lead to a visual artifact. Since edge 1372 is likely to lead to a visual artifact, edge detector 552 determines that cell 1370 is to be processed using "fine grid processing". After edge detector 552 determines that cell 1370 is to be processed using fine grid processing, scenario 1300 can be completed.

Figure 14:
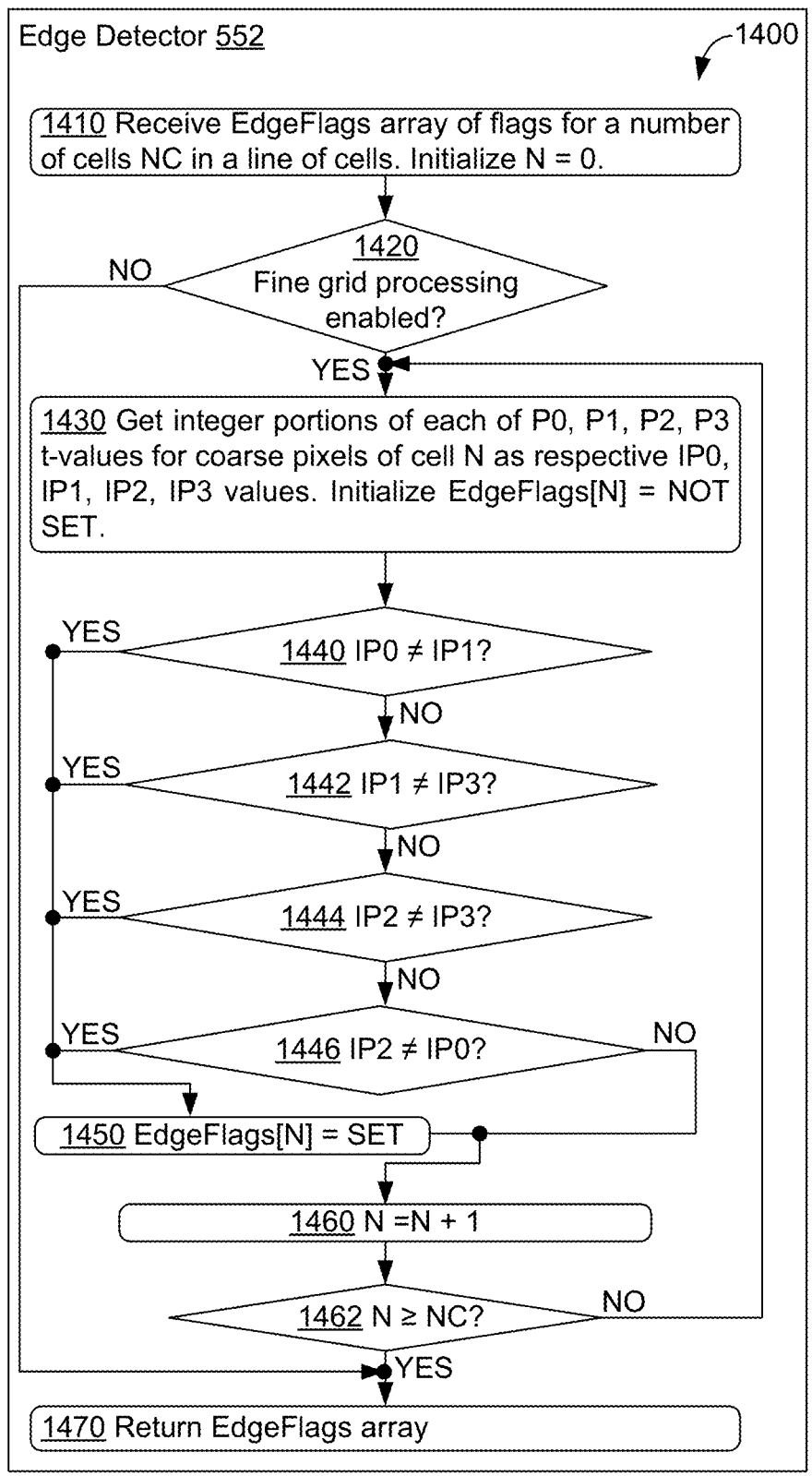
FIG. 14 depicts an edge detector of the graphics engine circuitry of FIG. 4, according to an example embodiment.
Figure 14:
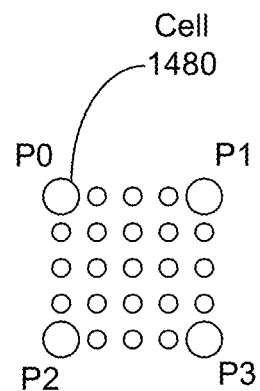

FIG. 14 depicts edge detector 552 of radial gradient module 500 of graphics engine circuitry 420, according to an example embodiment. FIG. 14 shows that edge detector 552 can execute method 1400 to perform edge detection using the above-mentioned integral difference technique and set a value in an EdgeFlags array associated with a cell N in a line of cells to either a value of SET if the integral difference technique indicates an edge is detected in cell N or to a value of NOT SET if the integral difference technique indicates an edge is not detected in cell N. To illustrate P0, P1, P2, and P3 pixels, example cell 1480 is shown at right of FIG. 14 with an upper left pixel being labeled P0, an upper right pixel being labeled P1, a lower left pixel being labeled P2, and a lower right pixel being labeled P3.

Method 1400 can begin at block 1410, where edge detector 552 can receive (or perhaps allocate) the EdgeFlags array for a number of cells NC in a current line of cells of a frame of pixels. Also at block 1410, edge detector 552 can initialize a current cell value N to be 0. In some examples, edge detector 552 can also receive the value NC at block 1410.

At block 1420, edge detector 552 can determine whether fine grid processing is enabled for the current line of cells. For example, edge detector 552 can access a flag or other data item indicating a status of fine grid processing and/or a status of coarse grid processing to determine whether fine grid processing is enabled. If fine grid processing is enabled for the current line of pixels, then edge detector 552 can proceed to block 1430. Otherwise, fine grid processing is not enabled for the current line of pixels and edge detector 552 can proceed to block 1470.

At block 1430, edge detector 552 can get respective integer portions IP0, IP1, IP2, IP3 of respective t-values of pixels P0, P1, P2, and P3 for a current cell N of the current line of cells. For example, if the t-values for pixels P0, P1, P2, and P3 respectively are 1.1, −2.2, 3.3, and −4.4, then the respective integer portions IP0, IP1, IP2, IP3 are 1, −2, 3, and −4. Many other examples are possible as well.

At block 1440, edge detector 552 can determine whether IP0 is not equal to IP1. If IP0 is not equal to IP1, then edge detector 552 can proceed to block 1450. Otherwise IP0 is equal to IP1 and edge detector 552 can proceed to block 1442.

At block 1442, edge detector 552 can determine whether IP1 is not equal to IP3. If IP1 is not equal to IP3, then edge detector 552 can proceed to block 1450. Otherwise IP1 is equal to IP3 and edge detector 552 can proceed to block 1444.

At block 1444, edge detector 552 can determine whether IP2 is not equal to IP3. If IP2 is not equal to IP3, then edge detector 552 can proceed to block 1450. Otherwise IP2 is equal to IP3 and edge detector 552 can proceed to block 1446.

At block 1446, edge detector 552 can determine whether IP2 is not equal to IP0. If IP2 is not equal to IP0, then edge detector 552 can proceed to block 1450. Otherwise IP2 is equal to IP0 and edge detector 552 can proceed to block 1460.

At block 1450, edge detector 552 can determine that an edge was detected with respect to current cell N. Edge detector 552 can then set EdgeFlags[N]=SET. Upon completion of the procedures of block 1450, edge detector 552 can proceed to block 1460.

At block 1460, the value of N can be incremented by one; that is, after N is incremented, a new current cell N is to be processed by method 1400.

At block 1462, edge detector 552 can determine whether the new current cell N is after the last cell in a line of cells of the frame of pixels. For example, the new current cell N is the last cell in the line if N is greater than the number of cells NC. If the new current cell is after the last cell in the line of cells of the frame of pixels, then edge detector 552 can proceed to block 1470. Otherwise, the current cell is not the last cell in the line of cells and edge detector 552 can proceed to block 1430.

At block 1470, edge detector 552 can return the EdgeFlags array. Upon completion of the procedures of block 1470, method 1400 can be completed.

As an example of method 1400, suppose edge detector 552 received a line of NC=8 coarse cells; e.g., a group of 8 coarse cells perhaps with one extra t-value at the end for edge detection. If an edge is present in a coarse cell N, $0 \leq N < NC$, the array value EdgeFlags[N] is set to a SET value as indicated in blocks 1430-1450. When edge detector 552 has processed all NC cells, the EdgeFlags array can be passed to fine grid processor 550, which can perform fine grid processing for all pixels in each 4×4 cell whose corresponding EdgeFlags array value=SET. In an example were the SET value=1, and the NOT SET value=0, and where the line of NC=8 cells had edges in cells 0, 2, and 5, values in the EdgeFlags[N-1:0] array would equal a binary value of 0010 0101=hexadecimal 25 after edge detector 552 processed the line of cells using method 1400.

Edge detector 552 can use multiple edge detection techniques, such as those discussed above in the context of FIG. 13 and scenario 1300, to detect an edge in a cell of pixels and therefore switch from coarse grid processing to fine grid processing as described above. Then, in other examples, method 1400 can be extended to enable edge detector 552 to perform edge detection using one or more additional and/or different edge detection techniques than the integral difference edge detection technique; e.g., one or more of the above-mentioned delta greater than threshold edge detection technique, the sign difference edge detection technique, the greater than one edge detection technique, the negative discriminant edge detection technique, and the root size difference technique.

FIG. 15 shows two images 1510, 1520 generated utilizing radial gradient techniques; according to an example embodiment. Images 1510 and 1520 are intended to be the same; however, image 1510 was generated with "delta greater than threshold" edge detection disabled, and image 1520 was generated with "delta greater than threshold" edge detection enabled. As "delta greater than threshold" edge detection was disabled for image 1510, visible artifacts such as incorrectly colored pixels can be seen in regions 1512 and 1514 of image 1510. However, corresponding regions 1522 and 1524 of image 1520 do not have the artifacts shown in regions 1512 and 1514 of image 1510. The examples presented by images 1510 and 1520 indicate that edge detection can correct visible artifacts generated during radial gradient rendering.

Figure 16:
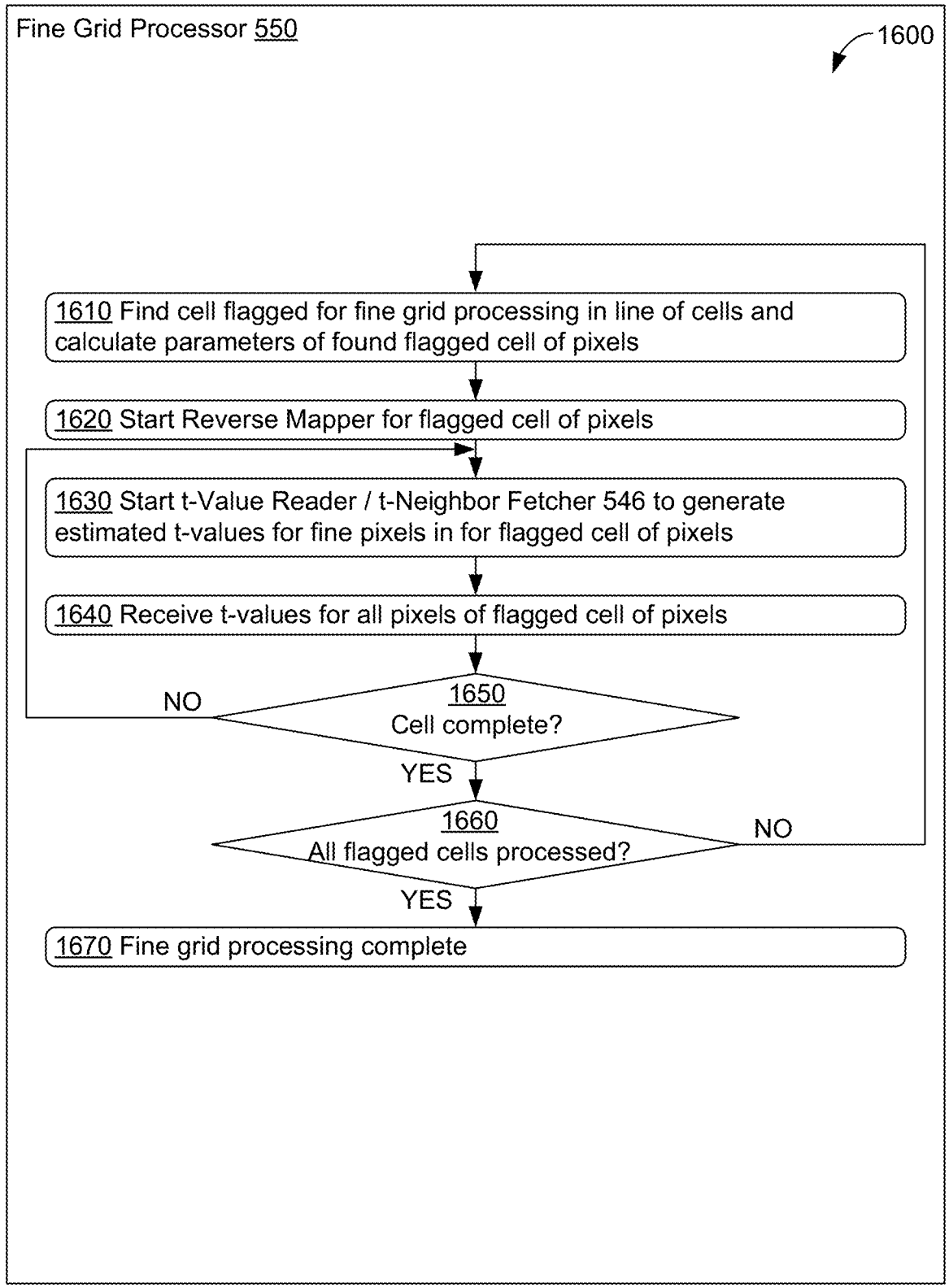
FIG. 16 depicts a fine grid processor, according to an example embodiment.

FIG. 16 depicts a fine grid processor 550 of graphics engine circuitry 420, according to an example embodiment. Fine grid processor 550 can coordinate fine grid processing for one or more cells of pixels that have been flagged for fine grid processing. In some examples, such as discussed below in the context of method 1600, fine grid processor 550 can coordinate fine grid processing for all cells in a line, block, frame, or grid of pixels. In other examples, fine grid processor 550 can coordinate fine grid processing for one cell of pixels at a time rather than process all cells in a larger structure of pixels, such as a line, block, frame, or grid of pixels.

FIG. 16 shows that fine grid processor 550 can execute method 1600 to perform fine grid processing for any cells of pixels flagged for fine grid processing in a line of cells of a frame, grid, or block of pixels. Method 1600 can begin at block 1610, where fine grid processor 550 can find a cell of pixels (e.g., a 4×4 cell of pixels) flagged for fine grid processing in a line of cells. After finding a cell that has been flagged for fine grid processing, fine grid processor 550 can calculate cell parameters for the flagged cell, where the cell parameters can include, but are not limited to: coordinates in the destination frame destX and destY for the flagged cell and one or more parameters instructing the reverse mapper to provide coordinates in the source frame for each pixel of the flagged cell of pixels. In some examples, the destX and destY coordinates can be determined based on coordinates of the flagged cell within the line of cells of pixels.

At block 1620, fine grid processor 550 can start the reverse mapper and instruct the reverse mapper to generate the coordinates in the source frame for each pixel of the flagged cell of pixels using the parameters determined at block 1610.

At block 1630, fine grid processor 550 can obtain the coordinates in the source frame for each pixel of the flagged cell of pixels from the reverse mapper. Then, fine grid processor 550 can provide the coordinates in the source frame for each pixel of the flagged cell of pixels to t-value reader/t-neighbor fetcher 546. Then, t-value reader/t-neighbor fetcher 546 can use the source frame coordinates to provide t-estimates for t-value generation by RGM t-value generator 510.

At block 1640, fine grid processor 550 can obtain the t-values generated for all of the pixels of the flagged cell of pixels from RGM t-value generator 510.

At block 1650, fine grid processor 550 can determine if t-values have been generated for all pixels in the flagged cell of pixels; i.e., if fine grid processing for the flagged cell of pixels is complete. If t-values have been generated for all pixels in the flagged cell of pixels, fine grid processor 550 can proceed to block 1660. Otherwise, t-values have not been generated for all pixels in the flagged cell of pixels and fine grid processor 550 can proceed to block 1630.

At block 1660, fine grid processor 550 can determine if all cells in the line of cells of pixels that have been flagged for fine grid processing have gone through fine grid processing. If all cells in the line of pixels that have been flagged for fine grid processing have gone through fine grid processing, then fine grid processor 550 can proceed to block 1670. Otherwise, all cells in the line of pixels that have been flagged for fine grid processing have not gone through fine grid processing and fine grid processor 550 can proceed to block 1610.

In some examples, at block 1660 fine grid processor 550 can search for a cell of pixels that has been flagged for fine grid processing in the line of cells, rather than performing such a search at block 1620. Then, if the search for a cell of pixels that has been flagged for fine grid processing in the line of cells is unsuccessful, then fine grid processor 550 can determine that all cells in the line of cells of pixels that have been flagged for fine grid processing have gone through fine grid processing and proceed to block 1670. Otherwise, the search for a cell of pixels that has been flagged for fine grid processing in the line of cells is successful, and fine grid processor 550 can proceed to block 1610 to calculate parameters for the newly-found flagged cell of pixels. In other examples, at block 1660 fine grid processor 550 can determine if all cells in the block, frame, or grid of pixels have gone through fine grid processing, as opposed to determining that all cells in the line of cells of pixels have gone through fine grid processing.

At block 1670, fine grid processor 550 can determine that fine grid processing for the line of cells has completed. Upon completion of the procedures of block 1670, method 1600 can be completed.

Example Methods of Operation

Figure 17:
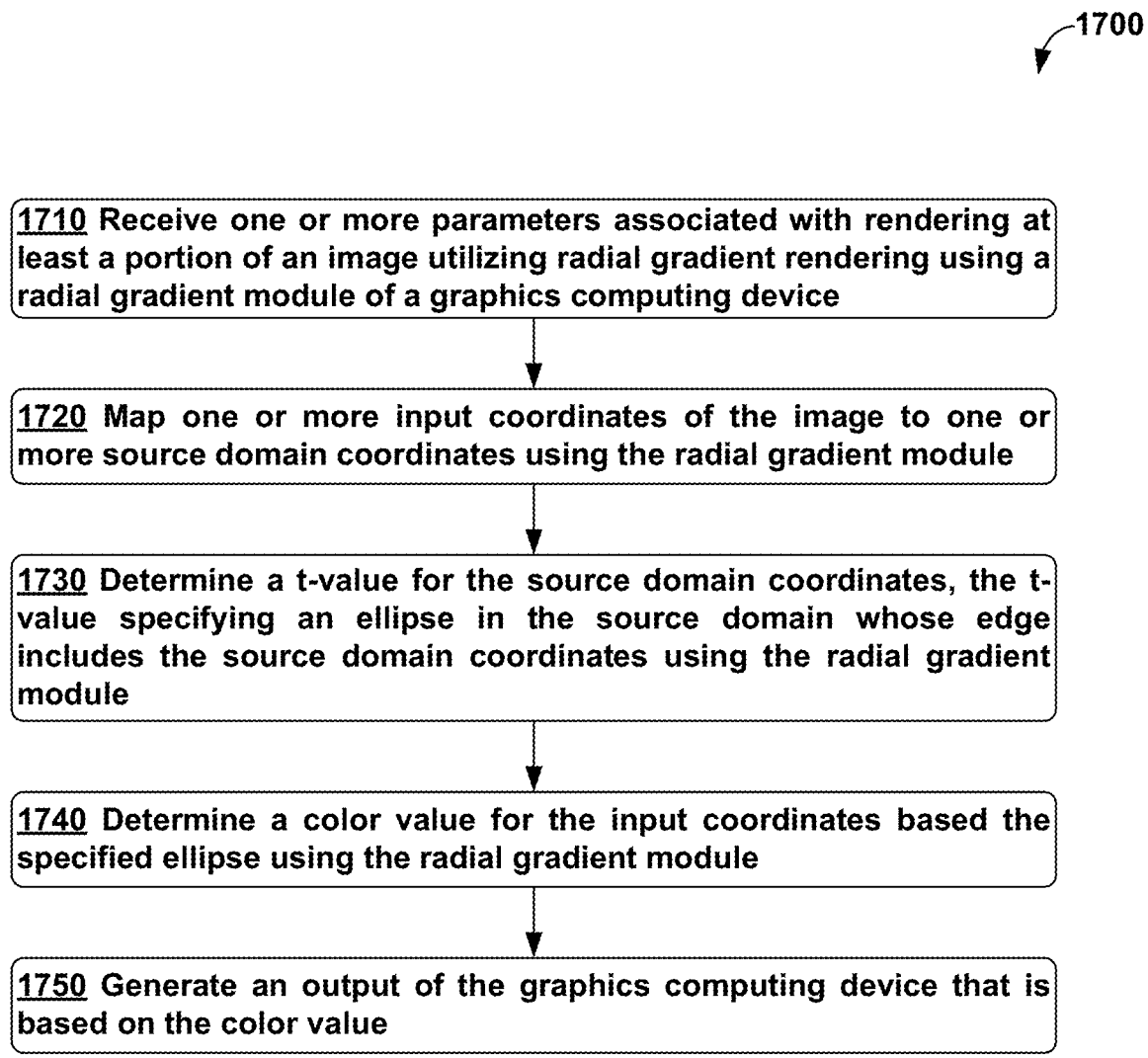
FIG. 17 shows a flowchart for a method, according to an example embodiment.

FIG. 17 shows a flowchart for method 1700, according to an example embodiment. Method 1700 can be carried out by a graphics computing device, such as graphics computing device 400 that can include graphics engine circuitry 420, which in turn can include radial gradient module 500. In other examples, functionality of graphics engine circuitry 420 and/or radial gradient module 500, including but not limited to functionality for performing one or more of the herein-disclosed methods (e.g., method 1700), can be performed using software; e.g., graphics engine software 412.

FIG. 17 shows that method 1700 can begin at block 1710, where the radial gradient module of the graphics computing device can receive one or more parameters associated with rendering at least a portion of an image utilizing radial gradient rendering, such as discussed herein at least in the context of FIGS. 1, 5 and 7.

At block 1720, the radial gradient module can map one or more input coordinates of the image to one or more source domain coordinates using the radial gradient module, such as discussed herein at least in the context of FIGS. 1, 5, 7, 8, and 16.

At block 1730, the radial gradient module can determine a t-value for the source domain coordinates, the t-value specifying an ellipse in the source domain whose edge includes the source domain coordinates, such as discussed herein at least in the context of FIGS. 1, 5, 7, 8, 9, and 16.

In some embodiments, determining the t-value for the source coordinates can include: determining an equation relating to the mapping of the one or more input coordinates of the image to one or more source domain coordinates; determining one or more roots of the equation; and determining the t-value of the source domain coordinates based on the one or more roots of the equation, such as discussed herein at least in the context of FIGS. 1, 5, 7, 8, and 9. In particular of these embodiments, the equation can include a quadratic equation; then determining the one or more roots of the equation can include determining the one or more roots of the quadratic equation utilizing a root-finding algorithm, such as discussed herein at least in the context of FIGS. 1, 5, 7 and 9. In some of these particular embodiments, determining the one or more roots of the quadratic equation utilizing the root-finding algorithm can include: determining an initial estimate of a root of the quadratic equation; and determining the one or more roots of the quadratic equation based on the initial estimate of the root, such as discussed herein at least in the context of FIGS. 5, 7, and 9. In other of these particular embodiments, determining the initial estimate of the root of the quadratic equation can include determining the initial estimate of the root of the quadratic equation based on one or more of: a one-dimensional (1D) extrapolation, and a two-dimensional (2D) extrapolation, such as discussed herein at least in the context of FIGS. 5, 7, and 9. In other of these particular embodiments, the root-finding algorithm can include a Newton-Raphson algorithm, and where the root-finding algorithm performs one or more division operations using an iterative division operation, such as discussed herein at least in the context of FIG. 5.

At block 1740, the radial gradient module can determine a color value for the input coordinates based on the specified ellipse using the radial gradient module, such as discussed herein at least in the context of FIGS. 1, 5, 6, 7, and 8.

At block 1750, an output of the graphics computing device can be generated, where the output based on the color value, such as discussed herein at least in the context of FIGS. 1, 5, 7, 12, 14, 15, and 16.

In some embodiments, the one or more parameters can include a radial gradient algorithm selection parameter; then, method 1700 can further include: selecting a particular radial gradient algorithm from among a plurality of radial gradient algorithms based on the radial gradient algorithm selection parameter; utilizing the particular radial gradient algorithm to render at least a portion of an image; and generating an output based on the rendered at least the portion of the image, such as discussed above at least in the context of Algorithms A and B and FIGS. 1-2B, 5, 7, 10, 12, 13, 14, and 16. In particular of these embodiments, the plurality of radial gradient algorithms can include: a single-ellipse radial gradient algorithm and a dual-circle radial gradient algorithm such as discussed above at least in the context of Algorithms A and B and FIGS. 1-2B, 5, 7, 10, 12, 13, 14, and 16. In other of these embodiments, determining the t-value for the source domain coordinates comprises selecting one or more equations for determining the t-value based on the radial gradient algorithm selection parameter, such as discussed above at least in the context of FIG. 1.

Figure 18:
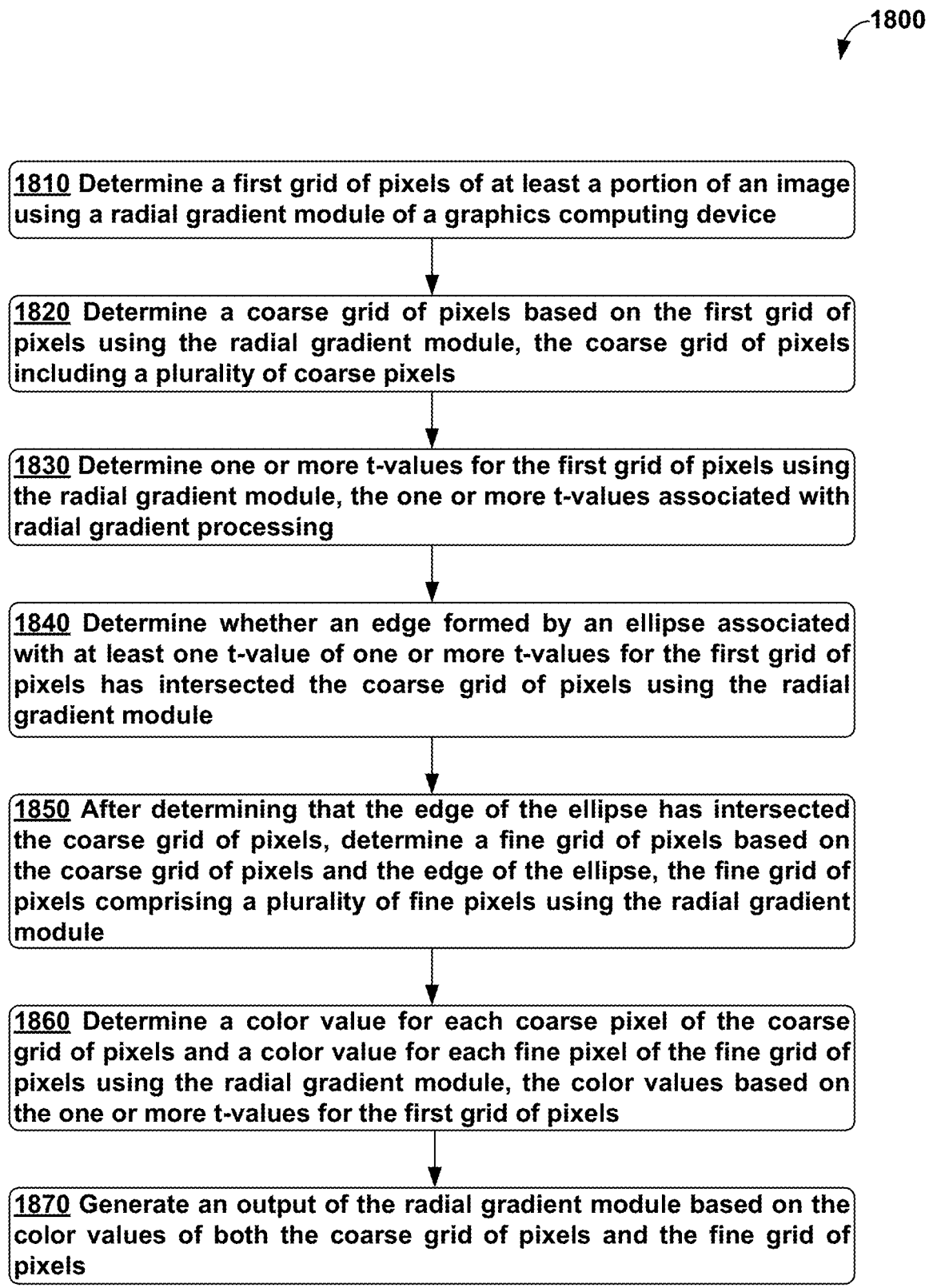
FIG. 18 shows a flowchart for another method, according to an example embodiment.

FIG. 18 shows a flowchart for method 1800, according to an example embodiment. Method 1800 can be carried out by a graphics computing device, such as graphics computing device 400 that can include graphics engine circuitry 420, which in turn can include radial gradient module 500. In other examples, functionality of graphics engine circuitry 420 and/or radial gradient module 500, including but not limited to functionality for performing one or more of the herein-disclosed methods (e.g., method 1800), can be performed using software; e.g., graphics engine software 412.

FIG. 18 shows that method 1800 can begin at block 1810, where a radial gradient module of a graphics computing device can determine a first grid of pixels of at least a portion of an image, such as discussed herein at least in the context of FIGS. 1 and 5.

At block 1820, the radial gradient module can determine a coarse grid of pixels based on the first grid of pixels using the radial gradient module, the coarse grid of pixels including a plurality of coarse pixels, such as discussed herein at least in the context of FIGS. 1, 5, and 7.

At block 1830, the radial gradient module can determine one or more t-values of the first grid of pixels using the radial gradient module, the one or more t-values associated with radial gradient rendering, such as discussed herein at least in the context of FIGS. 1, 2A, 2B, 5, 7, 8, and 9.

At block 1840, the radial gradient module can determine whether an edge formed by an ellipse associated with at least one t-value of the one or more t-values of the first grid of pixels has intersected the coarse grid of pixels using the radial gradient module, such as discussed herein at least in the context of FIGS. 1, 5, 7, and 13A-14.

In some embodiments, determining whether the edge formed by the ellipse associated with at least one of the one or more t-values for the first grid of pixels has intersected the coarse grid of pixels can include: determining a first coarse t-value of a first coarse pixel of the coarse grid of pixels; determining a second coarse t-value of a second coarse pixel of the coarse grid of pixels; determining whether the sign of the first coarse t-value differs from the sign of the second coarse t-value; and after determining that the sign of the first coarse t-value differs from the sign of the second coarse t-value, determining that the edge formed by the ellipse associated with at least one of the one or more t-values for the first grid of pixels has intersected the coarse grid of pixels, such as discussed herein at least in the context of FIGS. 1, 5, 7, and 13A-14.

In other embodiments, determining whether the edge formed by the ellipse associated with at least one of the one or more t-values for the first grid of pixels has intersected the coarse grid of pixels can include: determining a first coarse t-value of a first coarse pixel of the coarse grid of pixels; determining a second coarse t-value of a second coarse pixel of the coarse grid of pixels; determining whether a difference between the first coarse t-value and the second coarse t-value exceeds a threshold delta-t-value; and after determining that difference between the first coarse t-value and the second coarse t-value exceeds the threshold delta-t-value, determining that the edge formed by the ellipse associated with at least one of the one or more t-values for the first grid of pixels has intersected the coarse grid of pixels, such as discussed herein at least in the context of FIGS. 1, 5, 7, and 13A-14.

In even other embodiments, determining whether the edge formed by the ellipse associated with at least one of the one or more t-values for the first grid of pixels has intersected the coarse grid of pixels can include determining a first integer t-value as the integer part of the first coarse t-value; determining a second integer t-value as the integer part of the second coarse t-value; and determining whether the first integer t-value and the second integer t-value differ in value; and after determining that the first integer t-value and the second integer t-value differ in value, determining that the edge formed by the ellipse associated with at least one of the one or more t-values for the first grid of pixels has intersected the coarse grid of pixels, such as discussed herein at least in the context of FIGS. 1, 5, 7, and 13A-14.

In still other embodiments, determining whether the edge formed by the ellipse associated with at least one of the one or more t-values for the first grid of pixels has intersected the coarse grid of pixels can include: determining a first coarse t-value of a first coarse pixel of the coarse grid of pixels; determining a second coarse t-value of a second coarse pixel of the coarse grid of pixels; determining whether the first coarse t-value has a value greater than one and the second coarse t-value has a value less than or equal to one; and after determining that the first coarse t-value has a value greater than one and the second coarse t-value has a value less than or equal to one, determining that the edge formed by the ellipse associated with at least one of the one or more t-values for the first grid of pixels has intersected the coarse grid of pixels, such as discussed herein at least in the context of FIGS. 1, 5, 7, and 13A-14.

In yet other embodiments, determining whether the edge formed by the ellipse associated with at least one of the one or more t-values for the first grid of pixels has intersected the coarse grid of pixels can include: determining a first coarse discriminant of the equation for a first coarse pixel of the coarse grid of pixels; determining a second coarse discriminant of the equation for a second coarse pixel of the coarse grid of pixels; determining whether the sign of the first coarse discriminant differs from the sign of the second coarse discriminant; and after determining that the sign of the first coarse discriminant differs from the sign of the second coarse discriminant, determining that the edge formed by the ellipse associated with at least one of the one or more t-values for the first grid of pixels has intersected the coarse grid of pixels, such as discussed herein at least in the context of FIGS. 1, 5, 7, and 13A-14.

In further other embodiments, determining whether the edge formed by the ellipse associated with at least one of the one or more t-values for the first grid of pixels has intersected the coarse grid of pixels can include: selecting either a first large root or a first small root for a first coarse pixel of the coarse grid of pixels; setting a first large root flag if the first large root is selected for the first coarse pixel; selecting either a second large root or a second small root for a second coarse pixel of the coarse grid of pixels; setting a second large root flag if the second large root is selected for the second coarse pixel; determining whether the first large root flag differs from the second large root flag; and after determining that the first large root flag differs from the second large root flag, determining that the edge formed by the ellipse associated with at least one of the one or more t-values for the first grid of pixels has intersected the coarse grid of pixels, such as discussed herein at least in the context of FIGS. 1, 5, 7, and 13A-14.

At block 1850, the radial gradient module can, after determining that the edge formed by the ellipse has intersected the coarse grid of pixels, determine a fine grid of pixels based on the coarse grid of pixels and the edge formed by the ellipse, the fine grid of pixels including a plurality of fine pixels using the radial gradient module, such as discussed herein at least in the context of FIGS. 1, 5, 6, 7, 8, 14, and 16.

At block 1860, the radial gradient module can determine a color value for each coarse pixel of the coarse grid of pixels based on the one or more t-values and a color value for each fine pixel of the fine grid of pixels using the radial gradient module, the color values based on the one or more t-values for the first grid of pixels, such as discussed herein at least in the context of FIGS. 1, 5, 6, 7, 8, and 13A-14.

In some embodiments, determining the color value for each coarse pixel of the coarse grid of pixels based on the one or more t-values for the first grid of pixels can include: for each coarse pixel in the coarse grid of pixels: determining coarse source domain coordinates associated with the coarse pixel; determining a coarse t-value for the coarse source domain coordinates, the coarse t-value specifying a coarse ellipse in the source domain whose edge includes the coarse source domain coordinates; and determining the color value for the coarse pixel based on the specified coarse ellipse, such as discussed herein at least in the context of FIGS. 1, 5, 7, 8, 9, and 13A-13C.

In some of these embodiments, determining the coarse t-value for the coarse source domain coordinates can include: determining coarse input domain coordinates associated with the coarse pixel; determining an equation relating the coarse input domain coordinates to the coarse source domain coordinates; determining one or more roots of the equation; and determining the coarse t-value of the coarse source domain coordinates based on the one or more roots of the equation, such as discussed herein at least in the context of FIGS. 1, 5, 7, 8, 9, and 13A-13C.

In particular of these embodiments, determining one or more roots of the equation can include determining a discriminant of the equation; then, determining whether the edge formed by the ellipse associated with at least one of the one or more t-values has intersected the coarse grid of pixels can include determining whether the edge formed by the ellipse associated with at least one of the one or more t-values has intersected the coarse grid of pixels based on the discriminant of the equation, such as discussed herein at least in the context of FIGS. 1, 5, 7, 8, 9, and 13A-13C.

In other of these embodiments, determining whether the edge formed by the ellipse associated with at least one of the one or more t-values for the first grid of pixels has intersected the coarse grid of pixels based on the discriminant of the equation can include: determining a first coarse discriminant of the equation for a first coarse pixel of the coarse grid of pixels; determining whether an absolute value of the first coarse discriminant is a relatively small number; and after determining that the absolute value of the first coarse discriminant is a relatively small number, assigning the coarse t-value to a predetermined value, such as discussed herein at least in the context of FIGS. 1, 5, 7, 8, 9, and 13A-13C.

In even other of these embodiments, the one or more roots of the equation can include a first root and a second root where the first root is larger than the second root; then, determining the coarse t-value of the coarse source domain coordinates based on the one or more roots of the equation can include: determining whether a coefficient of the equation is positive; and after determining that the coefficient of the equation is positive, determining the coarse t-value of the coarse source domain coordinates based on the first root, such as discussed herein at least in the context of FIGS. 1, 5, 7, 8, 9, and 11-13C.

In yet other of these embodiments, where the one or more roots of the equation include a first root and a second root, where the first root is larger than the second root; then, determining the coarse t-value of the coarse source domain coordinates based on the one or more roots of the equation can include: determining whether a coefficient of the equation is negative; and after determining that the coefficient of the equation is negative, determining the coarse t-value of the coarse source domain coordinates based on the second root, such as discussed herein at least in the context of FIGS. 1, 5, 7, 8, 9, and 11-13C.

In other embodiments, determining the color value for each fine pixel of the fine grid of pixels based on the one or more t-values for the first grid of pixels can include: for each fine pixel in the fine grid of pixels: determining fine source domain coordinates associated with the fine pixel, determining a fine t-value for the fine source domain coordinates, the fine t-value specifying a fine ellipse in the source domain whose edge includes the fine source domain coordinates, and determining the color value for the fine pixel based on the specified fine ellipse, such as discussed herein at least in the context of FIGS. 1, 5, 7, 8, 9, and 11-13C. In some of these embodiments, determining the fine t-value for the fine source domain coordinates can include: determining fine input domain coordinates associated with the fine pixel; determining an equation relating the fine input domain coordinates to the fine source domain coordinates; determining one or more roots of the equation; and determining the fine t-value of the fine source domain coordinates based on the one or more roots of the equation, such as discussed herein at least in the context of FIGS. 1, 5, 7, 8, 9, and 11-13C.

At block 1870, an output of the radial gradient module can be generated, where the output is based on the color values of both the coarse grid of pixels and the fine grid of pixels, such as discussed herein at least in the context of FIGS. 1, 5, 7, 8, 14, and 15.

The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A graphics computing device, comprising:
 a radial gradient module comprising circuitry for radial gradient rendering by at least:
  receiving one or more parameters associated with rendering at least a portion of an image utilizing radial gradient rendering;
  mapping one or more input coordinates of the image to one or more source domain coordinates;
  determining a t-value for the source domain coordinates, the t-value specifying an ellipse in the source domain whose edge includes the source domain coordinates;
  determining a color value for the input coordinates based on the specified ellipse; and
  generating an output that is based on the color value.

2. The graphics computing device of claim 1, wherein determining the t-value for the source coordinates comprises:

determining an equation relating to the mapping of the one or more input coordinates of the image to one or more source domain coordinates;

determining one or more roots of the equation; and determining the t-value of the source domain coordinates based on the one or more roots of the equation.

3. The graphics computing device of claim 2, where the equation comprises a quadratic equation, and where determining the one or more roots of the equation comprises determining the one or more roots of the quadratic equation utilizing a root-finding algorithm.

4. The graphics computing device of claim 3, wherein determining the one or more roots of the quadratic equation utilizing the root-finding algorithm comprises:

determining an initial estimate of a root of the quadratic equation; and determining the one or more roots of the quadratic equation based on the initial estimate of the root.

5. The graphics computing device of claim 4, wherein determining the initial estimate of the root of the quadratic equation comprises determining the initial estimate of the root of the quadratic equation based on one or more of: a one-dimensional (1D) extrapolation, and a two-dimensional (2D) extrapolation.

6. The graphics computing device of claim 4, wherein the root-finding algorithm comprises a Newton-Raphson algorithm.

7. The graphics computing device of claim 4, wherein the root-finding algorithm performs one or more division operations using an iterative division operation.

8. The graphics computing device of claim 1, wherein the one or more parameters comprise a radial gradient algorithm selection parameter, and wherein the circuitry for radial gradient rendering further comprises circuitry for:

selecting a particular radial gradient algorithm from among a plurality of radial gradient algorithms based on the radial gradient algorithm selection parameter;

utilizing the particular radial gradient algorithm to render at least a portion of an image; and generating an output based on the rendered at least the portion of the image.

9. The graphics computing device of claim 8, wherein the plurality of radial gradient algorithms comprises: a single-ellipse radial gradient algorithm and a dual-circle radial gradient algorithm.

10. The graphics computing device of claim 8, wherein the radial gradient module further comprises circuitry to select one or more equations for determining the t-value based on the radial gradient algorithm selection parameter.

11. A method, comprising:

receiving one or more parameters associated with rendering at least a portion of an image utilizing radial gradient rendering using a radial gradient module of a graphics computing device;

mapping one or more input coordinates of the image to one or more source domain coordinates using the radial gradient module;

determining a t-value for the source domain coordinates, the t-value specifying an ellipse in the source domain whose edge includes the source domain coordinates using the radial gradient module;

determining a color value for the input coordinates based on the specified ellipse using the radial gradient module; and generating an output of the graphics computing device that is based on the color value.

12. The method of claim 11, wherein determining the t-value for the source coordinates comprises:

determining an equation relating to the mapping of the one or more input coordinates of the image to one or more source domain coordinates;

determining one or more roots of the equation; and determining the t-value of the source domain coordinates based on the one or more roots of the equation.

13. The method of claim 12, wherein the equation comprises a quadratic equation, and where determining the one or more roots of the equation comprises determining the one or more roots of the quadratic equation utilizing a root-finding algorithm.

14. The method of claim 13, wherein determining the one or more roots of the quadratic equation utilizing the root-finding algorithm comprises:

determining an initial estimate of a root of the quadratic equation; and determining the one or more roots of the quadratic equation based on the initial estimate of the root.

15. The method of claim 14, wherein determining the initial estimate of the root of the quadratic equation comprises determining the initial estimate of the root of the quadratic equation based on one or more of: a one-dimensional (1D) extrapolation, and a two-dimensional (2D) extrapolation.

16. The method of claim 14, wherein the root-finding algorithm comprises a Newton-Raphson algorithm, and wherein the root-finding algorithm performs one or more division operations using an iterative division operation.

17. The method of claim 11, wherein the one or more parameters comprise a radial gradient algorithm selection parameter, and wherein the method further comprises:

selecting a particular radial gradient algorithm from among a plurality of radial gradient algorithms based on the radial gradient algorithm selection parameter;

utilizing the particular radial gradient algorithm to render at least a portion of an image; and generating an output based on the rendered at least the portion of the image.

18. The method of claim 17, wherein the plurality of radial gradient algorithms comprises: a single-ellipse radial gradient algorithm and a dual-circle radial gradient algorithm.

19. The method of claim 17, wherein determining the t-value for the source domain coordinates comprises selecting one or more equations for determining the t-value based on the radial gradient algorithm selection parameter.

20. An article of manufacture comprising non-transitory data storage storing at least computer-readable instructions that, when executed by one or more processors of a graphics computing device, cause the graphics computing device to perform tasks comprising:

receiving one or more parameters associated with rendering at least a portion of an image utilizing radial gradient rendering;

mapping one or more input coordinates of the image to one or more source domain coordinates;

determining a t-value for the source domain coordinates, the t-value specifying an ellipse in the source domain whose edge includes the source domain coordinates;

determining a color value for the input coordinates based on the specified ellipse; and generating an output that is based on the color value.

* * * * *